United States Patent
Robinson et al.

(10) Patent No.: US 12,039,726 B2
(45) Date of Patent: Jul. 16, 2024

(54) AUTOMATED OR PARTIALLY AUTOMATED ANATOMICAL SURFACE ASSESSMENT METHODS, DEVICES AND SYSTEMS

(71) Applicant: ARANZ HEALTHCARE LIMITED, Christchurch (NZ)

(72) Inventors: Brent Stephen Robinson, Mount Pleasant (NZ); Bruce Leslie Keith Davey, Christchurch (NZ); Philip John Barclay, Westmorland (NZ); Rachel Anne Johnston, Avonhead (NZ)

(73) Assignee: ARANZ HEALTHCARE LIMITED, Christchurch (NZ)

( * ) Notice: Subject to any disclaimer, the term of this patent is extended or adjusted under 35 U.S.C. 154(b) by 314 days.

(21) Appl. No.: 17/612,176

(22) PCT Filed: May 20, 2020

(86) PCT No.: PCT/IB2020/000420
§ 371 (c)(1),
(2) Date: Nov. 17, 2021

(87) PCT Pub. No.: WO2020/234653
PCT Pub. Date: Nov. 26, 2020

(65) Prior Publication Data
US 2022/0215538 A1      Jul. 7, 2022

Related U.S. Application Data

(60) Provisional application No. 62/850,377, filed on May 20, 2019.

(51) Int. Cl.
G06T 7/00       (2017.01)
G06V 10/25      (2022.01)
G06V 10/46      (2022.01)

(52) U.S. Cl.
CPC ............ *G06T 7/0012* (2013.01); *G06V 10/25* (2022.01); *G06V 10/469* (2022.01); *G06T 2207/20104* (2013.01); *G06T 2207/30088* (2013.01)

(58) Field of Classification Search
CPC ... G06F 21/32; G06F 18/24155; G06V 40/20; G06V 40/176
See application file for complete search history.

(56) References Cited

U.S. PATENT DOCUMENTS

| 3,259,612 A | 7/1966 | Peter |
| 3,335,716 A | 8/1967 | Alt et al. |

(Continued)

FOREIGN PATENT DOCUMENTS

| AT | 549703 | 3/2012 |
| CN | 110326029 | 10/2019 |

(Continued)

OTHER PUBLICATIONS

Non-Final Office Action mailed Oct. 24, 2022, U.S. Appl. No. 17/398,883, 18 pages.

(Continued)

*Primary Examiner* — Yosef Kassa
(74) *Attorney, Agent, or Firm* — Perkins Coie LLP

(57) ABSTRACT

Devices, systems and methods for assessing anatomical surface features are described herein. In some embodiments, a method of assessing a surface feature on a patient's skin surface includes (i) capturing one or more data sets from a patient's skin surface including the skin surface feature, and (ii) determining outline data of the skin surface feature based on at least one of the one or more data sets. The method can further include determining one or more confidence attributes associated with the determined outline data.

20 Claims, 15 Drawing Sheets

(56) References Cited

U.S. PATENT DOCUMENTS

| | | |
|---|---|---|
| 4,090,501 A | 5/1978 | Chaitin |
| 4,170,987 A | 10/1979 | Anselmo et al. |
| 4,236,082 A | 11/1980 | Butler |
| 4,505,583 A | 3/1985 | Konomi |
| 4,515,165 A | 5/1985 | Carroll |
| 4,535,782 A | 8/1985 | Zoltan |
| 4,556,057 A | 12/1985 | Hiruma et al. |
| 4,724,480 A | 2/1988 | Hecker et al. |
| 4,736,739 A | 4/1988 | Flaton |
| 4,768,513 A | 9/1988 | Suzuki |
| 4,773,097 A | 9/1988 | Suzaki et al. |
| 4,821,117 A | 4/1989 | Sekiguchi |
| 4,839,807 A | 6/1989 | Doi et al. |
| 4,851,984 A | 7/1989 | Doi et al. |
| 4,894,547 A | 1/1990 | Leffell et al. |
| 4,930,516 A | 6/1990 | Alfano et al. |
| 4,957,114 A | 9/1990 | Zeng et al. |
| 4,979,815 A | 12/1990 | Tsikos |
| 4,996,994 A | 3/1991 | Steinhauer et al. |
| D315,901 S | 4/1991 | Knowles |
| 5,003,977 A | 4/1991 | Suzuki et al. |
| 5,016,173 A | 5/1991 | Kenet et al. |
| 5,036,853 A | 8/1991 | Jeffcoat et al. |
| 5,080,100 A | 1/1992 | Trotel |
| 5,157,461 A | 10/1992 | Page |
| 5,174,297 A | 12/1992 | Daikuzono |
| 5,241,468 A | 8/1993 | Kenet |
| 5,270,168 A | 12/1993 | Grinnell |
| 5,319,550 A | 6/1994 | Griffith |
| 5,363,854 A | 11/1994 | Martens et al. |
| 5,369,496 A | 11/1994 | Alfano et al. |
| 5,396,331 A | 3/1995 | Kitoh et al. |
| 5,408,996 A | 4/1995 | Salb |
| 5,421,337 A | 6/1995 | Richards-Kortum et al. |
| 5,515,449 A | 5/1996 | Tsuruoka et al. |
| 5,519,208 A | 5/1996 | Esparza et al. |
| 5,528,703 A | 6/1996 | Lee |
| 5,531,520 A | 7/1996 | Grimson et al. |
| 5,532,824 A | 7/1996 | Harvey et al. |
| 5,561,526 A | 10/1996 | Huber et al. |
| 5,588,428 A | 12/1996 | Smith et al. |
| 5,590,660 A | 1/1997 | MacAulay et al. |
| 5,603,318 A | 2/1997 | Heilbrun et al. |
| 5,627,907 A | 5/1997 | Gur et al. |
| 5,644,141 A | 7/1997 | Hooker et al. |
| 5,648,915 A | 7/1997 | Mckinney et al. |
| 5,673,300 A | 9/1997 | Reckwerdt et al. |
| 5,689,575 A | 11/1997 | Sako et al. |
| 5,699,798 A | 12/1997 | Hochman et al. |
| 5,701,902 A | 12/1997 | Vari et al. |
| 5,717,791 A | 2/1998 | Labaere et al. |
| D393,068 S | 3/1998 | Kodama |
| 5,740,268 A | 4/1998 | Nishikawa et al. |
| 5,749,830 A | 5/1998 | Kaneko et al. |
| 5,784,162 A | 7/1998 | Cabib et al. |
| 5,791,346 A | 8/1998 | Craine et al. |
| 5,799,100 A | 8/1998 | Clarke et al. |
| 5,810,014 A | 9/1998 | Davis et al. |
| 5,836,872 A | 11/1998 | Kenet et al. |
| 5,910,972 A | 6/1999 | Ohkubo et al. |
| 5,921,937 A | 7/1999 | Davis et al. |
| 5,946,645 A | 8/1999 | Rioux et al. |
| 5,957,837 A | 9/1999 | Raab |
| 5,967,797 A | 10/1999 | Maldonado |
| 5,967,979 A | 10/1999 | Taylor et al. |
| 5,969,822 A | 10/1999 | Fright et al. |
| 5,974,165 A | 10/1999 | Giger et al. |
| 6,032,070 A | 2/2000 | Flock et al. |
| 6,081,612 A | 6/2000 | Gutkowicz-Krusin et al. |
| 6,081,739 A | 6/2000 | Lemchen |
| 6,091,995 A | 7/2000 | Ingle et al. |
| 6,101,408 A | 8/2000 | Craine et al. |
| 6,208,749 B1 | 3/2001 | Gutkowicz-Krusin et al. |
| 6,215,893 B1 | 4/2001 | Leshem et al. |
| 6,265,151 B1 | 7/2001 | Canter et al. |
| 6,266,453 B1 | 7/2001 | Hibbard et al. |
| 6,272,278 B1 | 8/2001 | Takahata et al. |
| 6,278,793 B1 | 8/2001 | Gur et al. |
| 6,307,957 B1 | 10/2001 | Gutkowicz-Krusin et al. |
| 6,324,417 B1 | 11/2001 | Cotton |
| D453,350 S | 2/2002 | Fenton |
| 6,359,513 B1 | 3/2002 | Kuo et al. |
| 6,359,612 B1 | 3/2002 | Peter |
| D455,166 S | 4/2002 | Raad |
| 6,381,026 B1 | 4/2002 | Schiff et al. |
| 6,381,488 B1 | 4/2002 | Dickey et al. |
| 6,392,744 B1 | 5/2002 | Holec |
| 6,396,270 B1 | 5/2002 | Smith |
| 6,413,212 B1 | 7/2002 | Raab |
| 6,421,463 B1 | 7/2002 | Poggio et al. |
| 6,427,022 B1 | 7/2002 | Craine et al. |
| 6,491,632 B1 | 12/2002 | Taylor |
| 6,567,682 B1 | 5/2003 | Osterweil et al. |
| 6,594,388 B1 | 7/2003 | Gindele et al. |
| 6,594,516 B1 | 7/2003 | Steckner et al. |
| 6,603,552 B1 | 8/2003 | Cline et al. |
| 6,611,617 B1 | 8/2003 | Crampton |
| 6,611,833 B1 | 8/2003 | Johnson |
| 6,631,286 B2 | 10/2003 | Pfeiffer et al. |
| 6,648,820 B1 | 11/2003 | Sarel |
| 6,671,349 B1 | 12/2003 | Griffith |
| 6,678,001 B1 | 1/2004 | Elberbaum |
| 6,690,964 B2 | 2/2004 | Bieger et al. |
| 6,715,675 B1 | 4/2004 | Rosenfeld |
| 6,754,370 B1 | 6/2004 | Hall-Holt et al. |
| 6,770,186 B2 | 8/2004 | Rosenfeld et al. |
| 6,798,571 B2 | 9/2004 | Wetzel et al. |
| 6,809,803 B1 | 10/2004 | O'Brien et al. |
| 6,810,279 B2 | 10/2004 | Mansfield et al. |
| 6,816,606 B2 | 11/2004 | Wetzel et al. |
| 6,816,847 B1 | 11/2004 | Toyama |
| 6,862,410 B2 | 3/2005 | Miyoshi |
| 6,862,542 B2 | 3/2005 | Lockhart et al. |
| 6,873,340 B2 | 3/2005 | Luby |
| 6,873,716 B1 | 3/2005 | Bowker |
| 6,879,394 B2 | 4/2005 | Amblard et al. |
| 6,907,193 B2 | 6/2005 | Kollias et al. |
| 6,915,073 B2 | 7/2005 | Seo |
| 6,922,523 B2 | 7/2005 | Merola et al. |
| 6,941,323 B1 | 9/2005 | Galperin |
| 6,961,517 B2 | 11/2005 | Merola et al. |
| 6,968,094 B1 | 11/2005 | Gallagher |
| 6,993,169 B2 | 1/2006 | Wetzel et al. |
| 7,006,223 B2 | 2/2006 | Mullani |
| 7,013,172 B2 | 3/2006 | Mansfield et al. |
| 7,015,906 B2 | 3/2006 | Olschewski et al. |
| 7,027,153 B2 | 4/2006 | Mullani |
| 7,040,536 B2 | 5/2006 | Rosenfeld |
| 7,054,674 B2 | 5/2006 | Cane et al. |
| 7,064,311 B2 | 6/2006 | Jung et al. |
| 7,068,828 B2 | 6/2006 | Kim et al. |
| 7,068,836 B1 | 6/2006 | Rubbert et al. |
| 7,074,509 B2 | 7/2006 | Rosenfeld et al. |
| 7,103,205 B2 | 9/2006 | Wang et al. |
| 7,106,885 B2 | 9/2006 | Osterweil et al. |
| 7,127,094 B1 | 10/2006 | Elbaum et al. |
| 7,127,280 B2 | 10/2006 | Dauga |
| 7,128,894 B1 | 10/2006 | Tannous et al. |
| 7,130,465 B2 | 10/2006 | Muenzenmayer et al. |
| 7,136,191 B2 | 11/2006 | Kaltenbach et al. |
| D533,555 S | 12/2006 | Odhe et al. |
| 7,155,049 B2 | 12/2006 | Wetzel et al. |
| 7,162,063 B1 | 1/2007 | Craine et al. |
| 7,167,243 B2 | 1/2007 | Mullani |
| 7,167,244 B2 | 1/2007 | Mullani |
| 7,181,363 B2 | 2/2007 | Ratti et al. |
| 7,194,114 B2 | 3/2007 | Schneiderman |
| 7,212,660 B2 | 5/2007 | Wetzel et al. |
| 7,227,621 B2 | 6/2007 | Lee et al. |
| 7,233,693 B2 | 6/2007 | Momma |
| D547,347 S | 7/2007 | Kim |
| 7,248,724 B2 | 7/2007 | Gutenev |
| D554,682 S | 11/2007 | Martinez |
| 7,295,226 B1 | 11/2007 | Meron et al. |

(56) References Cited

U.S. PATENT DOCUMENTS

| | | |
|---|---|---|
| 7,298,881 B2 | 11/2007 | Giger et al. |
| D561,804 S | 2/2008 | Asai |
| 7,347,365 B2 | 3/2008 | Rowe |
| 7,376,346 B2 | 5/2008 | Merola et al. |
| 7,400,754 B2 | 7/2008 | Jung et al. |
| 7,421,102 B2 | 9/2008 | Wetzel et al. |
| 7,426,319 B2 | 9/2008 | Takahashi |
| 7,440,597 B2 | 10/2008 | Rowe |
| 7,450,783 B2 | 11/2008 | Talapov et al. |
| 7,460,250 B2 | 12/2008 | Keightley et al. |
| 7,474,415 B2 | 1/2009 | Lin et al. |
| 7,487,063 B2 | 2/2009 | Tubic et al. |
| 7,489,799 B2 | 2/2009 | Nilsen et al. |
| 7,495,208 B2 | 2/2009 | Czarnek et al. |
| 7,496,399 B2 | 2/2009 | Maschke |
| 7,509,861 B2 | 3/2009 | Masotti et al. |
| 7,538,869 B2 | 5/2009 | Treado et al. |
| 7,545,963 B2 | 6/2009 | Rowe |
| D597,205 S | 7/2009 | Koch |
| 7,580,590 B2 | 8/2009 | Lin et al. |
| 7,581,191 B2 | 8/2009 | Rice et al. |
| 7,587,618 B2 | 9/2009 | Inui et al. |
| 7,595,878 B2 | 9/2009 | Nelson et al. |
| 7,603,031 B1 | 10/2009 | Viaud et al. |
| D603,441 S | 11/2009 | Wada |
| 7,613,335 B2 | 11/2009 | McLennan et al. |
| 7,620,211 B2 | 11/2009 | Browne et al. |
| 7,647,085 B2 | 1/2010 | Cane et al. |
| 7,668,350 B2 | 2/2010 | Rowe |
| 7,684,589 B2 | 3/2010 | Nilsen et al. |
| 7,724,379 B2 | 5/2010 | Kawasaki et al. |
| 7,729,747 B2 | 6/2010 | Stranc et al. |
| 7,735,729 B2 | 6/2010 | Rowe |
| 7,738,032 B2 | 6/2010 | Kollias et al. |
| 7,751,594 B2 | 7/2010 | Rowe et al. |
| 7,765,487 B2 | 7/2010 | Cable |
| 7,819,311 B2 | 10/2010 | Rowe et al. |
| 7,869,641 B2 | 1/2011 | Wetzel et al. |
| 7,876,948 B2 | 1/2011 | Wetzel et al. |
| 7,881,777 B2 | 2/2011 | Docherty et al. |
| 7,894,645 B2 | 2/2011 | Barsky |
| 7,912,320 B1 | 3/2011 | Minor |
| 7,912,534 B2 | 3/2011 | Grinvald et al. |
| 7,916,834 B2 | 3/2011 | Piorek et al. |
| 7,931,149 B2 | 4/2011 | Gilad et al. |
| 7,951,395 B2 | 5/2011 | Lee et al. |
| 8,000,776 B2 | 8/2011 | Gono |
| 8,019,801 B1 | 9/2011 | Robb et al. |
| 8,026,942 B2 | 9/2011 | Payonk et al. |
| 8,071,242 B2 | 12/2011 | Rosenfeld et al. |
| 8,078,262 B2 | 12/2011 | Murphy et al. |
| 8,094,294 B2 | 1/2012 | Treado et al. |
| 8,105,233 B2 | 1/2012 | Abou El Kheir |
| D653,687 S | 2/2012 | Yu |
| 8,123,704 B2 | 2/2012 | Richards |
| 8,150,500 B2 | 4/2012 | Goldman et al. |
| 8,161,826 B1 | 4/2012 | Taylor |
| 8,165,357 B2 | 4/2012 | Rowe |
| 8,184,873 B2 | 5/2012 | Rowe et al. |
| D662,122 S | 6/2012 | Goodwin |
| D664,655 S | 7/2012 | Daniel et al. |
| 8,213,695 B2 | 7/2012 | Zouridakis |
| 8,218,862 B2 | 7/2012 | Demirli et al. |
| 8,218,873 B2 | 7/2012 | Boncyk et al. |
| 8,218,874 B2 | 7/2012 | Boncyk et al. |
| 8,224,077 B2 | 7/2012 | Boncyk et al. |
| 8,224,078 B2 | 7/2012 | Boncyk et al. |
| 8,224,079 B2 | 7/2012 | Boncyk et al. |
| 8,229,185 B2 | 7/2012 | Ennis et al. |
| 8,238,623 B2 | 8/2012 | Stephan et al. |
| 8,306,334 B2 | 11/2012 | Paschalakis et al. |
| 8,326,031 B2 | 12/2012 | Boncyk et al. |
| 8,335,351 B2 | 12/2012 | Boncyk et al. |
| 8,437,544 B2 | 5/2013 | Boncyk et al. |
| 8,457,395 B2 | 6/2013 | Boncyk et al. |
| 8,463,030 B2 | 6/2013 | Boncyk et al. |
| 8,463,031 B2 | 6/2013 | Boncyk et al. |
| 8,465,762 B2 | 6/2013 | Lee et al. |
| 8,467,600 B2 | 6/2013 | Boncyk et al. |
| 8,467,602 B2 | 6/2013 | Boncyk et al. |
| 8,478,036 B2 | 7/2013 | Boncyk et al. |
| 8,478,037 B2 | 7/2013 | Boncyk et al. |
| 8,480,641 B2 | 7/2013 | Jacobs |
| 8,488,880 B2 | 7/2013 | Boncyk et al. |
| 8,494,264 B2 | 7/2013 | Boncyk et al. |
| 8,498,460 B2 | 7/2013 | Patwardhan |
| 8,520,942 B2 | 8/2013 | Boncyk et al. |
| 8,533,879 B1 | 9/2013 | Taylor |
| 8,548,245 B2 | 10/2013 | Boncyk et al. |
| 8,548,278 B2 | 10/2013 | Boncyk et al. |
| 8,582,817 B2 | 11/2013 | Boncyk et al. |
| 8,588,476 B1 | 11/2013 | Spicola, Jr. |
| 8,588,527 B2 | 11/2013 | Boncyk et al. |
| D697,210 S | 1/2014 | Delaney et al. |
| 8,638,986 B2 | 1/2014 | Jiang et al. |
| 8,661,915 B2 | 3/2014 | Taylor |
| 8,712,193 B2 | 4/2014 | Boncyk et al. |
| 8,718,410 B2 | 5/2014 | Boncyk et al. |
| 8,734,342 B2 | 5/2014 | Cable |
| 8,755,053 B2 | 6/2014 | Fright et al. |
| 8,768,052 B2 | 7/2014 | Kawano |
| 8,773,508 B2 | 7/2014 | Daniel et al. |
| 8,774,463 B2 | 7/2014 | Boncyk et al. |
| 8,787,621 B2 | 7/2014 | Spicola, Sr. et al. |
| 8,787,630 B2 | 7/2014 | Rowe |
| 8,795,169 B2 | 8/2014 | Cosentino et al. |
| 8,798,368 B2 | 8/2014 | Boncyk et al. |
| 8,800,386 B2 | 8/2014 | Taylor |
| 8,814,841 B2 | 8/2014 | Hartwell |
| 8,824,738 B2 | 9/2014 | Boncyk et al. |
| 8,837,868 B2 | 9/2014 | Boncyk et al. |
| 8,842,941 B2 | 9/2014 | Boncyk et al. |
| 8,849,380 B2 | 9/2014 | Patwardhan |
| D714,940 S | 10/2014 | Kim |
| 8,855,423 B2 | 10/2014 | Boncyk et al. |
| 8,861,859 B2 | 10/2014 | Boncyk et al. |
| 8,867,839 B2 | 10/2014 | Boncyk et al. |
| 8,873,891 B2 | 10/2014 | Boncyk et al. |
| 8,875,331 B2 | 11/2014 | Taylor |
| 8,885,983 B2 | 11/2014 | Boncyk et al. |
| 8,892,190 B2 | 11/2014 | Docherty et al. |
| 8,904,876 B2 | 12/2014 | Taylor et al. |
| 8,913,800 B2 | 12/2014 | Rowe |
| 8,923,563 B2 | 12/2014 | Boncyk et al. |
| D720,864 S | 1/2015 | Behar et al. |
| 8,938,096 B2 | 1/2015 | Boncyk et al. |
| 8,939,918 B2 | 1/2015 | Richards |
| 8,948,459 B2 | 2/2015 | Boncyk et al. |
| 8,948,460 B2 | 2/2015 | Boncyk et al. |
| D724,216 S | 3/2015 | Gant et al. |
| 8,997,588 B2 | 4/2015 | Taylor |
| 9,014,513 B2 | 4/2015 | Boncyk et al. |
| 9,014,514 B2 | 4/2015 | Boncyk et al. |
| 9,014,515 B2 | 4/2015 | Boncyk, V et al. |
| 9,020,305 B2 | 4/2015 | Boncyk et al. |
| 9,025,813 B2 | 5/2015 | Boncyk et al. |
| 9,025,814 B2 | 5/2015 | Boncyk et al. |
| 9,031,278 B2 | 5/2015 | Boncyk et al. |
| 9,036,947 B2 | 5/2015 | Boncyk et al. |
| 9,036,948 B2 | 5/2015 | Boncyk et al. |
| 9,041,810 B2 | 5/2015 | Ecker et al. |
| D735,879 S | 8/2015 | Behar et al. |
| 9,110,925 B2 | 8/2015 | Boncyk et al. |
| 9,116,920 B2 | 8/2015 | Boncyk et al. |
| 9,135,355 B2 | 9/2015 | Boncyk et al. |
| 9,141,714 B2 | 9/2015 | Boncyk et al. |
| 9,148,562 B2 | 9/2015 | Boncyk et al. |
| D740,945 S | 10/2015 | Booth |
| 9,154,694 B2 | 10/2015 | Boncyk et al. |
| 9,154,695 B2 | 10/2015 | Boncyk et al. |
| 9,167,800 B2 | 10/2015 | Spicola, Jr. |
| 9,179,844 B2 | 11/2015 | Fright et al. |
| 9,186,053 B2 | 11/2015 | Viola |
| 9,196,067 B1 | 11/2015 | Freed |

(56) References Cited

U.S. PATENT DOCUMENTS

| | | |
|---|---|---|
| 9,224,205 B2 | 12/2015 | Tsin et al. |
| 9,235,600 B2 | 1/2016 | Boncyk et al. |
| 9,244,943 B2 | 1/2016 | Boncyk et al. |
| 9,262,440 B2 | 2/2016 | Boncyk et al. |
| 9,268,197 B1 | 2/2016 | Digregorio et al. |
| 9,285,323 B2 | 3/2016 | Burg et al. |
| 9,288,271 B2 | 3/2016 | Boncyk et al. |
| 9,311,520 B2 | 4/2016 | Burg et al. |
| 9,311,540 B2 | 4/2016 | Ecker et al. |
| 9,311,552 B2 | 4/2016 | Boncyk et al. |
| 9,311,553 B2 | 4/2016 | Boncyk et al. |
| 9,311,554 B2 | 4/2016 | Boncyk et al. |
| 9,317,769 B2 | 4/2016 | Boncyk et al. |
| 9,324,004 B2 | 4/2016 | Boncyk et al. |
| 9,330,326 B2 | 5/2016 | Boncyk et al. |
| 9,330,327 B2 | 5/2016 | Boncyk et al. |
| 9,330,328 B2 | 5/2016 | Boncyk et al. |
| 9,330,453 B2 | 5/2016 | Soldatitsch et al. |
| 9,342,748 B2 | 5/2016 | Boncyk et al. |
| D758,608 S | 6/2016 | Behar et al. |
| 9,377,295 B2 | 6/2016 | Fright et al. |
| 9,395,234 B2 | 7/2016 | Cosentino et al. |
| 9,399,676 B2 | 7/2016 | Schurpf et al. |
| 9,438,775 B2 | 9/2016 | Powers |
| 9,451,928 B2 | 9/2016 | Falco et al. |
| 9,525,867 B2 | 12/2016 | Thomas et al. |
| 9,528,941 B2 | 12/2016 | Burg et al. |
| 9,607,380 B2 | 3/2017 | Burg et al. |
| D783,838 S | 4/2017 | Zhao et al. |
| 9,684,815 B2 * | 6/2017 | Walch ............... G06V 40/1359 |
| 9,690,904 B1 | 6/2017 | Zizi |
| 9,697,415 B2 * | 7/2017 | Jo ............................. G06T 7/73 |
| 9,730,629 B2 * | 8/2017 | White ................. A61B 5/4337 |
| 9,808,206 B1 | 11/2017 | Zhao et al. |
| 9,818,193 B2 | 11/2017 | Smart |
| 9,824,271 B2 * | 11/2017 | Whritenor ................ G06T 5/00 |
| 9,861,285 B2 | 1/2018 | Fright et al. |
| 9,863,811 B2 | 1/2018 | Burg |
| 9,955,910 B2 | 5/2018 | Fright et al. |
| 9,958,383 B2 | 5/2018 | Hall et al. |
| 9,972,077 B2 | 5/2018 | Adiri et al. |
| 9,996,923 B2 | 6/2018 | Thomas |
| 10,013,527 B2 | 7/2018 | Fairbairn et al. |
| D827,827 S | 9/2018 | Canfield et al. |
| 10,068,329 B2 | 9/2018 | Adiri et al. |
| D831,197 S | 10/2018 | Scruggs et al. |
| 10,117,617 B2 | 11/2018 | Cantu et al. |
| 10,130,260 B2 | 11/2018 | Patwardhan |
| 10,143,425 B1 | 12/2018 | Zhao et al. |
| D837,388 S | 1/2019 | Dacosta et al. |
| 10,267,743 B2 | 4/2019 | Burg et al. |
| 10,307,382 B2 | 6/2019 | Jung et al. |
| 10,362,984 B2 | 7/2019 | Adiri et al. |
| 10,368,795 B2 | 8/2019 | Patwardhan |
| 10,426,402 B2 * | 10/2019 | Shi .......................... A61B 5/742 |
| 10,559,081 B2 | 2/2020 | Omer et al. |
| D877,931 S | 3/2020 | Dacosta et al. |
| 10,607,340 B2 | 3/2020 | Kim et al. |
| 10,614,623 B2 | 4/2020 | D'alessandro |
| 10,617,305 B2 | 4/2020 | Patwardhan et al. |
| 10,652,520 B2 | 5/2020 | Otto et al. |
| 10,674,953 B2 | 6/2020 | Baker et al. |
| 10,692,214 B2 | 6/2020 | Bisker |
| 10,702,160 B2 | 7/2020 | Patwardhan |
| 10,775,647 B2 | 9/2020 | Joy et al. |
| 10,777,317 B2 | 9/2020 | Fairbair et al. |
| D898,921 S | 10/2020 | Dacosta et al. |
| D899,604 S | 10/2020 | Dacosta et al. |
| 10,835,204 B2 * | 11/2020 | Caluser ............... A61B 8/5238 |
| D903,863 S | 12/2020 | Dacosta et al. |
| 10,874,302 B2 | 12/2020 | Fright et al. |
| 10,880,488 B2 | 12/2020 | Tashayyod et al. |
| 10,940,328 B2 | 3/2021 | Lv et al. |
| 11,116,407 B2 | 9/2021 | Dickie et al. |
| 11,134,848 B2 | 10/2021 | Bala et al. |
| 11,138,707 B2 | 10/2021 | Yeo et al. |
| 11,250,945 B2 | 2/2022 | Fairbairn et al. |
| 11,315,245 B2 | 4/2022 | Moore |
| 2002/0054297 A1 | 5/2002 | Lee et al. |
| 2002/0149585 A1 | 10/2002 | Kacyra et al. |
| 2002/0197600 A1 | 12/2002 | Maione et al. |
| 2003/0004405 A1 | 1/2003 | Townsend et al. |
| 2003/0006770 A1 | 1/2003 | Smith |
| 2003/0031383 A1 | 2/2003 | Gooch |
| 2003/0036751 A1 | 2/2003 | Anderson et al. |
| 2003/0085908 A1 | 5/2003 | Luby |
| 2003/0164841 A1 | 9/2003 | Myers |
| 2003/0164875 A1 | 9/2003 | Myers |
| 2003/0229514 A2 | 12/2003 | Brown |
| 2003/0231793 A1 | 12/2003 | Crampton |
| 2004/0013292 A1 | 1/2004 | Raunig |
| 2004/0014165 A1 | 1/2004 | Keidar et al. |
| 2004/0059199 A1 | 3/2004 | Thomas et al. |
| 2004/0080497 A1 | 4/2004 | Enmei |
| 2004/0117343 A1 | 6/2004 | Johnson |
| 2004/0136579 A1 | 7/2004 | Gutenev |
| 2004/0146290 A1 | 7/2004 | Kollias et al. |
| 2004/0201694 A1 | 10/2004 | Gartstein et al. |
| 2004/0225222 A1 | 11/2004 | Zeng et al. |
| 2004/0264749 A1 | 12/2004 | Skladnev et al. |
| 2005/0012817 A1 | 1/2005 | Hampapur et al. |
| 2005/0027567 A1 | 2/2005 | Taha |
| 2005/0033142 A1 | 2/2005 | Madden et al. |
| 2005/0084176 A1 | 4/2005 | Talapov et al. |
| 2005/0094262 A1 | 5/2005 | Spediacci et al. |
| 2005/0111757 A1 | 5/2005 | Brackett et al. |
| 2005/0154276 A1 | 7/2005 | Barducci et al. |
| 2005/0190988 A1 | 9/2005 | Feron |
| 2005/0237384 A1 | 10/2005 | Jess et al. |
| 2005/0259281 A1 | 11/2005 | Boust |
| 2005/0273011 A1 | 12/2005 | Hattery et al. |
| 2005/0273267 A1 | 12/2005 | Maione |
| 2006/0008178 A1 | 1/2006 | Seeger et al. |
| 2006/0012802 A1 | 1/2006 | Shirley |
| 2006/0036135 A1 | 2/2006 | Kern |
| 2006/0036156 A1 | 2/2006 | Lachaine et al. |
| 2006/0044546 A1 | 3/2006 | Lewin et al. |
| 2006/0055943 A1 | 3/2006 | Kawasaki et al. |
| 2006/0058665 A1 | 3/2006 | Chapman |
| 2006/0072122 A1 | 4/2006 | Hu et al. |
| 2006/0073132 A1 | 4/2006 | Congote |
| 2006/0089553 A1 | 4/2006 | Cotton |
| 2006/0098876 A1 | 5/2006 | Buscema |
| 2006/0135953 A1 | 6/2006 | Kania et al. |
| 2006/0151601 A1 | 7/2006 | Rosenfeld |
| 2006/0159341 A1 | 7/2006 | Pekar et al. |
| 2006/0204072 A1 | 9/2006 | Wetzel et al. |
| 2006/0210132 A1 | 9/2006 | Christiansen et al. |
| 2006/0222263 A1 | 10/2006 | Carlson |
| 2006/0268148 A1 | 11/2006 | Kollias et al. |
| 2006/0269125 A1 | 11/2006 | Kalevo et al. |
| 2006/0293613 A1 | 12/2006 | Fatehl et al. |
| 2007/0065009 A1 | 3/2007 | Ni et al. |
| 2007/0097381 A1 | 5/2007 | Tobiason et al. |
| 2007/0125390 A1 | 6/2007 | Afriat et al. |
| 2007/0129602 A1 | 6/2007 | Bettesh et al. |
| 2007/0229850 A1 | 10/2007 | Herber |
| 2007/0273894 A1 | 11/2007 | Johnson |
| 2007/0276195 A1 | 11/2007 | Xu et al. |
| 2007/0276309 A1 | 11/2007 | Xu et al. |
| 2008/0006282 A1 | 1/2008 | Sukovic |
| 2008/0021329 A1 | 1/2008 | Wood et al. |
| 2008/0045807 A1 | 2/2008 | Psota et al. |
| 2008/0088704 A1 | 4/2008 | Wendelken et al. |
| 2008/0098322 A1 | 4/2008 | Champion et al. |
| 2008/0126478 A1 | 5/2008 | Ferguson et al. |
| 2008/0165357 A1 | 7/2008 | Stem |
| 2008/0232679 A1 | 9/2008 | Hahn |
| 2008/0246759 A1 | 10/2008 | Summers |
| 2008/0275315 A1 | 11/2008 | Oka et al. |
| 2008/0285056 A1 | 11/2008 | Blayvas |
| 2008/0312642 A1 | 12/2008 | Kania et al. |
| 2008/0312643 A1 | 12/2008 | Kania et al. |
| 2009/0116712 A1 | 5/2009 | Al-Moosawi et al. |

(56) References Cited

U.S. PATENT DOCUMENTS

| | | |
|---|---|---|
| 2009/0118720 A1 | 5/2009 | Black et al. |
| 2009/0221874 A1 | 9/2009 | Vinther |
| 2009/0225333 A1 | 9/2009 | Bendall |
| 2009/0234313 A1 | 9/2009 | Mullejeans et al. |
| 2010/0004564 A1 | 1/2010 | Jendle |
| 2010/0020164 A1 | 1/2010 | Perrault |
| 2010/0091104 A1 | 4/2010 | Sprigle et al. |
| 2010/0111387 A1 | 5/2010 | Christiansen, II et al. |
| 2010/0113940 A1 | 5/2010 | Sen et al. |
| 2010/0121201 A1 | 5/2010 | Papaioannou |
| 2010/0149551 A1 | 6/2010 | Malinkevich |
| 2010/0156921 A1 | 6/2010 | McLennan et al. |
| 2010/0191126 A1 | 7/2010 | Al-Moosawi et al. |
| 2010/0278312 A1 | 11/2010 | Ortiz |
| 2011/0032349 A1 | 2/2011 | San Matias et al. |
| 2011/0102550 A1 | 5/2011 | Daniel et al. |
| 2011/0125028 A1 | 5/2011 | Wood et al. |
| 2011/0190637 A1 | 8/2011 | Knobel et al. |
| 2012/0035469 A1 | 2/2012 | Whelan et al. |
| 2012/0059266 A1 | 3/2012 | Davis et al. |
| 2012/0078088 A1 | 3/2012 | Whitestone et al. |
| 2012/0078113 A1 | 3/2012 | Whitestone et al. |
| 2012/0226152 A1 | 9/2012 | Porikli |
| 2012/0253200 A1 | 10/2012 | Stolka et al. |
| 2012/0265236 A1 | 10/2012 | Wesselmann |
| 2012/0275668 A1 | 11/2012 | Chou et al. |
| 2013/0051651 A1 | 2/2013 | Leary et al. |
| 2013/0162796 A1 | 6/2013 | Bharara et al. |
| 2013/0335545 A1 | 12/2013 | Darling |
| 2014/0048687 A1 | 2/2014 | Drzymala et al. |
| 2014/0088402 A1 | 3/2014 | Xu |
| 2014/0354830 A1 | 12/2014 | Schafer et al. |
| 2015/0077517 A1 | 3/2015 | Powers |
| 2015/0089994 A1 | 4/2015 | Richards |
| 2015/0142462 A1 | 5/2015 | Vaidya et al. |
| 2015/0150457 A1 | 6/2015 | Wu et al. |
| 2015/0214993 A1 | 7/2015 | Huang |
| 2015/0250416 A1 | 9/2015 | LaPlante et al. |
| 2015/0265236 A1 | 9/2015 | Garner et al. |
| 2015/0270734 A1 | 9/2015 | Davison et al. |
| 2016/0100790 A1 | 4/2016 | Cantu et al. |
| 2016/0157725 A1 | 6/2016 | Munoz |
| 2016/0178512 A1 | 6/2016 | Hall et al. |
| 2016/0206205 A1 | 7/2016 | Wu et al. |
| 2016/0259992 A1 | 9/2016 | Knodt et al. |
| 2016/0261133 A1 | 9/2016 | Wang |
| 2016/0262659 A1 | 9/2016 | Fright et al. |
| 2016/0275681 A1 | 9/2016 | D'alessandro |
| 2016/0284084 A1 | 9/2016 | Gurcan et al. |
| 2016/0338594 A1 | 11/2016 | Spahn et al. |
| 2017/0076446 A1 | 3/2017 | Pedersen et al. |
| 2017/0079577 A1 | 3/2017 | Fright et al. |
| 2017/0084024 A1 | 3/2017 | Gurevich |
| 2017/0085764 A1 | 3/2017 | Kim et al. |
| 2017/0086940 A1 | 3/2017 | Nakamura |
| 2017/0127196 A1 | 5/2017 | Blum et al. |
| 2017/0236273 A1 | 8/2017 | Kim et al. |
| 2017/0258340 A1 | 9/2017 | Przybyszewski et al. |
| 2017/0262985 A1 | 9/2017 | Finn et al. |
| 2017/0303790 A1 | 10/2017 | Bala et al. |
| 2017/0303844 A1 | 10/2017 | Baker et al. |
| 2018/0132726 A1 | 5/2018 | Dickie et al. |
| 2018/0214071 A1 | 8/2018 | Fright et al. |
| 2018/0252585 A1 | 9/2018 | Burg |
| 2018/0279943 A1 | 10/2018 | Budman et al. |
| 2018/0296092 A1 | 10/2018 | Hassan et al. |
| 2018/0303413 A1 | 10/2018 | Hassan et al. |
| 2018/0322647 A1 | 11/2018 | Harrington et al. |
| 2018/0336720 A1 | 11/2018 | Larkins et al. |
| 2019/0133513 A1 | 5/2019 | Patwardhan |
| 2019/0240166 A1 | 8/2019 | Jung et al. |
| 2019/0273890 A1 | 9/2019 | Christiansen, II et al. |
| 2019/0290187 A1 | 9/2019 | Ariri et al. |
| 2019/0298183 A1 | 10/2019 | Burg et al. |
| 2019/0298252 A1 | 10/2019 | Patwardhan |
| 2019/0307337 A1 | 10/2019 | Little et al. |
| 2019/0307400 A1 | 10/2019 | Zhao et al. |
| 2019/0310203 A1 | 10/2019 | Burg et al. |
| 2019/0336003 A1 | 11/2019 | Patwardhan |
| 2019/0350535 A1 | 11/2019 | Zhao et al. |
| 2019/0369418 A1 | 12/2019 | Joy et al. |
| 2020/0014910 A1 | 1/2020 | Larkins |
| 2020/0121245 A1 | 4/2020 | Barclay et al. |
| 2020/0126226 A1 | 4/2020 | Adiri et al. |
| 2020/0126227 A1 | 4/2020 | Adiri et al. |
| 2020/0196962 A1 | 6/2020 | Zhao et al. |
| 2020/0209214 A1 | 7/2020 | Zohar et al. |
| 2020/0211193 A1 | 7/2020 | Adiri et al. |
| 2020/0211228 A1 | 7/2020 | Adiri et al. |
| 2020/0211682 A1 | 7/2020 | Zohar et al. |
| 2020/0211693 A1 | 7/2020 | Adiri et al. |
| 2020/0211697 A1 | 7/2020 | Adiri et al. |
| 2020/0225166 A1 | 7/2020 | Burg et al. |
| 2020/0234444 A1 | 7/2020 | Budman et al. |
| 2020/0286600 A1 | 9/2020 | De Brouwer et al. |
| 2020/0297213 A1 | 9/2020 | Patwardhan |
| 2020/0359971 A1 | 11/2020 | Zhao et al. |
| 2020/0364862 A1 | 11/2020 | Dacosta et al. |
| 2020/0383631 A1 | 12/2020 | Canfield et al. |
| 2021/0000387 A1 | 1/2021 | Zizi |
| 2021/0004995 A1 | 1/2021 | Burg et al. |
| 2021/0068664 A1 | 3/2021 | Fright et al. |
| 2021/0219907 A1 | 7/2021 | Fright et al. |
| 2021/0386295 A1 | 12/2021 | Dickie et al. |
| 2022/0270746 A1 | 8/2022 | Fairbairn et al. |

FOREIGN PATENT DOCUMENTS

| | | |
|---|---|---|
| DE | 2642841 | 3/1978 |
| DE | 3420588 | 12/1984 |
| DE | 4120074 | 1/1992 |
| EP | 355221 | 2/1990 |
| EP | 552526 | 7/1993 |
| EP | 650694 | 5/1995 |
| EP | 1210906 | 6/2002 |
| EP | 1248237 | 10/2002 |
| EP | 1351036 | 10/2003 |
| EP | 1303267 | 4/2004 |
| EP | 1584405 | 10/2005 |
| EP | 1611543 | 1/2006 |
| EP | 1467706 | 3/2007 |
| EP | 1946567 | 7/2008 |
| EP | 119660 | 5/2009 |
| EP | 2272047 | 3/2012 |
| EP | 2883037 | 6/2015 |
| EP | 3114462 | 1/2017 |
| EP | 3143378 | 3/2017 |
| EP | 3160327 | 5/2017 |
| EP | 2750673 | 8/2017 |
| EP | 3251332 | 12/2017 |
| EP | 3270770 | 1/2018 |
| EP | 3286695 | 2/2018 |
| EP | 3364859 | 8/2018 |
| EP | 3365057 | 8/2018 |
| EP | 3371779 | 9/2018 |
| EP | 3371780 | 9/2018 |
| EP | 3381015 | 11/2019 |
| EP | 3586195 | 1/2020 |
| EP | 3589187 | 1/2020 |
| EP | 3602501 | 2/2020 |
| EP | 3555856 | 4/2020 |
| EP | 3655924 | 5/2020 |
| EP | 3371781 | 9/2020 |
| EP | 3707670 | 9/2020 |
| EP | 4183328 | 5/2023 |
| ES | 2384086 | 6/2012 |
| FR | 2570206 | 3/1986 |
| GB | 2458927 | 11/2012 |
| GB | 2544263 | 5/2017 |
| GB | 2544460 | 5/2017 |
| GB | 2544725 | 5/2017 |
| GB | 2545394 | 6/2017 |
| GB | 2557633 | 6/2018 |
| GB | 2557928 | 7/2018 |

(56) References Cited

FOREIGN PATENT DOCUMENTS

| | | |
|---|---|---|
| GB | 2559977 | 8/2018 |
| GB | 2559978 | 8/2018 |
| JP | 2011516849 | 5/2011 |
| JP | 5467404 | 4/2014 |
| NZ | 293713 | 9/1997 |
| NZ | 588740 | 7/2012 |
| WO | 2000003210 | 1/2000 |
| WO | 2000030337 | 5/2000 |
| WO | 2002001143 | 1/2002 |
| WO | 2002065069 | 8/2002 |
| WO | 2002093450 | 11/2002 |
| WO | 2004092874 | 10/2004 |
| WO | 2004095372 | 11/2004 |
| WO | 2005033620 | 4/2005 |
| WO | 2006078902 | 7/2006 |
| WO | 2007029038 | 3/2007 |
| WO | 2007043899 | 4/2007 |
| WO | 2007059780 | 5/2007 |
| WO | 2008033010 | 3/2008 |
| WO | 2008039539 | 4/2008 |
| WO | 2008048424 | 4/2008 |
| WO | 2008057056 | 5/2008 |
| WO | 2008071414 | 6/2008 |
| WO | 2008080385 | 7/2008 |
| WO | 2009046218 | 4/2009 |
| WO | 2009122200 | 10/2009 |
| WO | 2010048960 | 5/2010 |
| WO | 2012146720 | 11/2012 |
| WO | 2016069463 | 5/2016 |
| WO | 2016199134 | 12/2016 |
| WO | 2017077276 | 5/2017 |
| WO | 2017077277 | 5/2017 |
| WO | 2017077279 | 5/2017 |
| WO | 2017089826 | 6/2017 |
| WO | 2018109453 | 6/2018 |
| WO | 2018109479 | 6/2018 |
| WO | 2018154271 | 8/2018 |
| WO | 2018154272 | 8/2018 |
| WO | 2018185560 | 10/2018 |
| WO | 2019239106 | 12/2019 |
| WO | 2019239147 | 12/2019 |
| WO | 2020014779 | 1/2020 |
| WO | 2020141346 | 7/2020 |
| WO | 2020251938 | 12/2020 |

OTHER PUBLICATIONS

Afromowitz, et al., "Multispectral Imaging of Burn Wounds: A New Clinical Instrument for Evaluating Burn Depth", IEEE Transactions on Biomedical Engineering, vol. 35, No. 10, pp. 842-850; Oct. 1988.
Ahn et al., "Advances in Wound Photography and Assessment Methods," Advances in Skin & Wound Care, Feb. 2008, pp. 85-93.
Ahroni, JH et al., "Reliability of computerized wound surface area determinations" Wounds: A Compendium of Clinical Research and Practice, No. 4, (1992) 133-137.
Anderson, R., et al. "The Optics of Human Skin", The Journal of Investigative Dermatology, vol. 77, No. 1, pp. 13-19; Jul. 1981.
Armstrong, DG et al "Diabetic foot ulcers: prevention, diagnosis and classification" Am Fam Physician Mar. 15, 1998: 57 (6) :1325-32, 1337-8.
Bale, S, Harding K, Leaper D. An Introduction to Wounds. Emap Healthcare Ltd 2000.
Beaumont, E et al "RN Technology Scorecard: Wound Care Science at the Crossroads" American Journal of Nursing Dec. 1998 98(12):16-18, 20-21.
Bergstrom, N, Bennett MA, Carlson CE. Treatment of Pressure Ulcers: Clinical Practice Guideline No. 15. Rockville, MD: U.S. Department of Health and Human Services. Public Health Service, Agency for Health Care Policy and Research 1994: 95-0652: [O].
Berriss 1997: Automatic Quantitative Analysis of Healing Skin Wounds using Colour Digital Image Processing: William Paul Berriss, Stephen John Sangwine [E].

Binder, et al., "Application of an artificial neural network in epiluminescence microscopy pattern analysis of pigmented skin lesions: a pilot study", British Journal of Dermatology 130; pp. 460-465; 1994.
Bland, JM et al "Measurement error and correlation coefficients" BMJ Jul. 6, 1996: 313 (7048) :41-2.
Bland, JM et al "Measurement error" BMJ Jun. 29, 1996; 312 (7047) :1654.
Bohannon Richard; Barbara A Pfaller Documentation of Wound Surface Area from Tracings of Wound Perimeters [E].
Bolton, L., "Re Measuring Wound Length, Width, and Area: Which Technique?" Letters, Advances in Skin & Wound Care, pp. 450-452, vol. 21, No. 10.
Bostock, et al, Toward a neural network based system for skin cancer diagnosis; IEEE Conference on Artificial neural Networks, ISBN: 0-85296-573-7, pp. 215-219, May 1993.
BPG2005: Assessment and Management of Foot Ulcers for People with Diabetes:Nursing Best Practice Guidelines, Toronto, Ontario [E], Mar. 2013.
Briers, J.D., "Laser speckle contrast imaging for measuring blood flow," Optica Applicata, 2007, pp. 139-152, vol. XXXVII, No. 1-2.
Briggs Corporation: Managed care making photo documentation a wound care standard. Wound care solutions product catalog 1997.
Brown, G "Reporting outcomes for Stage IV pressure ulcer healing; a proposal" Adv Skin Wound Care (2000)13:277-83.
Callieri 2003: Callieri M, Cignoni P, Pingi P, Scopigno R. Derma: Monitoring the evolution of skin lesions with a 3D system, VMV 2003. 8th International Fall Workshop, Vision, Modeling, and Visualization 2003, Nov. 19-21, 2003, Munich, Germany [E].
Campana: XML-based synchronization of mobile medical devices [E], 2002, 2 Pages.
Cardinal et al., "Early healing rates and wound area measurements are reliable predictors of later complete wound closure," Wound Rep. Reg., 2008, pp. 19-22, vol. 16.
Cardinal et al., "Wound shape geometry measurements correlate to eventual wound healing," Wound Rep. Reg., 2009, pp. 173-178, vol. 17.
Cascinelli, N., et al. "Results obtained by using a computerized image analysis system designed as an aid to diagnosis of cutaneous melanoma", Melanoma Research, vol. 2, pp. 163-170, 1992.
Cleator et al., "Mobile wound care: Transforming care through technology," Rehab & Community Care Medicine, Winter 2008, pp. 14-15.
Collins, C et al "The Role of Ultrasound in Lower Extremity Wound Management" International Journal of Lower Extremity Wounds (2002) 1: 229-235.
Daubechies, I., "The Wavelet Transform, Time-Frequency Localization and Signal Analysis", IEEE Trans Inform Theory, vol. 36, No. 5, pp. 961-1005; Sep. 1990.
De Vet, HC et al "Current challenges in clinimetrics" J Clin Epidemiol Dec 2003; 56 (12) :1137-41.
De Vet, H C., et al., "When to use agreement versus reliability measures", J Clin Eoidemiol 59 (10), (Oct. 2006), 1033-9.
Debray, M., Couturier P, Greuillet F, Hohn C, Banerjee S, Gavazzi G, Franco A. "A preliminary study of the feasibility of wound telecare for the elderly." Journal of Telemedicine & Telecare 2001: 7(6): 353-8. [A].
Dowsett, C. et al., "Triangle of Wound Assessment—made easy", Wounds Asia (www.woundasia.com), May 2015.
Duckworth et al., "A Clinically Affordable Non-Contact Wound Measurement Device," 2007, pp. 1-3.
Duff, et al. (2003), Loftus Hills A, Morrell C 2000 Clinical. Guidelines for the management of venous leg ulcers: Implementation Guide. Royal College of Nursing; 2000: 001 (213): 1-48. [E].
Ercal, F., "Detection of Skin Tumor Boundaries in Color Images", IEEE Transactions of Medical Imaging, vol. 12, No. 3, pp. 624-627, Sep. 1993.
Ercal, F., et al. "Neural Network Diagnosis of Malignant Melanoma From Color Images", IEEE Transactions of Biomedical Engineering, vol. 41, No. 9, pp. 837-845, Sep. 1994.
Ferrell, B "Pressure ulcers. Assessment of healing" Clin Geriatr Med (1997)13:575-87.

(56) References Cited

OTHER PUBLICATIONS

Fette, A.M., "A clinimetric analysis of wound measurement tools," World Wide Wounds, 2006, [retrieved on Jul. 26, 2006]. Retrieved from the Internet: <URL: http://www.worldwidewounds.com/2006/January/Fette/Clinimetric-Ana . . . >, 6 pages.

Fitzpatrick et al., "Evaluating patient-based outcome measures for use in clinical trials," Health Technology Assessment, 1998, vol. 2, No. 14, 86 pages.

Flahr et al., "Clinimetrics and Wound Science," Wound Care Canada, 2005, pp. 18-19, 48, vol. 3, No. 2.

Flanagan, M. "Improving accuracy of wound measurement in clinical practice" Ostomy Wound Manage Oct. 2003, 49(10):28-40.

Flanagan, M., "Wound measurement: can it help us to monitor progression to healing?" JWound Care May 2003, 12(5): 189-94.

Gethin et al., "Wound Measurement: the contribution to practice," EWMA Journal, 2007, pp. 26-28, vol. 7, No. 1.

Gilman, T "Wound outcomes: the utility of surface measures" Int J Low Extrem Wounds Sep. 2004; 3 (3) :125-32.

Goldman, RJ "The patientcom, 1 year later" Adv Skin Wound Care Nov.-Dec. 2002; 15 (6) :254, 256.

Goldman, RJ et al "More than one way to measure a wound: An overview of tools and techniques" Adv Skin Wound Care (2002) 15:236-45.

Golston, et al. "Automatic Detection of Irregular Borders in Melanoma and Other Skin Tumors", Computerized Medical Imaging and Graphics, vol. 16, No. 3, pp. 199-203, 1992.

Graaf, R., et al. "Optical properties of human dermis in vitro and in vivo", Applied Optics, vol. 32, No. 4, pp. 435-447, Feb. 1, 1993.

Greene, A., "Computer image analysis in the diagnosis of melanoma", Journal of the American Academy of Dermatology; vol. 31, No. 6, pp. 958-964, 1994.

Griffin, JW et al "A comparison of photographic and transparency-based methods for measuring wound surface area" Phys Ther Feb. 1993; 73 (2) :117-22.

Haghpanah et al., "Reliability of Electronic Versus Manual Wound Measurement Techniques," Arch Phys Med Rehabil, Oct. 2006, pp. 1396-1402, vol. 87.

Hansen 1997: Wound Status Evaluation Using Color Image Processing Gary: L. Hansen, Ephraim M. Sparrow, Jaydeep Y. Kokate, Keith J. Leland, and Paul A. Iaizzo [E].

Hayes 2003:Hayes S, Dodds, S. Digital photography in wound care. Nursing Times 2003:9(42):48-9. [A].

Herbin, et al, Color Quantitation Through Image Processing in Dermatology; IEEE Transaction on Medical Imaging, vol. 9, Issue 3, pp. 262-269, Sep. 1990.

Hibbs, P "The economics of pressure ulcer prevention" Decubitus Aug. 1988; 1 (3) :32-8.

Houghton 2000: Houghton PE, Kincaid CB, Campbell KE, Woodbury MG, Keast DH. Photographic assessment of the appearance of chronic pressure and leg ulcers. Ostomy Wound management 2000: 46(4): 20-6, 28-30. [A].

HSA Global, "Mobile Wound Care", Marketing material (2009).

Huang, C., et al."Border irregularity: atypical moles versus melanoma", Eur J Dermatol, vol. 6, pp. 270-273, Jun. 1996.

Iakovou, D. et al., "Integrated sensors for robotic laser welding," Proceedings of the Third International WLT-Conference on Lasers in Manufacturing, Jun. 2005, pp. 1-6.

International Search Report and Written Opinion for International Application No. PCT/US2004/028445 filed Sep. 1, 2004.

International Search Report and Written Opinion mailed Jan. 23, 2019, International Application No. PCT/IB2018/000447, 20 pages.

International Search Report and Written Opinion mailed Jul. 2, 2019, International Application No. PCT/IB2018/001572, 17 pages.

International Search Report and Written Opinion mailed Mar. 1, 2007, International Application No. PCT/NZ2006/000262, 12 pages.

Johnson, JD (1995) Using ulcer surface area and volume to document wound size, J Am Podiatr Med Assoc 85(2), (Feb. 1995), 91-5.

Jones, et al, An Instrument to Measure the Dimension of Skin Wounds; IEEE Transaction on Biomedical Engineering, ISSN: 0018-9294; vol. 42, Issue 5, pp. 464-470, May 1995.

Jones, TD "Improving the Precision of Leg Ulcer Area Measurement with Active Contour Models", PHD Thesis (1999) http://www.comp.glam.ac.uklpages/staff/tjones/ThesisOL/Title. Htm.

Jones, TD et al "An active contour model for measuring the area of leg ulcers" IEEE Trans Med Imaging Dec. 2000, 19(12):1202-10.

Kecelj-Leskovec et al., "Measurement of venous leg ulcers with a laser-based three-dimensional method: Comparison to computer planimetry with photography," Wound Rep Reg, 2007, pp. 767-771, vol. 15.

Kenet, R., et al. "Clinical Diagnosis of Pigmented Lesions Using Digital Epiluminescence Microscopy", Arch Dermatol, vol. 129, pp. 157-174; Feb. 1993.

Khashram et al., "Effect ofTNP on the microbiology of venous leg ulcers: a pilot study," J Wound Care, Apr. 2009, pp. 164-167, vol. 18, No. 4.

Kloth, LC et al "A Randomized Controlled Clinical Trial to Evaluate the Effects of Noncontact Normothermic Wound Therapy on Chronic Full-thickness Pressure Ulcers" Advances in Skin & Wound Care Nov./Dec. 2002, 15(6):270-276.

Korber et al., "Three-dimensional documentation of wound healing: First results of a new objective method for measurement," JDDG, Oct. 2006, (Band 4), pp. 848-854.

Koren, et al, Interactive Wavelet Processing and Techniques Applied to Digital Mammography; IEEE Conference Proceedings, ISBN: 0-7803-3192-3; vol. 3, pp. 1415-1418, May 1996.

Kovesi, P., "Image Features From Phase Congruency", University of Western Australia, pp. 1-30; Technical Report 9/4, Revised Jun. 1995.

Krouskop, TA et al "A noncontact wound measurement system" J Rehabil Res Dev May-Jun. 2002, 39(3):337-45.

Kumar et al., "Wound Image Analysis Classifier For Efficient Tracking Of Wound Healing Status," Signal & Image Processing: An International Journal (SIPIJ), vol. 5, No. 2, Apr. 2014, pp. 15-27.

Kundin 1989: Kudin JI. A new way to size up a wound. American Journal of Nursing 1989: (2):206-7.

Lakovou, D. et al., "Integrated sensors for robotic laser welding," Proceedings of the Third International WLT-Conference on Lasres in Manufacturing, Jun. 2005, pp. 1-6.

Langemo et al., "Measuring Wound Length, Width, and Area: Which Technique?", Advances in Skin & Wound Care, Jan. 2008, pp. 42-45, vol. 21, No. I.

Langemo, DK et al "Comparison of 2 Wound Volume Measurement Methods" Advances in Skin & Wound Care Jul./Aug. 2001, vol. 14(4), 190-196.

Langemo, DK et al "Two-dimensional wound measurement: comparison of 4 techniques" Advances in Wound Care Nov.-Dec. 1998, 11(7):337-43.

Laughton, C et al "A comparison of four methods of obtaining a negative impression of the foot" J Am Podiatr Med Assoc May 2002; 92 (5) :261-8.

Lee, et al, A Multi-stage Segmentation Method for Images of Skin Lesions; IEEE Conference Proceedings on Communication, Computers, and Signal Processing, ISBN 0-7803-2553-2, pp. 602-605, May 1995.

Levoy, et al. "The Digital Michelangelo Project: 3D Scanning Of Large Statues," ACM, 2000.

Lewis 1997: Lewis P, McCann R, Hidalgo P, Gorman M. Use of store and forward technology for vascular nursing teleconsultation service. Journal of Vascular Nursing 1997. 15(4): 116-23. [A].

Lewis, JS, Achilefu S, Garbow JR, Laforest R, Welch MJ., Small animal imaging. current technology and perspectives for oncological imaging, Radiation Sciences, Washington University School of Medicine, Saint Louis, MO, USA, Eur J Cancer. Nov. 2002;38(16):2173-88.

Li, D. 2004, Database design and implementation for wound measurement system. Biophotonics, 2004: 42-43. [E].

Liu et al., "Wound measurement by curvature maps: a feasibility study," Physiol. Meas., 2006, pp. I 107-1123, vol. 27.

Lorimer, K "Continuity through best practice: design and implementation of a nurse-led community leg-ulcer service" Can J Nurs Res Jun. 2004, 36(2): 105-12.

(56) References Cited

OTHER PUBLICATIONS

Lowery et al., "Technical Overview of a Web-based Telemedicine System for Wound Assessment," Advances in Skin & Wound Care, Jul./Aug. 2002, pp. 165-169, vol. 15, No. 4.

Lowson, S., "The safe practitioner: Getting the record straight: the need for accurate documentation," J Wound Care, Dec. 2004, vol. 13, No. 10, [retrieved on Dec. 17, 2004). Retrieved from the Internet: <URL: http://www.journalofwoundcare.com/nav?page=jowc.article&resource=1455125>, 2 pages.

Lucas, C., "Pressure ulcer surface area measurement using instant full-scale photography and transparency tracings," Advances in Skin & Wound Care, Jan./Feb. 2002, [retrieved on Jul. 28, 2006]. Retrieved from the Internet: <URL: http://www.findarticles.com/p/articles/mi _qa3977/is_200201 /al_n904 . . . >, 7 pages.

Lunt, M.J., "Review of duplex and colour Doppler imaging of lower-limb arteries and veins," World Wide Wounds, 2000, [retrieved on Apr. 17, 2005]. Retrieved from the Internet: <URL: http://www.worldwidewounds.com/2000/sept/Michael-Lunt/Dopple . . . >, 6 pages.

Maglogiannis et al., "A system for the acquisition of reproducible digital skin lesions images," Technol and Health Care, 2003, pp. 425-441, vol. 11.

Malian et al., "MEDPHOS: A New Photogrammetric System for Medical Measurement," 2004, Commission V, WG V/3, 6 pages.

Mallat. S., et al. "Characterization of signals from multiscale edges", IEEE Trans Patt and Mech Int'l; 14:710-732; 1992.

Marchesini, R., et al. "In vivo Spectrophotometric Evaluation of Neoplastic and Non-Neoplastic Skin Pigmented Lesions. III. CCD Camera-Based Reflectance Imaging", Photochemistry and Photobiology, vol. 62, No. 1, pp. 151-154; 1995.

Marjanovic et al., "Measurement of the volume of a leg ulcer using a laser scanner," Physiol. Meas., 1998, pp. 535-543, vol. 19.

Mashburn et al., "Enabling user-guided segmentation and tracking of surface-labeled cells in time-lapse image sets of living tissues," Cytometry A., NIH Public Access, May 1, 2013, pp. 1-17.

Mastronjcola et al., "Burn Depth Assessment Using a Tri-stimulus Colorimeter," Wounds—ISSN: I044-7946, Sep. 2005, pp. 255-258, vol. 17, No. 9.

McCardle, J., "Visitrak: wound measurement as an aid to making treatment decisions," The Diabetic Foot, Winter 2005, [retrieved on Mar. 30, 2008). Retrieved from the Internet: <URL: http://findarticles.com/p/articles/mi_mOMDQ/is_4_8/ai_n16043804/print>, 4 pages.

Menzies, S., "The Morphologic Criteria of the Pseudopod in Surface Microscopy", Arch Dermatol, vol. 131, pp. 436-440, Apr. 1995.

Molnar et al., "Use of Standardized, Quantitative Digital Photography in a Multicenter Web-based Study," 2009, ePlasty, pp. 19-26, vol. 9.

Nachbar, et al., "The ABCD rule of dermatology", Journal of the American Academy of Dermatology, vol. 3, No. 4, pp. 551-559, Apr. 1994.

National Pressure Ulcer Advisory Panel, "FAQ: Photography for pressure ulcer documentation," 1 1P56, 4 pages.

National Pressure Ulcer Advisory Panel, Position Statement, 1998, [retrieved on Jan. 6, 2005]. Retrieved from the Internet: <URL: http://www.npuap.org/>, 2 pages (Pressure Ulcer Healing Chart attached, 2 pages).

Oduncu et al., "Analysis of Skin Wound Images Using Digital Color Image Processing: A Preliminary Communication," Lower Extremity Wounds, 2004, pp. 151-156, vol. 3, No. 3.

Pages, Jordi, et al., "Plane-to-plane positioning from image-based visual serving and structured light," Proceedings of 2004 IEEE/RSJ International Conference on Intelligent Robots and Systems, Sep. 28-Oct. 2, 2004, pp. 1004-1009.

Patete et al., "A non-invasive, three-dimensional, diagnostic laser imaging system for accurate wound analysis," Physiol. Meas., 1996, pp. 71-79, vol. 17.

Payne, C., "Cost benefit comparison of plaster casts and optical scans of the foot for the manufacture of foot orthoses," AJPM, 2007, pp. 29-31, vol. 41, No. 2.

Pehamberger, H., et al. "In vivo epiluminescence microscopy of pigmented skin lesions. I. Pattern analysis of pigmented skin lesions", Journal of American Academy of Dermatology, vol. 17, No. 4, pp. 571-583, Oct. 1987.

Plassman, et al. "Problems of Assessing Wound Size," Would healing Research Unit, University of Wales College of Medicine, Cardiff CF4 4XN, Wales, UK (1993) (Unpublished).

Plassmann et al., "MAVIS: a non-invasive instrument to measure area and volume of wounds," Medical Engineering & Physics, 1998, pp. 332-338, vol. 20.

Plassmann, P., "Recording Wounds—Documenting Woundcare," Medical Computing Group, 1998, pp. 1-31.

Plaza et al., "Minimizing Manual Image Segmentation Turn-Around Time for Neuronal Reconstruction by Embracing Uncertainty," Plos One, vol. 7, Issue 9, Sep. 2012, pp. 1-14.

Rogers et al., "Measuring Wounds: Which Stick to Use?", Podiatry Management, Aug. 2008, pp. 85-90.

Romanelli et al., "Technological Advances in Wound Bed Measurements," Wounds, 2002, pp. 58-66, vol. 14, No. 2, [retrieved on Apr. 8, 2005]. Retrieved from the Internet: <URL: http:/lwww.medscape.com/viewarticle/430900 _print>, 8 pages.

Russell, L., "The importance of wound documentation & classification," British J Nursing, 1999, pp. 1342-1354, vol. 8, No. 20.

Salcido, R., "The Future of Wound Measurement," Advances in Skin & Wound Care, Mar./Apr. 2003, pp. 54, 56, vol. 13, No. 2.

Salcido, R., "Pressure Ulcers and Wound Care," Physical Medicine and Rehabilitation, eMedicine, 2006, [retrieved on]. Retrieved from the Internet: <URL: http://www.emedicine.com/pmr/topic 179.htm>, 25 pages.

Salmhofer, et al., "Wound teleconsultation in patients with chronic leg ulcers," 2005.

Sani-Kick et al., "Recording and Transmission of Digital Wound Images with the Help of a Mobile Device," 2002, 2 pages.

Santamaria et al., "The effectiveness of digital imaging and remote expert wound consultation on healing rates in chronic lower leg ulcers in the Kimberley region of Western Australia," Primary Intention, May 2004, pp. 62-70, vol. 12, No. 2.

Schindewolf, et al. "Comparison of classification rates for conventional and dermatoscopic images of malignant and benign melanocytic lesions using computerized colour image analysis", Eur J Dermatol, vol. 3, No. 4, pp. 299-303, May 1993.

Schindewolf, T., et al. "Classification of Melanocytic Lesions with Color and Texture Analysis Using Digital Image Processing", The International Academy of Cytology, Analytical and Quantitative Cytology and Histology, vol. 15, No. 1, pp. 1-11, Feb. 1993.

Schindewolf, T., et al. "Evaluation of different image acquisition techniques for a computer vision system in the diagnosis of malignant melanoma", Journal of the American Academy of Dermatology, vol. 31, No. 1, pp. 33-41, Jul. 1994.

Schultz et al., "Wound bed preparation: a systematic approach to wound management," Wound Repair and Regeneration, Mar./Apr. 2003, p. SI-S28, vol. 1 1, No. 2, Supplement.

Shaw et al., "An Evaluation of Three Wound Measurement Techniques in Diabetic Foot Wounds," Diabetes Care, 2007, [retrieved on Mar. 30, 2008]. Retrieved from the Internet: <URL: http://care.diabetesjournals.org/cgi/content/full/30/ 1 0/2641?ck=nck>, 5 pages.

Sheehan et al., "Percent Change in Wound Area of Diabetic Foot Ulcers Over a 4-Week Period Is a Robust Predictor of Complete Healing in a 12-Week Prospective Trial," Diabetes Care, Jun. 2003, pp. 1879-1882, vol. 26, No. 6.

Sheng, Chao, Brian W. Pogue, Hamid Dehghani, Julia A. O'Hara, P. J. Hoopes, Numerical light dosimetry in murine tissue: analysis of tumor curvature and angle of incidence effects upon fluence in the tissue, Proc. SPIE, vol. 4952, 39 (2003), DOI:10.1117/12.474081, Online Publication Date: Jul. 28, 2003.

Smith & Nephew, "Leg ulcer guidelines: a pocket guide for practice," National Guideline Clearinghouse, U.S. Dept of Health & Human Services, 2002, [retrieved on Jan. 10, 2012]. Retrieved from the Internet: <URL: http://guidelines.gov/content.aspx?id=9830 &search=Pressure+Ulcer>, 17 pages.

(56) References Cited

OTHER PUBLICATIONS

Smith & Nephew, "Visitrak Wound Measurement Device," Wound Management, [retrieved on Apr. 7, 2005]. Retrieved from the Internet: <URL: http://wound.smith-nephew.com/us/node.asp?NodeId=3 1 20>, 7 pages.

Smith & Nephew, "Guidelines for the Management of Leg Ulcers in Ireland" www.smith-nephew.com.

Smith et al., "Three-Dimensional Laser Imaging System for Measuring Wound Geometry," Lasers in Surgery and Medicine, 1998, pp. 87-93, vol. 23.

Sober, et al., "Computerized Digital Image Analysis: An Aid for Melanoma Diagnosis", The Journal of Dermatology, vol. 21, pp. 885-890, 1994.

Solomon et al., "The use of video image analysis for the measurement of venous ulcers," British J Dermatology, 1995, pp. 565-570, vol. I 33.

Steiner, A., "In vivo epiluminescence microscopy of pigmented skin lesions. II. Diagnosis of small pigmented skin lesions and early detection of malignant melanoma", Journal of the American Academy of Dermatology, vol. 17, No. 4, pp. 584-591; Oct. 1987.

Stoecker, et al. "Automatic Detection of Asymmetry in Skin Tumors", Computerized Medical Imaging and Graphics, vol. 16, No. 3, pp. 191-197, 1992.

Takiwaki, et al., "A rudimentary system for automatic discrimination among basic skin lesions on the basis of color analysis of video images", Journal of the American Academy of Dermatology, vol. 32, No. 4, pp. 600-604, Apr. 1995.

Tellez, R., "Managed Care Making Photo Documentation a Wound Care Standard," Wound Care, 1997, [retrieved on Aug. 29, 2005]. Retrieved from the Internet: <URL: http://woundcare.org/newsvol2n4/art.htm>, 2 pages.

Thali, M.J., et al. "Optical 3D surface digitizing in forensic medicine: 3D documentation of skin and bone injuries." Forensic Science International. 2003.

Thawer et al., "A Comparison of Computer-Assisted and Manual Wound Size Measurement," Ostomy Wound Management, Oct. 2002, pp. 46-53, vol. 48, No. IO.

Treuillet et al., "Three-Dimensional Assessment of Skin Wounds Using a Standard Digital Camera," IEEE Transactions on Medical Imaging, May 2009, pp. 752-762, vol. 28, No. 5.

Umbaugh et al., "Automatic Color Segmentation Algorithms with Application to Skin Tumor Feature Identification", IEEE Engineering in Medicine and Biology, pp. 75-82, Sep. 1993.

Umbaugh, et al., "An Automatic Color Segmentation Algorithm with Application to Identification of Skin Tumor Borders", Computerized Medical Imaging and Graphics, vol. 16, No. 3, pp. 227-235, May-Jun. 1992.

Umbaugh, et al., "Automatic Color Segmentation of Images with Application to Detection of Variegated Coloring in Skin Tumors", IEEE Engineering in Medicine and Biology Magazine, Dec. 1989, pp. 43-52.

Van Zuijlen et al., "Reliability and Accuracy of Practical Techniques for Surface Area Measurements of Wounds and Scars," Lower Extremity Wounds, 2004, pp. 7-11, vol. 3, No. I.

Vermolen et al., "A simplified model for growth factor induced healing of circular wounds," 2005, pp. 1-15.

Voigt, H., et al. "Topodermatographic Image Analysis for Melanoma Screening and the Quantitative Assessment of Tumor Dimension Parameters of the Skin", Cancer, vol. 75, No. 4, Feb. 15, 1995.

Walker, N, Rogers A, Birchall N, Norton R, MacMahon S. Leg ulcers in New Zealand: age at onset, recurrence and provision of care in an urban population. NZ Med J; 2002; 115(1156):286-9.

Walker, N, Vandal A, Holden K, Rogers A, Birchall N, Norton R, Triggs C, MacMahon S. Does capture-recapture analysis provide more reliable estimates of the incidence and prevalence of leg ulcers in the community? Aust NZJ Public Health 2002; 26(5):451-5.

Walker, N., Rodgers A, Birchall N, Norton R, MacMahon S. The occurrence of leg ulcers in Auckland: results of a population-based study. NZ Med J; 2002: 115(1151): 159-162.

Wallenstein et al., "Statistical analysis of wound-healing rates for pressure ulcers," Amer J Surgery, Jul. 2004 (Supplement), pp. 73S-78S, vol. 188.

Wang et al., "A comparison of digital planimetry and transparency tracing based methods for measuring diabetic cutaneous ulcer surface area," Zhongguo Xiu Fu Chong Jian Wal Ke Za Zhi, May 2008, pp. 563-566, vol. 22, No. 5, [retrieved on Sep. 15, 2009]. Retrieved from the Internet: <URL: http://www.ncbi.nlm.nih.gov/pu bmed/ I 8630436?ordinalpos= I &itool=E . . . >, I page.

Wendelken et al., "Key Insights On Mapping Wounds With Ultrasound," Podiatry Today, Jul. 2008, [retrieved on Jul. 14, 2008]. Retrieved from the Internet: <URL: http://www.podiatrytoday.com/article/5831>, 5 pages.

Wilbright, W.A., The Use of Telemedicine in the Management of Diabetes-Related Foot Ulceration: A Pilot Study, Advances in Skin & Wound Care, Jun. 2004, [retrieved on Jul. 28, 2006]. Retrieved from the Internet: <URL: http://www.findarticles.com/p/articles/mi_qa3977/is_200406/ai_n942 . . . >, 6 pages.

Wild et al., "Wound healing analysis and measurement by means of colour segmentation," ETRS Poster Presentation V28, Sep. 15, 2005, V28-I 7, 1 page.

Williams, C., "The Verge Videometer wound measurement package," British J Nursing, Feb./Mar. 2000, pp. 237-239, vol. 9, No. 4.

Woodbury et al., Pressure ulcer assessment instruments: a critical appraisal, Ostomy Wound Management, May 1999, pp. 48-50, 53-55, vol. 45, No. 5, [retrieved on Dec. 8, 2005]. Retrieved from the Internet: <URL: http://gateway.ut.ovid.com.ezproxy.otago.ac.nzigw2/ovidweb.cgi>, 2 pages.

Woodbury, M.G., "Development, Validity, Reliability, and Responsiveness of a New Leg Ulcer Measurement Tool," Advances in Skin & Wound Care, May 2004, [retrieved on Jul. 28, 2006]. Retrieved from the Internet.

Zhao, et al., The Classification of the Depth of Burn Injury Using Hybrid Neural Network; IEEE Conference on Engineering in Medicine and Biology Society, ISBN 0-7803-2475-7; vol. 1, pp. 815-816, Sep. 1995.

Zimmet, "Venous Leg Ulcers: Evaluation and Management," American College of Phlebology. 1998.

Notice of Allowance mailed Feb. 24, 2021, U.S. Appl. No. 15/816,862, 18 pages.

Non-Final Office Action mailed Nov. 24, 2021, U.S. Appl. No. 16/500,785, 34 pages.

Extended European Search Report for European Application No. EP22204772.2 filed Apr. 3, 2018, mailed Apr. 13, 2023, 6 pages.

Final Office Action mailed Jul. 13, 2023, U.S. Appl. No. 17/398,883, 22 pages.

Non-Final Office Action mailed Mar. 29, 2023, U.S. Appl. No. 17/100,615, 10 pages.

\* cited by examiner

AUTOMATED OR PARTIALLY AUTOMATED ANATOMICAL SURFACE ASSESSMENT METHODS, DEVICES AND SYSTEMS

CROSS-REFERENCE TO RELATED APPLICATION(S)

This application claims priority to and the benefit of U.S. Provisional Patent Application No. 62/850,377, filed May 20, 2019, and titled "AUTOMATED OR PARTIALLY AUTOMATED ANATOMICAL SURFACE ASSESSMENT METHODS, DEVICES AND SYSTEMS," which is incorporated herein by reference in its entirety.

FIELD

The present technology is generally related to devices, systems and methods for assessing anatomical surface features.

BACKGROUND

Various techniques have been used to monitor wounds, ulcers, sores, lesions, tumours etc. (herein referred to collectively as "wounds") both within hospitals and for outpatients. Typically these wounds are flat or concave and up to 150 millimetres (around 6 inches) across, though larger wounds are also possible. Manual techniques are typically labour-intensive and require examination and contact by skilled personnel. Such measurements may be inaccurate and there may be significant variation between measurements made by different personnel. Further, these approaches may not preserve any visual record for review by an expert or for subsequent comparison.

A number of techniques for the automated monitoring of wounds have been proposed. A common approach is to place a reference object next to the wound, capture an image, and determine the size of the wound utilising the scale of the reference object. It is often undesirable to place a reference object near to a wound and this requires an additional cumbersome step for a user and risks contamination of the wound. Further, when the target is not in the plane of the wound, or if it is oblique, or if the wound is not planar, there will be errors in any area calculation. Further, a reference object may be misplaced.

In general, the outline of the wound may be determined manually by a user, or automatically by the system. In some cases, automated determination of wound outline has been problematic (e.g. the automated wound outline has not been of sufficient quality to allow accurate or at least repeatable assessment of the wound). In such cases manual input of a wound outline by a user may be preferred. It would be desirable to provide improvements in automated determination of surface feature outline.

The Applicant devised methods for assessment of surface features such as wounds, as disclosed in its earlier applications and patents, including: U.S. Pat. No. 8,755,053, filed May 11, 2009; U.S. Pat. No. 9,179,844, filed Nov. 27, 2012; U.S. patent application Ser. No. 15/144,722; and U.S. Provisional Patent Application No. 62/423,709 filed 17 Nov. 2016; PCT publication WO2018/185560; U.S. Provisional Patent Application No. 62/481,612; U.S. patent application Ser. No. 15/816,862; and US Patent Publication No. 2018/0132726 all of which are incorporated herein by reference in their entireties.

It is an object of the present technology to provide improved devices, systems, and/or methods for assessing and/or treating wounds and/or other anatomical features.

SUMMARY

A method of assessing a surface feature on a patient's skin surface may include capturing one or more data sets from a patient's skin surface including the skin surface feature. Outline data of the skin surface feature may be determined based on at least one of the one or more data sets. One or more confidence attributes may be determined associated with the determined outline data.

The determined outline data may include a determined outline of the surface feature.

The one or more confidence attributes may include a confidence attribute for the determined outline as a whole. The one or more confidence attributes may include a plurality of segment confidence attributes, each associated with a segment of the determined outline. The one or more confidence attributes may include a plurality of point confidence attributes, each associated with a point on the determined outline.

The determined outline or part of the determined outline may be rejected if one or more of the confidence attributes are unacceptable. Part of the determined outline may be rejected if one or more of the segment confidence attributes are unacceptable. Part of the determined outline may be rejected if one or more of the point confidence attributes are unacceptable.

User input for replacement or modification of the rejected determined outline or rejected part of the determined outline may be solicited.

The determined outline data may include sub-region outline data for one or more sub-regions of the surface feature.

The one or more confidence attributes may include one or more of: one or more confidence attributes for the sub-region outline data for each of the one or more sub-regions; a plurality of sub-region segment confidence attributes, each associated with a segment of the determined sub-region outline data; and a plurality of sub-region point confidence attributes, each associated with a point in the determined sub-region outline data.

One or more tissue types associated with each of the sub-regions may be determined. A tissue confidence attribute associated with the determined tissue type for each of the sub-regions may be determined.

Determination of the confidence attribute may be based at least in part on distances between points in the determined outline data.

The determined outline data may be processed, wherein determination of the confidence attribute is based at least in part on distances between points in the determined or processed outline data and points in the one or more data sets. Processing the determined outline data may include resampling the determined outline data. The points in the one or more data sets may include points with a predetermined tissue type classification.

The one or more confidence attributes and/or data based on the one or more confidence attributes may be stored.

The one or more confidence attributes and/or data based on the one or more confidence attributes may be displayed.

A method of assessing a surface feature on a patient's skin surface may include capturing one or more data sets from a patient's skin surface including the skin surface feature. Outline data of the skin surface feature based on at least one of the one or more data sets may be determined. One or more confidence attributes associated with the determined outline data may be determined. At least part of an outline that is based at least in part on the determined outline data may be displayed. One or more visual representations of the one or more confidence attributes may be displayed.

A representation of the skin surface and/or skin surface feature may be displayed.

Displaying one or more visual representations of the one or more confidence attributes may include displaying one or more of: a numerical confidence indicator, a confidence symbol indicator, a colored confidence indicator, a patterned confidence indicator, and a confidence scale indicator.

A plurality of visual representations of the one or more confidence attributes may be displayed, at least some of the displayed visual representation being associated with segments of the displayed outline.

Displaying at least part of an outline may include displaying only outline segments with confidence attributes that are acceptable.

User input of outline data for outline segments with confidence attributes that are unacceptable may be solicited.

A user may be enabled to accept or reject the displayed outline or segments of the displayed outline. A user may be enabled to modify the displayed outline or segments of the displayed outline.

One or more revised confidence attributes associated with the modified outline may be determined, with the modified outline being displayed and one or more visual representations of the one or more revised confidence attributes being displayed.

A method of assessing a surface feature on a patient's skin surface may include capturing one or more data sets from a patient's skin surface including the skin surface feature. Outline data for the skin surface feature may be determined based on at least one of the one or more data sets. One or more confidence attributes associated with the determined outline data may be determined. Based on the one or more confidence attributes, user input of replacement or modified outline data may be solicited.

A method of assessing a surface feature on a patient's skin surface may include capturing one or more data sets from a patient's skin surface including the skin surface feature. A region of interest ('ROI') within at least one of the data sets may be defined, the skin surface feature being positioned within the ROI. Data within the ROI may be analyzed to determine outline data of the skin surface feature.

A user may define the ROI.

Alternatively, the ROI may be automatically defined based on one or more known characteristics of a capture device used in the capturing of one or more data sets. The ROI may be automatically defined by extracting data corresponding to the patient's skin surface from background data. The ROI may be automatically defined based on a first approximation of a boundary of the surface feature. The ROI may be automatically defined based on historic data associated with the same wound or same patient.

The ROI may be based on a historic ROI. The ROI may be based on historic outline data. The ROI may be based on known fiducials on the skin surface.

User approval of the ROI may be solicited. User modification of the ROI may be enabled.

A method of assessing a surface feature on a patient's skin surface may include capturing one or more data sets from a patient's skin surface including the skin surface feature. Outline data for the skin surface feature may be determined. The outline data may be smoothed to produce a set of smoothed outline points.

A method of assessing a surface feature on a patient's skin surface may include capturing one or more data sets from a patient's skin surface including the skin surface feature. Outline data may be determined for the skin surface feature. The outline data may include a first set of outline points. The outline data may be processed to produce a reduced set of outline points, the reduced set of outline points having a smaller number of outline points than the first set of outline points.

A method of assessing a surface feature on a patient's skin surface may include capturing one or more data sets from a patient's skin surface including the skin surface feature. A subset of skin surface feature outline points may be determined in at least one of the one or more data sets. From the identified subset of skin surface feature outline points and data from the one or more data sets, extrapolation may be performed to determine a set of outline data for the skin surface feature.

A user may manually identify the subset of skin surface feature outline points. A user may manually identify the subset of skin feature outline points by identifying one or more discrete outline points. A user may manually identify the subset of skin feature outline points by identifying one or more outline segments each including a plurality of outline points.

A user may be enabled to classify outline points in the identified subset of outline points as definite points or non-definite points.

A method of assessing a surface feature on a patient's skin surface may include capturing, in one or more first color spaces, one or more images of a patient's skin surface including the skin surface feature. At least some of the one or more images may be converted to produce one or more converted images in one or more further color spaces, different to the one or more first color spaces. Outline data for the skin surface feature may be determined based on the one or more converted images.

The one or more further color spaces may include one or more monochrome color spaces. The one or more further color spaces may include a normalized green color space. The one or more color spaces may include one or more of: normalized red, normalized blue, red, green, blue, UV, Infrared, CIE Lab, RGB, HSL, HSV, CIE Luv, YCbCr, CMYK, enhanced red, and grayscale color spaces.

A method of assessing a surface feature on a patient's skin surface may include capturing one or more data sets from a patient's skin surface including the skin surface feature. Historical information relating to the patient and/or skin surface feature may be retrieved from storage. Based on the retrieved historical information, an outlining method may be selected from a plurality of available methods. Outline data of the skin surface feature may be determined based on at least one of the one or more data sets, using the selected outlining method.

The historical information may include one or more of: skin surface characteristics, surface feature characteristics, surface feature type, surface feature etiology, anatomical site, imaging metrics, previous dressing type, tissue type characteristics, 3D surface feature information, expected or assessed pressure or friction around the surface feature, and historical outline information.

A method of assessing one or more surface features on the skin surfaces of one or more patients, may include determining outline data of a first skin surface feature based on one or more captured data sets. A processor may modify an outline determination method. A processor may determine outline data of a further skin surface feature based on one or more further captured data sets and according to the modified outline determination method.

The processor may modify the outline determination method based on information obtained from the determining of outline data of the first skin surface feature.

The determining of outline data of the first skin feature may include a processor determining the outline data of the first skin surface feature based on one or more captured data sets and according to the outline determination method.

A user may accept or modify the determined outline data of the first skin surface feature and the processor modifies the outline determination method based at least in part on the user acceptance or modification of the determined outline data of the first skin surface feature.

Code embodying the modified outline determination method may be stored in memory.

It is acknowledged that the terms "comprise", "comprises" and "comprising" may, under varying jurisdictions, be attributed with either an exclusive or an inclusive meaning. For the purpose of this specification, and unless otherwise noted, these terms are intended to have an inclusive meaning—i.e., they will be taken to mean an inclusion of the listed components which the use directly references, and possibly also of other non-specified components or elements.

BRIEF DESCRIPTION OF THE DRAWINGS

The accompanying drawings which are incorporated in and constitute part of the specification, illustrate embodiments of the present technology and, together with the general description of the present technology given above, and the detailed description of embodiments given below, serve to explain the principles of the present technology, in which.

DETAILED DESCRIPTION

Overview

Described herein is a software facility for automatically assessing an anatomical surface feature ("the facility"), such as a wound, and for managing information related to assessed anatomical surface features across a range of patients and institutions. While the following discussion liberally employs the term "wound" to refer to the anatomical surface feature(s) being assessed, the present devices, systems, and methods may be straightforwardly applied to anatomical surface features of other types, such as ulcers, sores, lesions, tumors, bruises, burns, moles, psoriasis, keloids, skin cancers, erythema, cellulitis, and the like. Similarly, a wide variety of users may use the facility, including doctors, nurses, technologists, or any other caregiver of the patient, or the patient.

As discussed in greater detail below, the facility may be implemented using readily available portable computing devices, thereby taking advantage of existing device capabilities without the need for separate hardware attachments (although in some embodiments auxiliary hardware devices may be used). As used herein, the terms "computer" and "computing device" generally refer to devices that have a processor and non-transitory memory, as well as any data processor or any device capable of communicating with a network. Data processors include programmable general-purpose or special-purpose microprocessors, programmable controllers, application-specific integrated circuits (ASICs), programming logic devices (PLDs), system on chip (SOC) or system on module (SOM) ("SOC/SOM"), an ARM class CPU with embedded Linux or Android operating system or the like, or a combination of such devices. Computer-executable instructions may be stored in memory, such as random access memory (RAM), read-only memory (ROM), flash memory, or the like, or a combination of such components. Computer-executable instructions may also be stored in one or more storage devices, such as magnetic or optical-based disks, flash memory devices, or any other type of non-volatile storage medium or non-transitory medium for data. Computer-executable instructions may include one or more program modules, which include routines, programs, objects, components, data structures, and so on that perform particular tasks or implement particular abstract data types.

Anatomical Surface Feature Assessment

Figure 1:
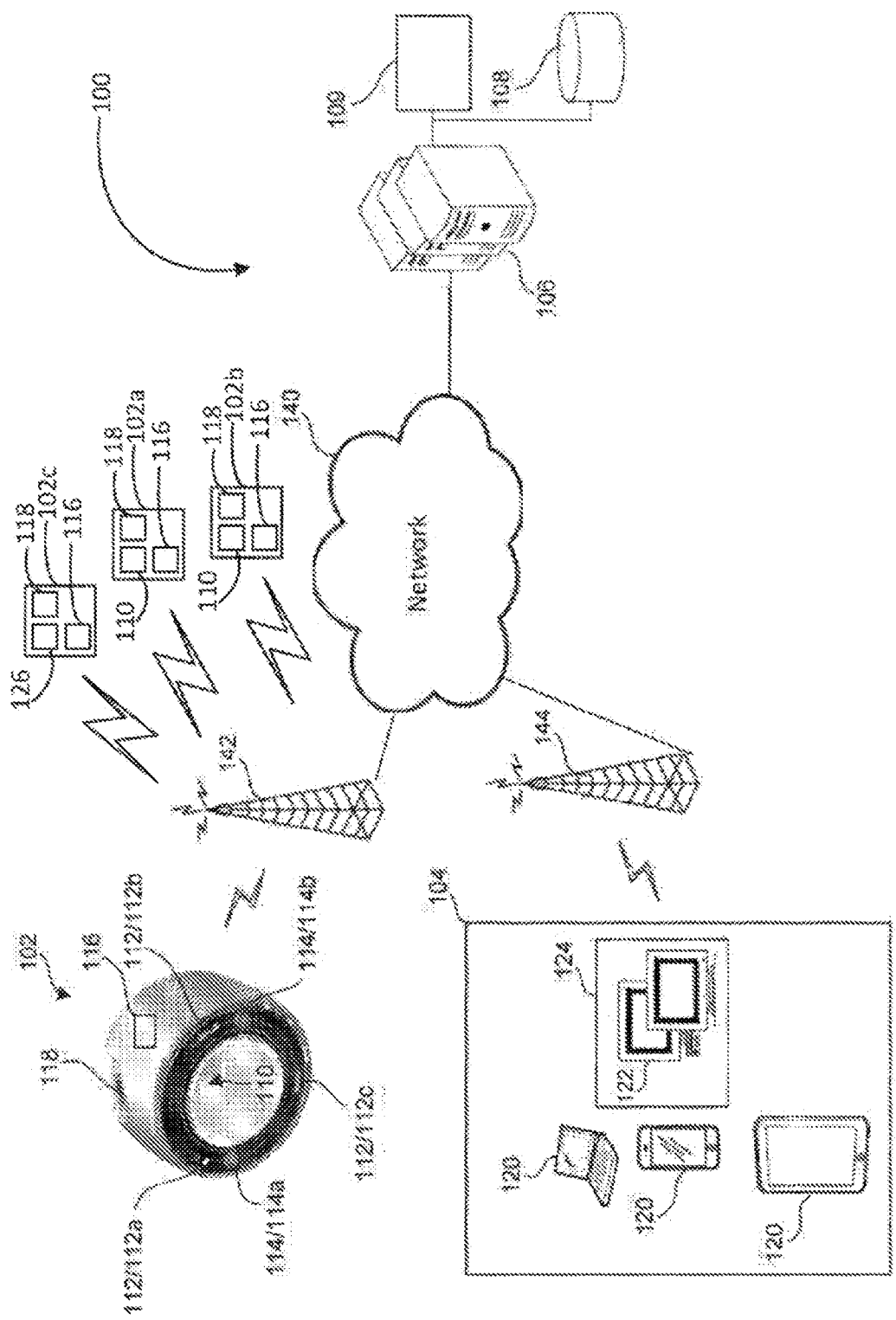
FIG. 1 is a diagram showing some of the components typically incorporated in at least some of the computer systems and other devices on which the facility executes.

FIG. 1 is a block diagram showing a sample environment having multiple components in which the facility executes. The environment 100 may include one or more capture devices 102, 102a, 102b, 102c, one or more personal computing devices 104, one or more server computers 106, and one or more persistent storage devices 108. The capture device 102, 102a, 102b, 102c and the personal computing device 104 communicate (wirelessly or through a wired connection) with the server computer 106 through a network 140 such as, for example, a Local Area Network (LAN), a Wide Area Network (WAN), and/or the Internet. In the embodiment shown in FIG. 1, the capture device 102, 102a, 102b, 102c may or may not communicate directly with the personal computing device 104. For example, the capture device 102, 102a, 102b, 102c may communicate wirelessly with a first base station or access point 142 using a wireless mobile telephone standard, such as the Global System for Mobile Communication (GSM), or another wireless standard, such as IEEE 802.11, and the first base station or access point 142 communicates with the server computer 106 via the network 140. Likewise, the computing device 104 may communicate wirelessly with a second base station or access point 144 using a wireless mobile telephone standard, such as the Global System for Mobile Communication (GSM), or another wireless standard, such as IEEE 802.11, and the second base station or access point 144 communicates with the server computer 106 via the network 140. In some embodiments, confidential patient data generated by the capture device 102, 102a, 102b, 102c is only temporarily stored locally, or not at all, and instead is permanently stored at the storage device 108 associated with the server computer 106. The facility can be practiced on any of the computing devices disclosed herein (e.g., one or more personal computing devices 104, one or more server computers 106, etc.), and may include an interface module that generates graphical user interfaces (GUIs) to allow users to access the facility (as described in greater detail below with reference to FIGS. 2-29).

The personal computing device 104 can include one or more portable computing devices 120 (e.g., a smart phone, a laptop, a tablet, etc.) and/or one or more desktop computing devices 122. During data capture with the capture device 102, 102a, 102b, 102c at the point-of-care, the personal computing device 104 may also be present (i.e., in the same treatment room), or the personal computing device 104 may be remote (i.e., outside of the treatment room but in the same treatment facility, outside of the treatment room and remote from the treatment facility, etc.). The desktop computing devices 122, if utilized, are typically associated with a particular property, e.g., a medical treatment center 124 (e.g., a hospital, a doctor's office, a clinic, etc.). The portable computing devices 120 and desktop computing devices 124 communicate with each other and the server computer 106 through networks including, for example, the Internet. In some instances the portable computing devices 120 and desktop computing devices 122 may communicate with each other through other wireless protocols, such as near field or Bluetooth.

The capture device 102, 102a, 102b, 102c is a handheld, portable imaging device that includes one or more sensing devices for generating data characterizing the wound ("wound data") at the point-of-care. In the embodiment shown in FIG. 1, the capture device 102 may include an image sensor 110 (e.g., a digital camera), a depth sensor 112 (also known as a "range imager"), and a computing device 116 (shown schematically) in communication with the image sensor 110 and the depth sensor 112.

Alternatively, in some embodiments the capture device may be a smartphone 102a, tablet 102b or other capture device including an image sensor 110 and a computing device 116. The capture device may for example be an iPhone, iPad, Android phone, other Smartphone, tablet etc.).

In some embodiments a capture device 102c may include a 3D camera 126. For the purposes of this specification, a 3D camera 126 is a device that creates a topographic map of the surface structure as seen from the viewpoint of the camera. Suitable 3D cameras may include stereo cameras, fully sampled structured light cameras, fully sampled time of flight cameras, depth from focus 3D cameras, light field (or plenoptic) 3D cameras and holographic cameras.

The capture device may include one, two or some other number of cameras, and/or structured light arrangements, 3D cameras etc. In such embodiments a separate personal computing device 104 may not be required. As discussed below, an auxiliary device may be mounted to or connected to a capture device 102, 102a, 102b, 102c.

Further a variety of different capture devices 102, 102a, 102b, 102c may be used in the environment 100. Different types of capture device 102, 102a, 102b may be used to capture data in relation to the same wound, at the same or different times, by the same or different users. The data from a variety of different capture devices 102, 102a, 102b may be processed in the facility.

The capture device 102, 102a, 102b, 102c is also in wireless communication with the server computer 106 (e.g., via the network 140). The image sensor 110 is configured to generate image data of the wound (e.g., pixels containing RGB color data—or data in a similar or equivalent color space such as HSV or HSL). In some embodiments, a hyperspectral image sensor may be used, i.e. a sensor that has sensitivity outside the conventional RGB visible spectrum range. In some embodiments a spectrometer or array of spectrometers may be used to provide greater color resolution than a conventional RGB sensor. A spectrometer or array of spectrometers may be particularly useful in analysis of fluorescence. Where provided, the depth sensor 112 is configured to generate depth data characterizing the depth or topography of the wound. For example, in some embodiments the depth sensor 112 is a structured light device configured to emit structured light (e.g., one or more lasers, DLP projectors, film projectors, etc. where the emitted light may be infra-red, visible, ultraviolet, etc.) in a predetermined arrangement toward the wound. In such embodiments, for example, the depth sensor 112 may comprise three laser elements (labeled 112a-112c) spaced apart around a circumference of the capture device 102. The laser elements 112a-112c have a fixed positional relationship with respect to one another, and also with respect to the image sensor 110. Together the laser elements 112a-112c can be configured to create a structured light pattern (e.g., a laser point(s), a laser fan(s), etc.) In some embodiments the laser elements do not need to be symmetrically arranged. In other embodiments, the depth sensor 112 can include other suitable devices for range imaging, such as an ultrasonic sensor, a stereo camera, a plenoptic camera, a time-of-flight camera, an ISM band miniature radar, etc.

The capture device 102, 102a, 102b, 102c also includes a rechargeable power source and an actuator 118 (e.g., a button, a switch, touch screen etc.) for initiating data capture. When a user presses the actuator 118, the computing device 116 activates the image sensor 110 (and the depth sensor 112 if included) to generate data. The computing device 116 then communicates the captured data to the remote server computer 106 for further processing by the facility. In some embodiments, the computing device 116 may partially or completely process the captured data before communicating the captured data to the remote server computer 106. In some embodiments, the capture device 102, 102a, 102b, 102c may partially or completely process the captured data before communicating with the computing device 116. In some embodiments, the computing device 116 wirelessly communicates with the server computer 106 (e.g., over a network). Such a cordless arrangement can be advantageous as it allows the user greater freedom of movement with the capture device 102, 102a, 102b, 102c, which can be especially beneficial when trying to access certain anatomical locations. Also, the absence of a cord reduces the surface area available at the point-of-care on which bacteria and/or other unwanted microorganisms may bind and travel. In some embodiments, the capture device 102, 102a, 102b, 102c may be permanently cordless (i.e., no input port), and in other embodiments, the capture device 102, 102a, 102b, 102c may be configured to detachably receive an electronic connector, such as a power cord or a USB cord, or a permanently attached retracting cord may be provided. The computing device 116 may automatically transfer the captured data to the remote server computer 106 (e.g., over the network 140) at the moment the data is captured. In certain embodiments, however, the computing device 116 may not be in communication with the network 140; in such scenarios, the captured data may be temporarily stored in the volatile and/or non-volatile memory of the capture device 102, 102a, 102b, 102c for later transfer to the server computer 106.

The capture device 102, 102a, 102b, 102c may include additional features for enhancing data collection from the wound, such as one or more light sources 114 (e.g., a light emitting diode (LED), an incandescent light source, an ultraviolet light source, a flash etc.) for illuminating the wound before or during data capture, an indicator (not shown) configured to provide a visual and/or audio signal (e.g., images, text, lights, etc.) to the user, a thermal camera, a video camera, and/or one or more input/output devices (e.g., a microphone, a speaker, a port for communicating electrically with external components, such as a power source, the personal computing device 104, etc.). In some embodiments, the capture device 102, 102a, 102b, 102c is configured for wireless charging, e.g., via a dock or cradle (not shown). In such embodiments, the charging cradle may also serve as an access point for the network 140. As discussed in greater detail below with reference to FIGS. 6A-6B, the capture device 102, 102a, 102b, 102c and/or image sensor 110 may also be configured to capture images of barcodes and/or QR codes displayed on the computing device 104, such as a barcode and/or a QR code that enable the capture device 102, 102a, 102b, 102c to be configured to connect to the network 140.

In some embodiments, the capture device 102, 102a, 102b, 102c may have other configurations than that shown in FIG. 1. For example, although the image sensor 110, depth sensor 112, and computing device 116 are shown as part of a single component and/or within the same housing, in other embodiments, any or all of the of the image sensor 110, the depth sensor 112, and the computing device 116 can be separate components. Likewise, in some embodiments, the capture device 102, 102c does not include separate image and depth sensors, and instead includes a stereo camera that is configured to generate both image data and depth data. In other embodiments the capture device may include a display-less imaging device connected (by wired or wireless link) to a display device. Additional details regarding suitable capture devices 102 and methods of use can be found in U.S. Pat. No. 8,755,053, filed May 11, 2009; U.S. Pat. No. 9,179,844, filed Nov. 27, 2012; U.S. patent application Ser. No. 15/144,722; and U.S. Provisional Patent Application No. 62/423,709 filed 17 Nov. 2016; PCT publication WO2018/185560; U.S. Provisional Patent Application No. 62/481,612; U.S. patent application Ser. No. 15/816,862; and US Patent Publication No. 2018/0132726 all of which are incorporated herein by reference in their entireties.

As discussed above, the facility may include an interface module that generates graphical user interfaces (GUIs) to allow users to access the facility. The interface module also provides application programming interfaces (APIs) to enable communication and interfacing with the facility. APIs may be used by other applications, web portals, or distributed system components to use the system. For example, an application operating on a personal computing device may use an API to interface with system servers and receive capture data from the system. The API may utilize, for example, Representational State Transfer (REST) architecture and Simple Object Access Protocol (SOAP) protocols.

In some embodiments the capture device 102, 102a, 102b, 102c may include one or more further data gathering components, such as a positioning module (e.g. GPS), Inertial Measurement Unit, temperature sensor etc. Alternatively, such functions may in some embodiments be provided by a separate auxiliary module configured for attachment to the capture device 102, 102a, 102b, 102c.

Any of the capture devices 102, 102a, 102b, 102c and/or the personal computing devices 104 may provide access to video and/or audio communications, including video conferencing. Any of the capture devices 102, 102a, 102b, 102c and/or the personal computing devices 104 may provide access to remote medical expert systems. A remote medical expert may review or assess data captured by the capture device 102, 102a, 102b, 102c in real time, or at a later time.

The facility may provide for automated billing based on usage and/or data gathered by the capture devices 102, 102a, 102b, 102c. The facility may also maintain inventory information for capture devices 102, 102a, 102b, 102c.

The following methods may be implemented using appropriate facility software running on the capture device 102, 102a, 102b, 102c, personal computing device 104, and/or server computer 106 and/or further computing devices within the environment. In some embodiments, methods may be implemented through an application running on a capture device 102, 102a, 102b, 102c. Methods may be implemented across two or more devices and/or computers. For example, a method may include data capture steps implemented on a capture device 102, 102a, 102b, 102c, data analysis steps implemented on the capture device 102, 102a, 102b, 102c and/or personal computing device 104 and/or server computer 106, and data storage steps implemented on server computer 106 and persistent storage devices 108. In some embodiments, the personal computing device 104 may be omitted.

Figure 2:
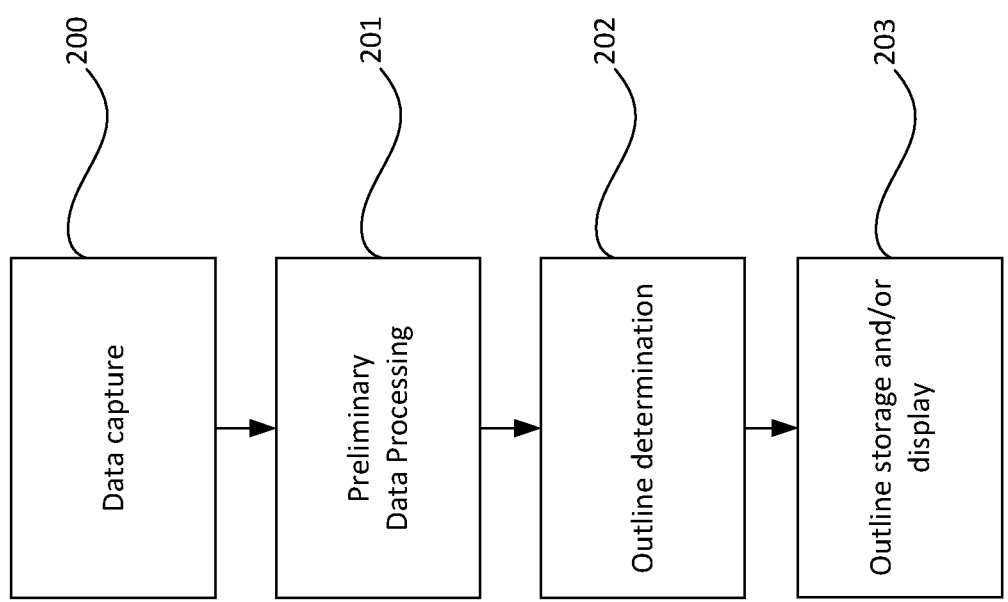
FIG. 2 is a flow diagram providing an overview of one example of outline determination method.

In one embodiment a surface feature outline may be automatically determined by the facility, or more specifically by a processor, based on data captured from the patient's anatomical surface. FIG. 2 is a flow chart illustrating this process. In FIG. 2, data is captured at block 200. Optional data processing may be performed at block 201. An outline of an anatomical surface feature may be determined at block 202. Resulting outline and associated data may be stored and/or displayed at block 203.

In general, a physical surface feature may be considered to have a 'boundary'. The determined outline should match the boundary to an accuracy that is satisfactory for the application.

Data capture may involve capture of data from the patient's anatomical surface using any suitable device or combination of devices.

Such capture devices may be contained within a single instrument, or may be contained in different instruments. Data may be captured by any one or more of the devices and methods discussed herein and in the Applicant's applications and patents, including U.S. Pat. No. 8,755,053, filed May 11, 2009; U.S. Pat. No. 9,179,844, filed Nov. 27, 2012; U.S. patent application Ser. No. 15/144,722; and U.S. Provisional Patent Application No. 62/423,709 filed 17 Nov. 2016; PCT publication WO2018/185560; U.S. Provisional Patent Application No. 62/481,612; U.S. patent application Ser. No. 15/816,862; and US Patent Publication No. 2018/0132726, the entire contents of all of which are hereby incorporated by reference herein, or from any other suitable device or devices.

Preliminary data processing may include any desired preliminary processing in advance of outline determination. For example, preliminary data processing may include reduction of the data set by a processor using a manually or automatically determined Region of Interest (ROI). Preliminary data processing may include conversion of captured data by a processor into one or more color spaces. For example, captured image data may be converted into a normalized green (normG) color space or any other desired color space. Color spaces may include red, green, blue, infrared, ultraviolet color spaces, color spaces based on other wavelength regions or data, or any color space based on a combination of any two or more of red, green, blue, infrared, ultraviolet or other wavelength region captured data. Preliminary data processing may include data cleaning. For example, the captured data may be processed to reduce or reject noise.

In some embodiments, outline determination may be carried out manually by a user entering an outline on any suitable device. For example, a user may draw an outline using a touch screen. However, in other embodiments, outline determination may be performed automatically by a processor. In still further embodiments outline determination may be performed by a combination of automated processing and user input and/or user modification of data.

Outline determination may include an initial determination of outline data and optionally any processing of the determined outline data to produce processed outline data. Outline determination may include thresholding within the image data to determine regions (and possibly sub-regions) within the image data. Such segmentation can be performed many different ways using pixel-based, edge-based, or region-based methods that are fully automatic or require seeding and/or user interaction. The wound outline may be determined based on segmentation or the segmentation may result from determination of the wound outline.

Outline determination may include data cleaning. For example, small adjacent regions of like properties may be consolidated. Other noise reducing or rejecting methods may be applied. Outline determination may include resampling of outline data to form a resampled outline data set. Resampling may include manual or automatic addition of further outline data points. Outline determination may include snapping of outline data points. Outline determination may include determination of one or more confidence attributes. Outline determination may include smoothing of outline data. Outline determination may include simplification of outline data.

Storage of outline data may be storage in any suitable memory—local, central or remote. Display of outline data may include display on any suitable device—local, central or remote. Outline data may be displayed together with any data resulting from data capture, preliminary data processing and/or outline determination, including for example captured image data and/or confidence data. Outline data may be displayed together with historic data (e.g. previously captured data, or data based on previously captured data such as historic outline data). This may be helpful in displaying data indicative of trends over time.

Some possible preliminary data processing methods will now be described in further detail.

Figure 3:
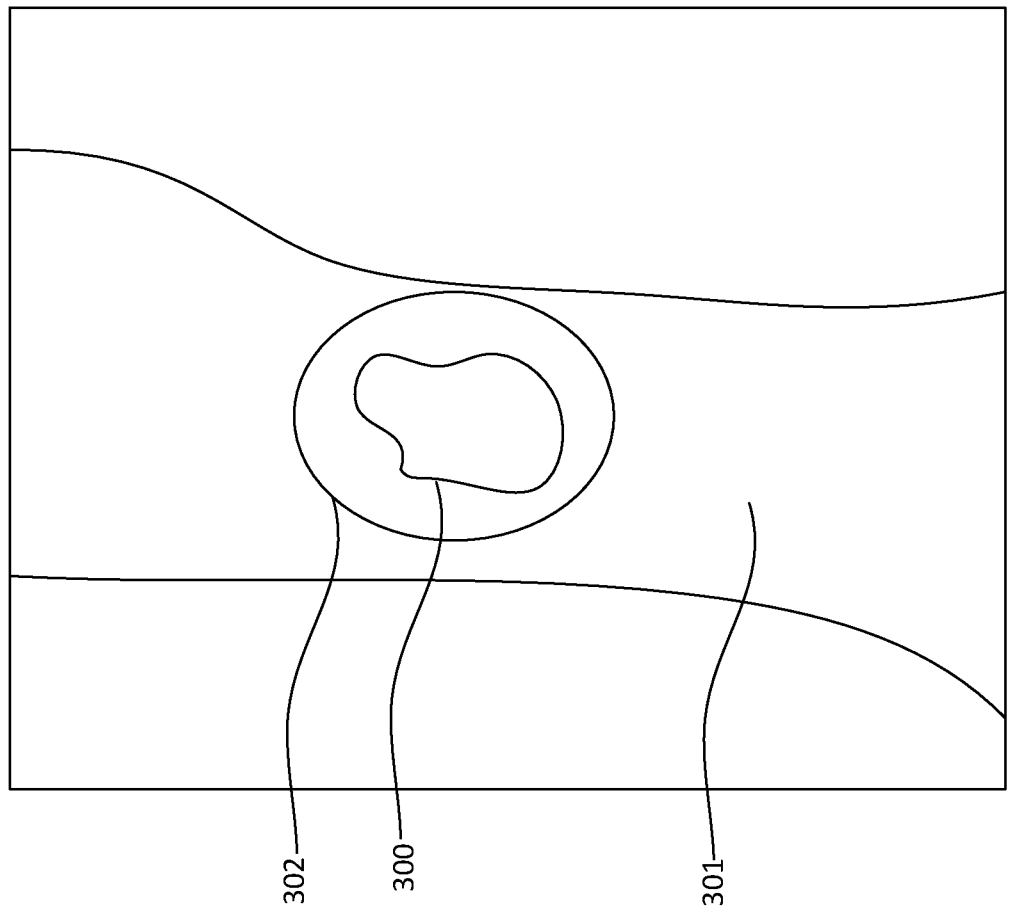
FIG. 3 shows an image including a surface feature and Region of Interest according to one example.

A Region of Interest ("ROI") may be defined. This may help to limit the processing required to data within the ROI and/or to exclude background regions. The ROI may include the anatomical surface feature and surrounding surface external to the surface feature. FIG. 3 shows a surface feature 300 on a patient's leg 301. A user may be prompted to enter a Region of Interest using any suitable user input (e.g. mouse, pointer, touchscreen etc). In the example shown, a user has dragged and resized an oval ROI indicator 302 over the image. At least some subsequent processing of data may be limited to this user-defined ROI.

Figure 4:
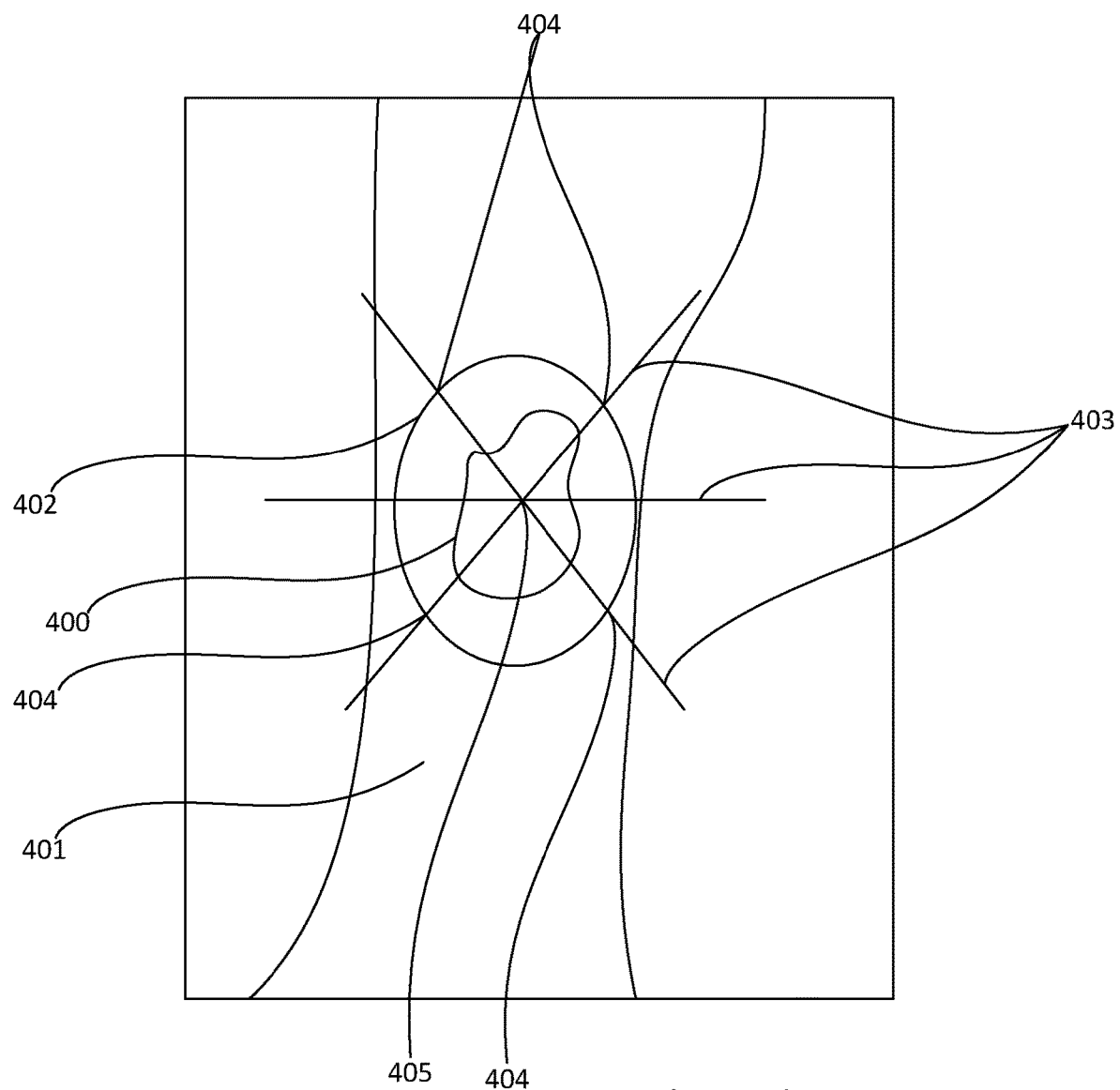
FIG. 4 shows an image including a surface feature, ROI and structured light pattern according to one example.
Figure 5:
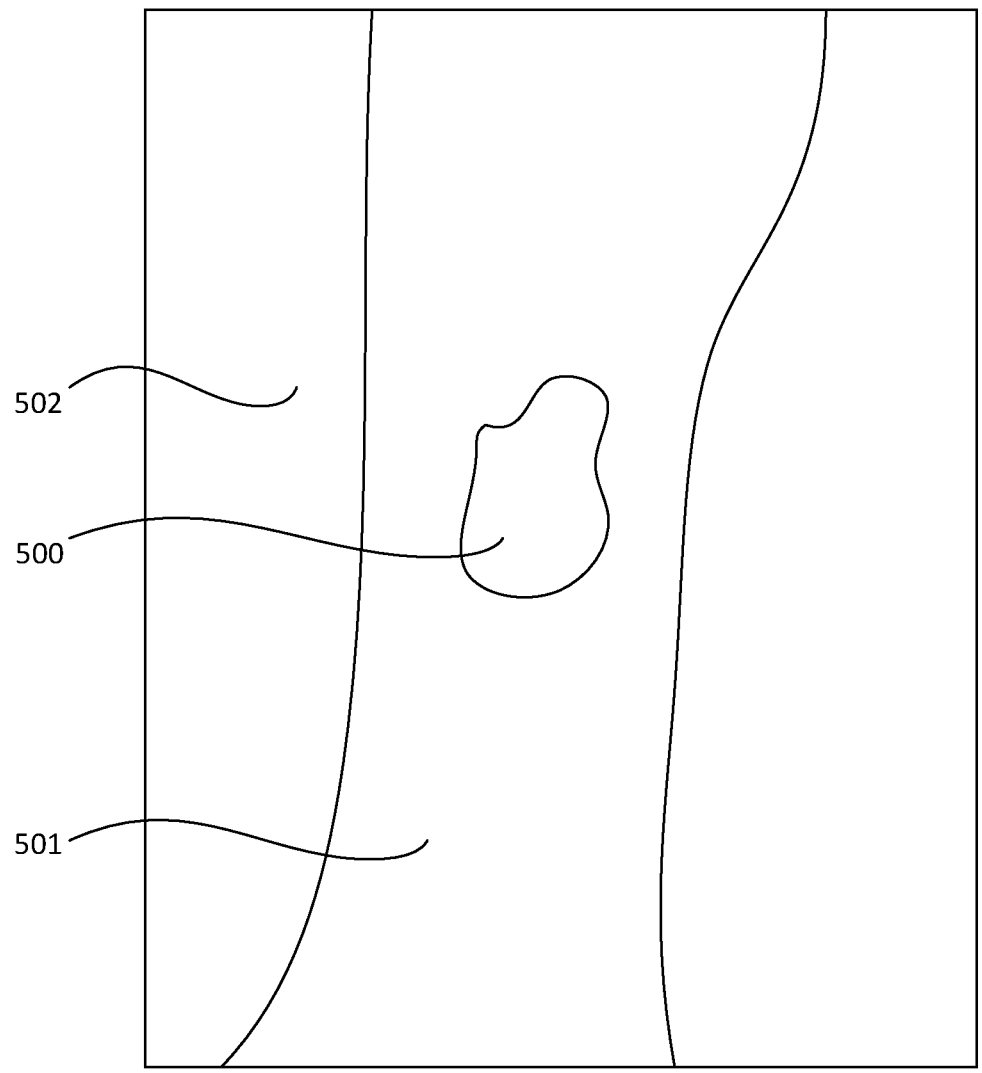
FIG. 5 shows an image including a skin surface and surface feature, according to one example.

In further embodiments, the ROI may be automatically defined by a processor. In structured light devices, such as the Applicant's devices described in U.S. Pat. No. 9,179,844 the structured light pattern may be used in ROI definition. For example, in the case of a 'star' shaped structured light pattern having a plurality of structured light elements (usually stripes) meeting at a central point, the user may be trained or instructed to locate the central point within the surface feature, as shown in FIG. 4. Here, a 'star' shaped laser pattern 403 is projected onto a surface feature 400 on a skin surface 401. The ROI may then be automatically defined by a processor by using the structured light data to make a first determination of surface feature boundary data. For example, by starting at the central point and looking outwards along the structured light feature it is possible to detect a transition in 3D shape (or in color, texture or some other characteristic) corresponding to the boundary of a wound. In the example shown this will yield six boundary points. An ROI may then be automatically defined based on the obtained data, on approximate surface feature location and/or dimensions. A margin of error may be allowed. For example, in the example shown the ROI may be defined as an oval 402 centered on the laser line crossing point 405 and having an area twice that of the approximate wound area calculated from the six boundary points 404. Any other suitable margins of error, ROI shapes and structured light patterns may be used. Alternatively, the structured light pattern may be used in the same way, but instead of or in addition to creating an ROI, the boundary data points may be used as a starting point or 'seed' for outlining.

An ROI may also be automatically defined by a processor by foreground extraction. For example, in FIG. 5 image data including an anatomical feature 500 may be processed to differentiate between a foreground feature, i.e. the patient's leg surface 501, and the background region 502. The foreground may be considered the ROI, or may be further processed to define the ROI.

The ROI may also be automatically defined by a processor based on historical data. For example, a manually or automatically defined ROI may be stored. At a later data capture for the same patient, the ROI may be the same as, or based on, the stored ROI. Alternatively, an ROI may be determined based on a previously determined surface feature outline. For example, a wound outline may be determined. At a later data capture, the ROI may be defined as the previously determined wound outline plus a margin (e.g. 50% greater area). An ROI may be determined based on other historic information such as wound location and/or wound type. For example, a stage 1 DFU may almost always be less than a certain size, therefore the ROI can be initially set to the maximum expected size and located based on any suitable captured or historic information.

The ROI may also be located and/or dimensioned based on one or more known "anatomical fiducials", such as markings or other permanent or semi-permanent skin features, moles, freckles, birthmarks, skin wrinkles, creases, lines, tattoos (permanent or temporary tattoos), scars or other permanent or long-term, fixed points or markings on the patient's body. In some embodiments, a permanent or semi-permanent marking may be added (using e.g. a pen, tattoo etc) in order to provide an anatomical fiducial. This may be done in addition to existing anatomical fiducials, or in a surface region where no or insufficient suitable anatomical fiducials are found.

Further, information from the capture process may be used. For example, in some devices (such as the Applicant's Silhouette Lite+device) the device may display or project a region (by e.g. displaying a region on the device screen during data capture), which the user aligns around the surface feature. This displayed or projected region may be used as the ROI, or as the basis for determination of the ROI. For example, the ROI may be determined as the displayed or projected region plus a margin, e.g. 10% by area.

Further, in other embodiments an ROI may be determined (manually or automatically) that straddles a boundary of the surface feature, or is contained within the boundary of the surface feature. In some embodiments a small ROI may be determined, down to a single point, such as a small region or single point within the wound boundary. From here a wound boundary may be determined by looking outwards from the ROI.

Any suitable combination of the above ROI definition methods may be used.

Preliminary data processing may also involve conversion of captured data by a processor into one or more different color spaces. For example, where RGB image data is captured, it may be converted into a monochrome color space.

Some wound beds (e.g. in diabetic foot ulcers—DFUs) have been found to exhibit a lack of green color, and in one embodiment captured RGB data may be converted into a normalized green (normG) color space. For example, the computation of the normalized green value Ĝ at pixel location i,j may be calculated as:

$$\hat{G}_{ij} = \frac{G_{ij}}{\sqrt{R_{i,j}^2 + G_{i,j}^2 + B_{i,j}^2}}$$

where R, G and B represent red, green and blue channels respectively.

DFUs tend to have a red wound bed and yellow calloused wound surround. The use of a normG color space provides good contrast between wound bed and wound surround, since the wound bed will show a low value in normG space (i.e. an absence of green) while the wound surround will show higher values in normG space.

Other color spaces may be used, and different color spaces may be suitable for different types of wound, tissue, anatomical surface features, surface feature shapes or other characteristics. Further, any suitable combination or set of color spaces may be used. For example, normalized red, normalized blue, red, green, blue, UV, Infrared, CIE Lab, RGB, HSL, HSV, CIE Luv, YCbCr, CMYK, enhanced red, grayscale color spaces may be used. Color spaces may be monochrome color spaces (e.g. greyscale, red, normalized red etc) or color spaces with two or more channels (e.g. RGB, HSV etc). Where more complex capture devices are used (e.g. devices such as spectrometers) other or more complex color spaces may be used.

Where a plurality of color spaces are used, these may be weighted differently.

In further embodiments color space data may be used as a diagnostic tool. For example, captured data may be converted into one or more color spaces, with the converted data being analyzed for characteristics indicative of a surface feature property (e.g. surface feature type and/or stage, tissue types etc.).

Preliminary data processing may include any suitable initial cleaning or noise-reduction processes. In one embodiment, small connected regions may be consolidated. This is largely a noise-rejection measure to remove small erroneously detected wound regions. The consolidation of regions may continue until the cumulative area of the largest region or regions is above an appropriately defined threshold.

Some possible outline determination methods will now be described in further detail. These methods may be applied whether or not any of the preliminary processing methods are applied.

The image data may be subjected to any suitable thresholding method. For example, in the case of monochrome normG data, thresholding may be used to distinguish wound regions (low normG values) from surrounding tissue (high normG values). This thresholding may provide a classification of pixels classified into 'wound' and 'non-wound' classes or categories. Any suitable thresholding method, for example Otsu thresholding, may be used, and may be based on any suitable data.

Further, thresholding may be used to create more than two classes or categories. Multilevel thresholding may be used. Further, thresholding in more than one color space may be used. Continuous or multi-level thresholding across several types of data or a plurality of color spaces may be used. For example, thresholding in normG space may be used to define a 'wound bed' region, expected to have low normG values. Thresholding in RGB color space may be used to define a 'bone' region, expected to appear white in RGB data; and/or to define a 'necrotic' region, with necrotic tissue expected to appear black in RGB data. The combination of thresholding in these color spaces may therefore allow several tissue type regions to be determined. Identification of some tissue type regions may rely on a combination of thresholding in two or more data spaces.

Thresholding in any captured data space or in any converted data space may be used. Captured or converted data spaces may include color spaces (including UV and IR color spaces), fluorescence imaging color spaces, thermal data spaces, physical spaces including 3D spaces and any other suitable captured or converted data space. Thresholding may be applied to image histograms. Local thresholding methods may be used, in which the threshold is variable over the image or ROI. The threshold may vary dynamically over the image or ROI, or in any other suitable manner.

An initial surface feature outline may be automatically determined by a processor based, e.g. on the outside of a wound region, or on a border between wound and non-wound regions. A determined outline may include a single outline (e.g. around a simple wound) or may be a complex outline including a plurality of distinct outline portions (e.g. an outline portion around the outside of a wound and one or more outline portions around 'islands' of healthy tissue within the wound; or outline portions around several distinct regions of wound tissue; or outline portions defining sub-regions of different tissue types).

An initial outline, or a plurality of initial outlines, may be determined by any suitable method. In one embodiment, the convex hull of the wound region may be determined. The convex hull is the smallest convex set containing the wound region. The initially determined outline may be iterated or resampled to provide a refined wound outline. Any version of the outline may be displayed to a user, who may be given the opportunity to modify the outline, e.g. by movement of outline points or segments, deletion of outline points or segments, or addition of outline points or segments. Such changes may be incorporated and the outline iterated. The user may be provided further opportunity for modification of the outline with each iteration, or at least some of the iterations.

User modifications of the outline may be classified as definite (or high confidence) modifications and non-definite (or hint, possible or low confidence) modifications. 'Non-definite' modifications may not necessarily be honored by subsequent processing. 'Definite' modifications may be required to be honored by subsequent processing.

The outline may be further modified by automated snapping of outline points. In one embodiment, each outline point may be moved, or snapped, to the nearest pixel location of a pixel that has been identified as a 'wound' pixel. The nearest pixel location may be determined in any suitable manner, e.g. based on a simple Euclidian distance. If more than one outline point snaps to a particular pixel location, the duplicates may be removed. In further embodiments, the snapping of points may be in a specific direction rather than to the closest 'wound' pixel. For example, outline points could be snapped directly inwards towards the centre of a structured light pattern such as that shown in FIG. 4, i.e. to the closest 'wound' pixel on a line extending between the structured light centre and the outline point.

In some embodiments, the generation of the initial raw outline may produce a very detailed outline, often with many hundreds of points. This is because the resampling and snapping approach described above follows the outline of the thresholded image to individual pixel level. The highly sampled, detailed outline may be problematic. The perimeter may be inflated since the path or integral around the outline follows the single pixel jumps. That is, the perimeter may be measured as longer than it is. Further, outlines returned to the user may be difficult to manually adjust or alter (if this functionality is provided) since there are so many points close together. Outline processing and handling may also be intensive. More detailed outlines may also require more storage space. Operations like determining regions of different tissue types (e.g. islands of healthy tissue within a surrounding wound) and dealing with overlapping outlines may become very intensive.

To reduce these effects, the outline may be simplified to reduce the point count of the outline. Rationalization where every nth point is retained may be used, but this is simplistic and can result in lost detail. Instead, filtering followed by simplification (feature preserving decimation) may be performed.

Filtering, e.g. in the form of Savitzky-Golay filtering (though any suitable filtering method may be used), may be used to smooth the outline.

Savitzky-Golay filtering approximates the underlying function within the moving window (w=2n+1) not by a constant (such as a moving average) but by a polynomial of higher order (m). It does a good job of preserving detail, which is often lost or flattened when some other smoothing techniques are employed.

This filtering step produces a much more 'organic' outline. However, the filtered outline may be defined with sub-pixel coordinates and the number of points may not have been reduced. Sub-pixel locations may be problematic in some applications where the data is to be stored using integer pixel locations.

Each filtered (smoothed) outline point $O_{i_s}$ is given by:

$$O_{i_s} = \frac{\sum_{k=-n}^{n} A_k O_{i+k}}{\sum_{k=-n}^{n} A_k}$$

where the weighting coefficients (A−n, A−(n−1), . . . , A(n−1), An) are the Savitzky-Golay coefficients. This moving polynomial fit may be handled in the same way as a weighted moving average. In some applications, smooth coefficients for a polynomial of order 3 and window size of 31 (m=3, n=15, w=31) may be suitable.

Figure 6A:
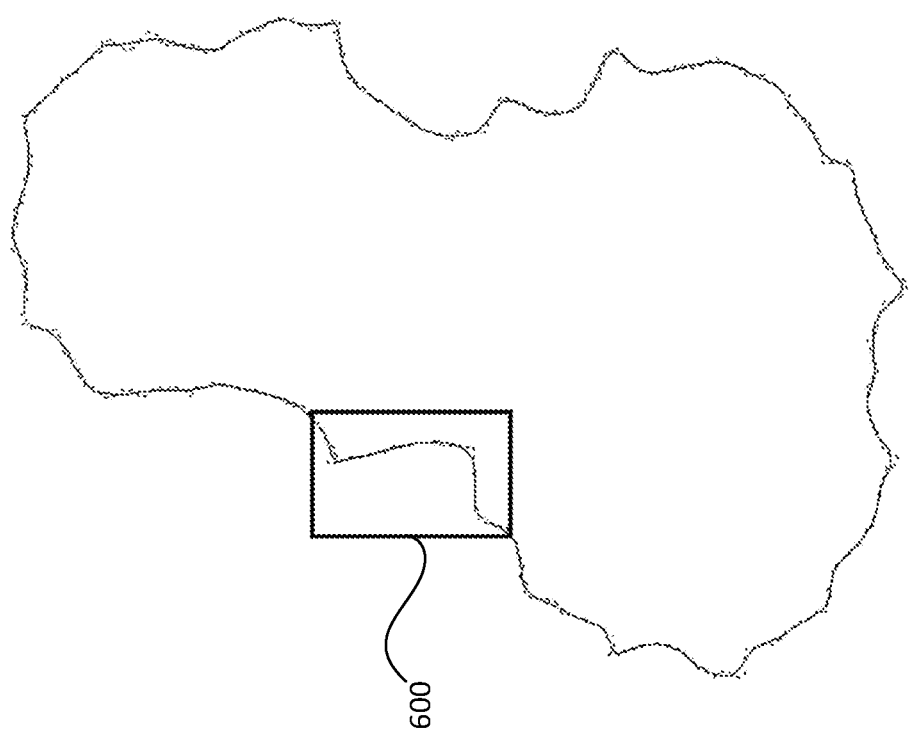
FIG. 6A shows a surface feature outline before and after smoothing according to one example.
Figure 6B:
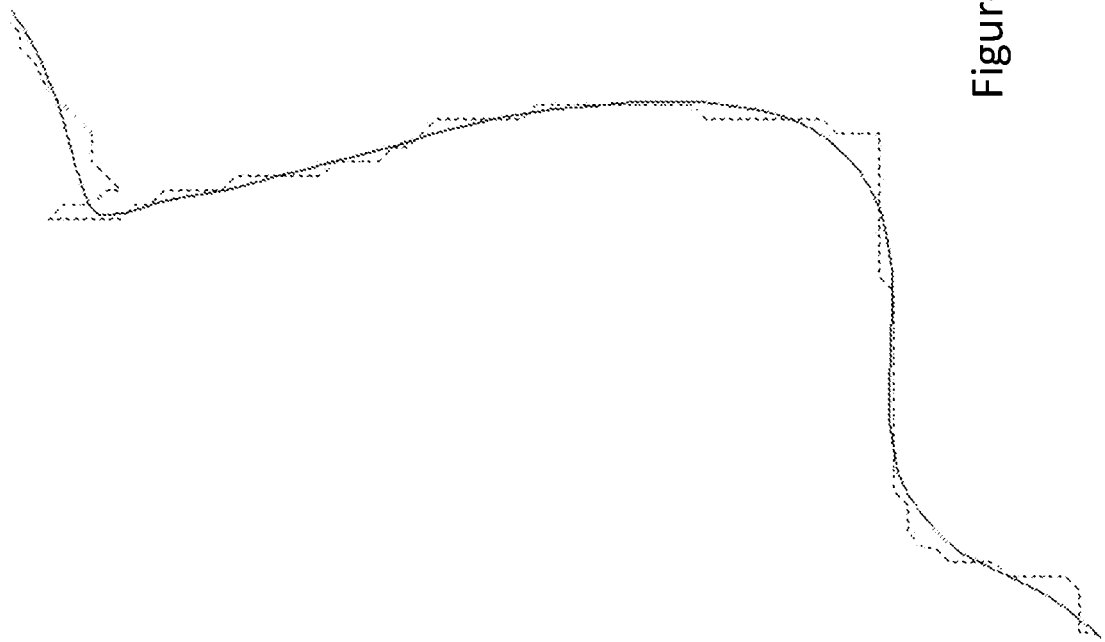
FIG. 6B is an expanded view of a portion of FIG. 6A.

FIGS. 6A and 6B show an outline in dashed line, with a filtered or smoothed outline in solid line. FIG. 6B is an enlarged view of the section marked by box 600 in FIG. 6A.

A simplification step may be performed to reduce the number of outline vertices. This may include removing points in long segments where the points roughly line up. The allowable deviation from a truly straight line may be specified by a tolerance (ε) parameter. After removal of redundant locations the final subset of locations may be rounded to the nearest pixel. Any suitable simplification method may be used. In some applications the Douglas-Peucker algorithm, with ε=1 or another suitable value, may be used for simplification.

The Douglas-Peucker algorithm, also known as Iterative End-Points Fitting, recursively divides the piecewise linear curve. It starts by creating a straight-line segment that connects the start and end points. It then locates the point furthest from this initial line segment. If this point is closer than ε to the line segment, then all unmarked points between the start and end points can be discarded without the error exceeding ε. However, if the furthest point is greater than ε from the initial line segment, that point must be kept. Two new lines segments are formed from the start point to the new point and the new point to the end point. The recursion process is then repeated for each new line segment and so on until all points have been checked and kept or discarded.

Figure 7:
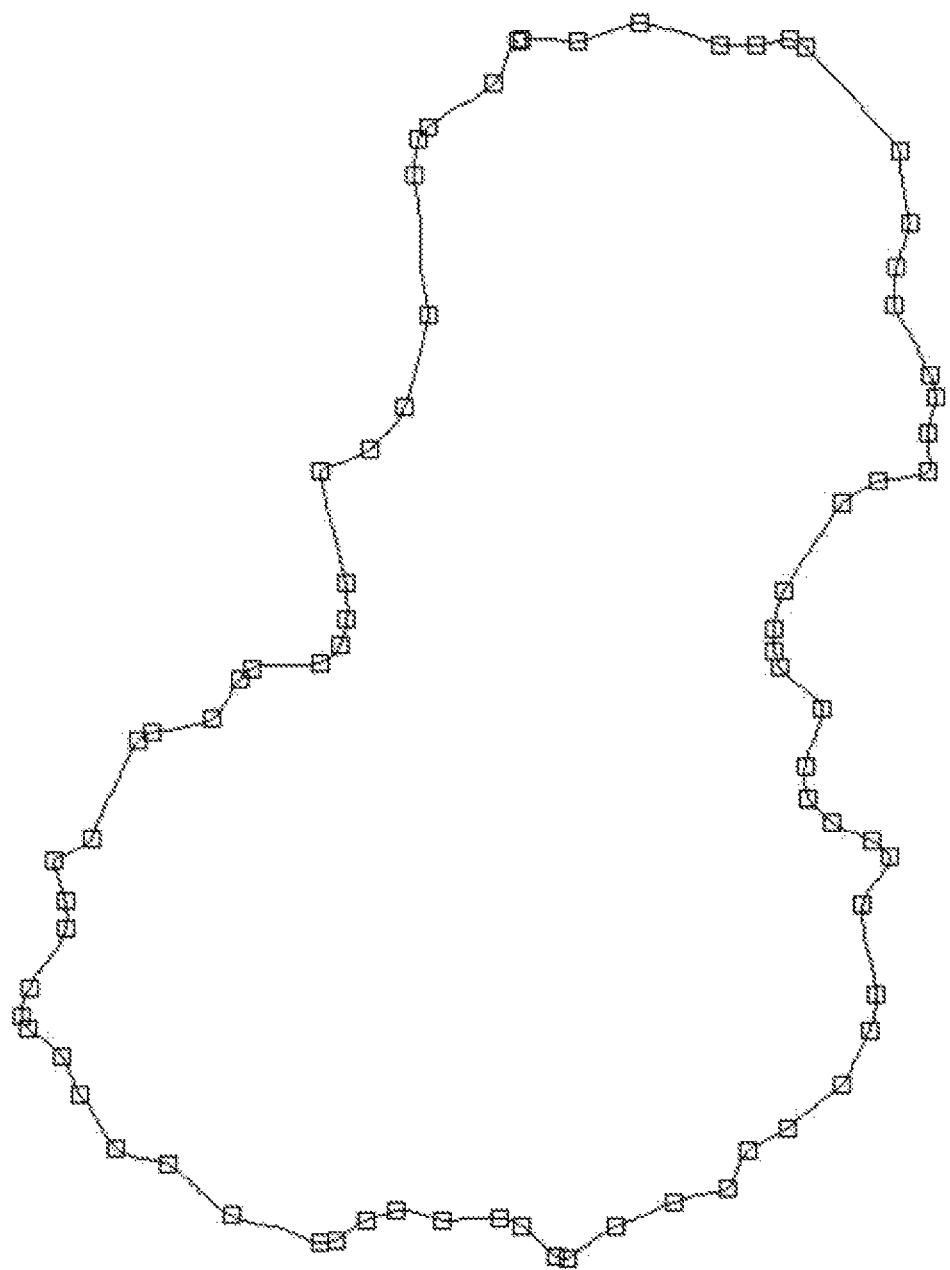
FIG. 7 shows a smoothed or filtered outline according to one example.

FIG. 7 shows a smoothed or filtered outline in solid line, with the black squares being the retained simplified points. In this example, the outline point count has reduced from 1078 to 76.

Generally, using smoothing and simplification of the outline may avoid abrupt outline portions and reduce the point count by removal of near-aligned points. This results in a much reduced complexity of the outline. The outline may take on a more 'organic' shape similar to outlines drawn by users. Further, the point count may be adjusted by altering parameters, especially parameters of the simplification process. The perimeter errors mentioned above may be reduced since the fractal outline issue is largely removed.

One or more quality or confidence attributes (hereafter "confidence attributes") associated with the outline, or parts of the outline, may be determined by a processor. Confidence attributes may include one or more overall confidence attributes for the outline and/or one or more confidence attributes for one or more segments of the outline and/or one or more confidence attributes for each outline point. The confidence attributes may vary in different outline portions.

The confidence attributes may provide an indication of how well the determined outline follows the edge of the 'wound' pixels. Poor confidence outlines or segments of outlines with poor confidence may not be displayed to the user.

Any suitable method of determining confidence attributes may be used. However, in one embodiment, the quality of the outline may be determined by looking at the distance between the points making up the outline (distance metric) and how closely the outline follows the underlying thresholded image (snap metric). In one embodiment, a good quality wound outline may be considered one that accurately follows the wound boundary and is evenly sampled (i.e. does not contain big jumps and jagged edges).

The distance metric may be calculated as the RMS (root mean square) distance between adjacent outline points in the outline before any smoothing or simplification. The snap metric may be calculated as the RMS distance between the resampled outline points snapped onto the thresholded image, also before any smoothing or simplification. Alternatively, instead of RMS methods, any other suitable method of determining the distance and/or snap metrics may be used.

For each metric the per point distances may be calculated and then the RMS (root mean square) of each set of points is computed. The RMS may be used because it is sensitive to large errors. However, as the per point distances are calculated for each metric it may also be possible to report on these individually.

A high confidence wound outline should contain no excessive jumps. The distance metric is the RMS of the Euclidean distance between successive points in the wound outline, i.e. the length of the line segment connecting them. For a high confidence outline this should tend to somewhere between 1 and $\sqrt{2}$ times the pixel spacing.

If the outline contains N points denoted $O_1, O_2, \ldots O_N$, the Euclidean distance between neighbouring outline points $O_n=(O_{n_x},O_{n_y})$ and $O_{n+1}=(O_{n+1_x},O_{n+1_y})$ may be given by:

$$dE_n = \sqrt{(O_{n+1(modN)_x}-O_{n_x})^2 + (O_{n+1(modN)_y}-O_{n_y})^2}$$

The distance metric may be given by:

$$\text{Distance Metric} = \sqrt{\frac{1}{N}\sum_{i=0}^{N}dE_i}$$

Figure 8:
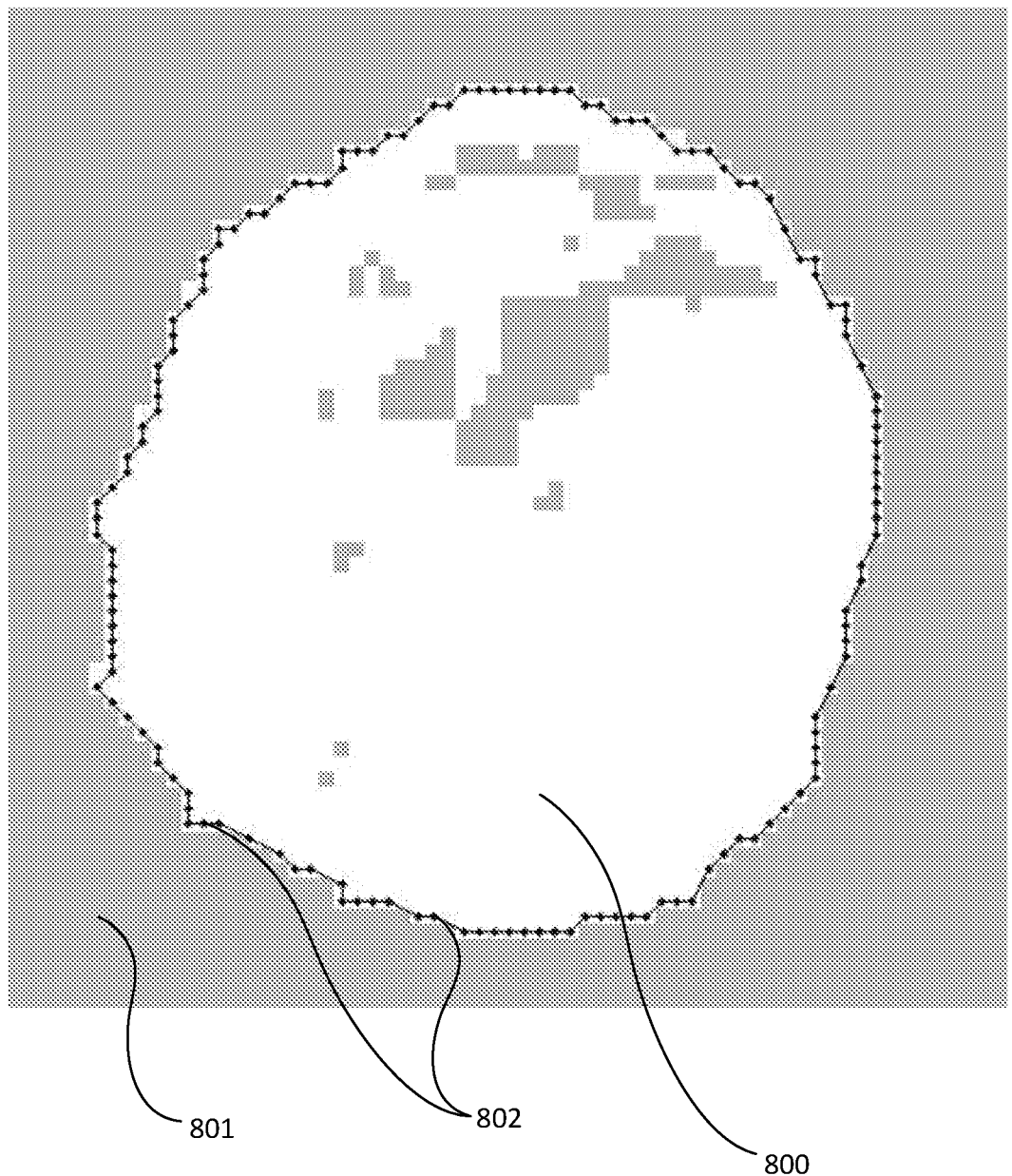
FIG. 8 shows outline data according to one example.

FIG. 8 shows an example in which a wound region 800 (shown as a white region) and a non-wound region 801 (shown as a grey region) have been identified. Outline points 802 (shown as diamond symbols) are generally regular and close together. Line segments connecting the points are generally short. The RMS distance between points in this example is 1.3017 pixels.

Figure 9B:
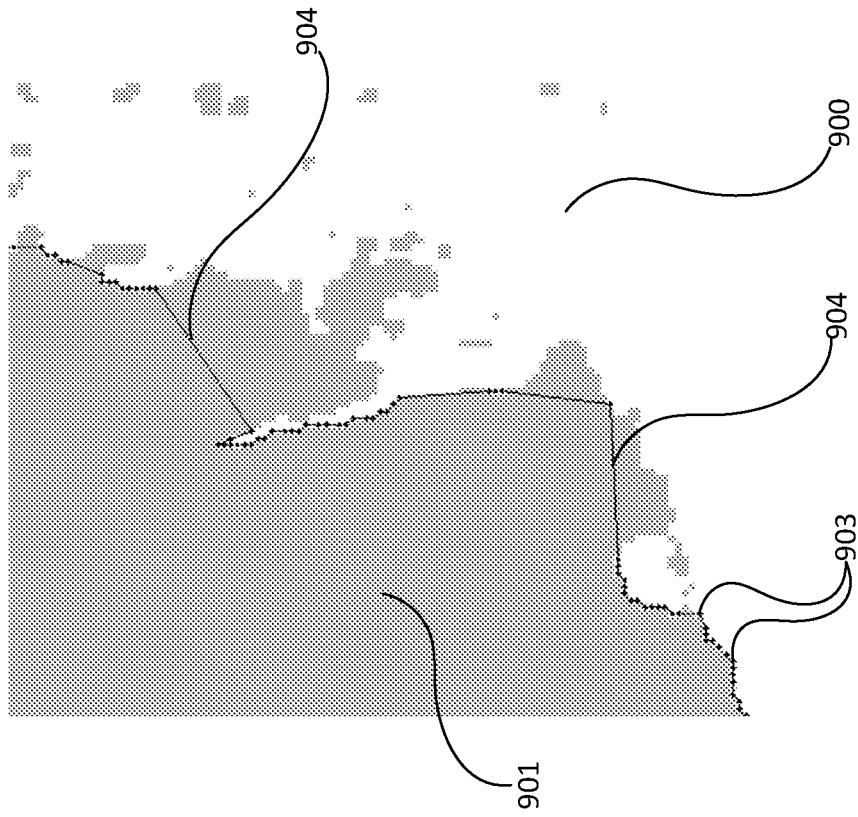
FIG. 9B is an expanded view of a portion of FIG. 9A.
Figure 9A:
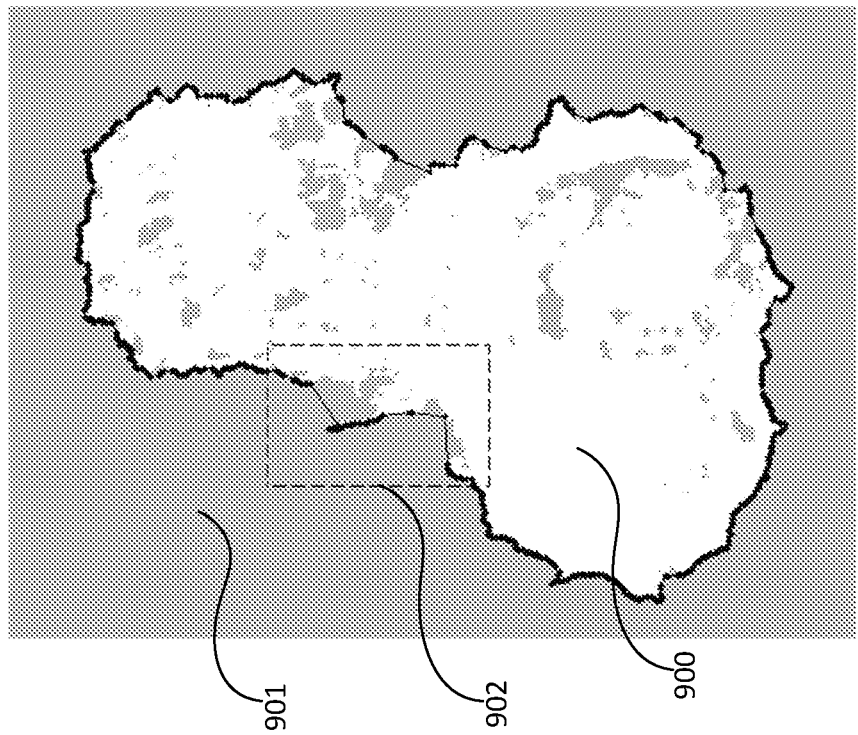
FIG. 9A shows outline data according to a further example.

FIGS. 9A and 9B show a further example in which a wound region 900 and a non-wound region 901 have been identified. FIG. 9B is an expanded view of the part of FIG. 9A indicated by rectangle 902. In this example, there are large jumps between the outline points 903 resulting in some large line segments. For example, in FIG. 9B relatively long line segments 904 can be seen between data points. The RMS distance between points is 2.4543 pixels. This example will therefore have a higher distance metric than the example of FIG. 8.

As an alternative to the above calculation, confidence could be reported per individual line segment, or even per individual point, instead of the overall RMS.

The distance an outline point must move to snap onto the closet point on the thresholded image provides a measure of how closely it follows the region(s) of likely 'wound' locations. If it follows the thresholded 'wound' locations exactly then the snap metric will be zero. The resampled outline points may be used for this calculation. The impact of large jumps in the outline would be hidden if the resampled outline were not used, as the ends of the large segments are close to the thresholded image.

If the resampled outline contains N points denoted $O_i$ to $O_N$, the snap distance between outline point $O_n=(O_{n_x},O_{n_y})$ and the closest point on the thresholded image $CP_n=(CP_{n_x}, CP_{n_y})$ may be given by:

$$dS_n = \sqrt{(O_{n_x}-CP_{n_x})^2 + (O_{n_y}-CP_{n_y})^2}$$

The snap metric may be given by:

$$\text{Snap Metric} = \sqrt{\frac{1}{N}\sum_{i=0}^{N}dS_i}$$

Figure 10:
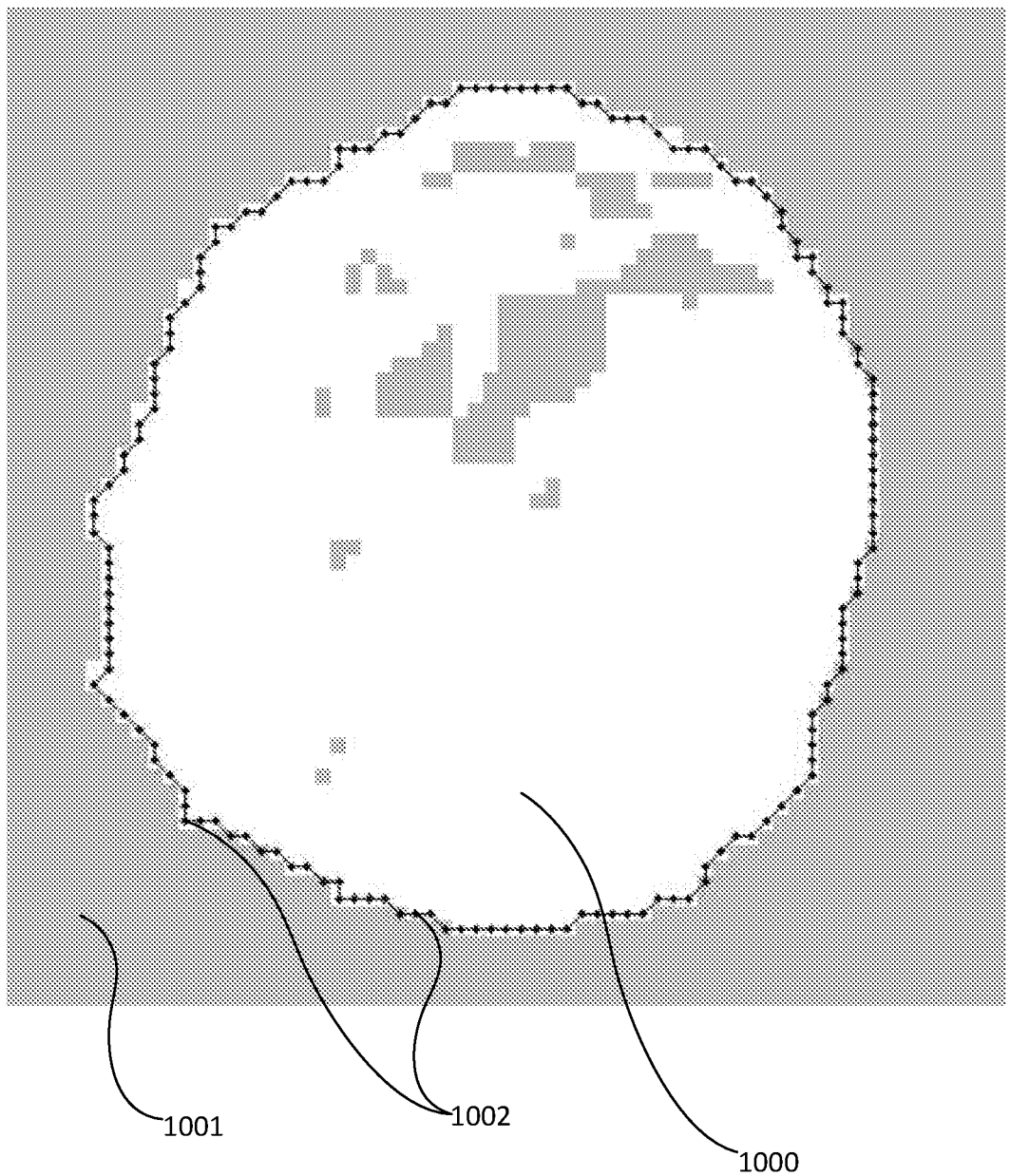
FIG. 10 shows outline data according to another example.

FIG. 10 shows an example in which a wound region 1000 (shown as a white region) and a non-wound region 1001 (shown as a grey region) have been identified. The resampled outline contains no large jumps to the wound region. The distance between each point 1002 and the closest point on the thresholded image is short. The RMS snap distance is 0.3071 pixels.

Figure 11B:
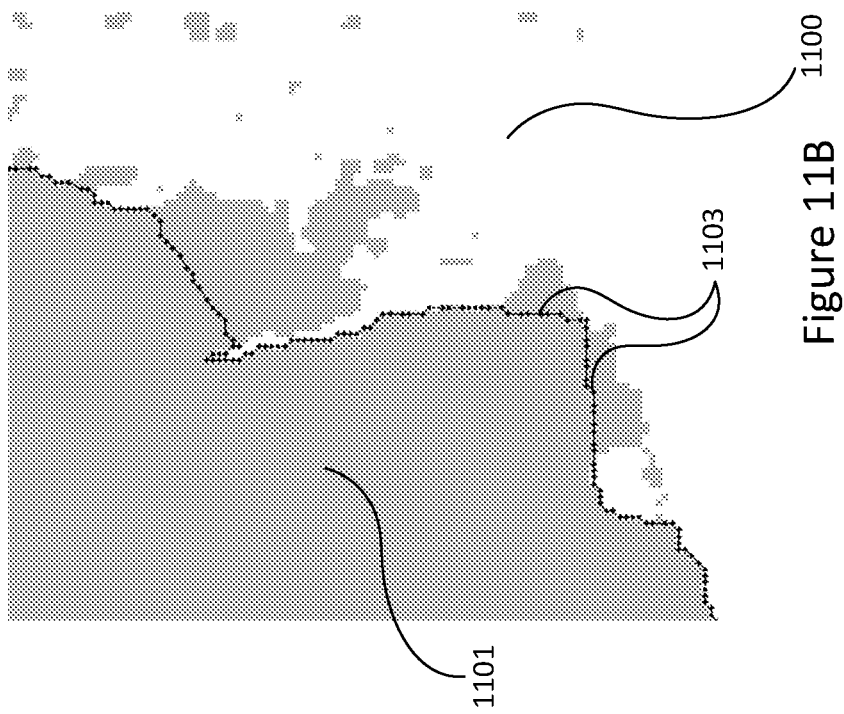
FIG. 11B is an expanded view of a portion of FIG. 11A.
Figure 11A:
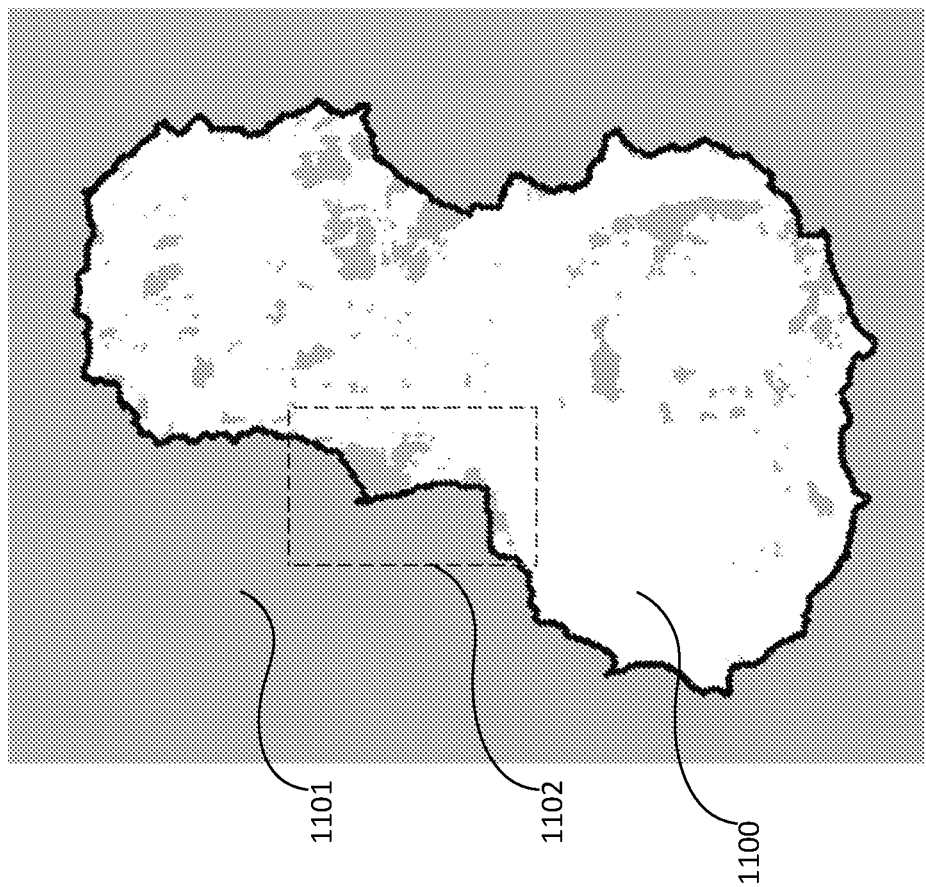
FIG. 11A shows outline data according to yet another example.

FIGS. 11A and 11B show a further example in which a wound region 1100 and a non-wound region 1101 have been identified. FIG. 11B is an expanded view of the part of FIG. 11A indicated by rectangle 1102. There are large jumps required to move some of the outline points to the boundary of the wound region. In this example the resampled points 1103 require large pixel distances to snap to the thresholded image. The RMS snap distance is 1.4370 pixels.

Again, confidence could be reported per outline pixel by looking at individual snap distances instead of the overall RMS.

A sample of wound outlines may be visually examined by a user and classified as high, medium and low confidence wound outlines. A set of thresholds may be determined for low, medium and high confidence based on these classifications.

Confidence attributes may therefore include an indication of confidence level, such as 'low', 'medium' or 'high; or 'acceptable'/'unacceptable' etc. Confidence attributes may include numerical values, such as a percentage confidence or a confidence score on any suitable scale.

Confidence attributes may be displayed to a user using words or numbers, or any other suitable indicator. For example, confidence may be displayed using colors (e.g. red for low, orange for medium, and green for high confidence), star ratings, bar displays or any other suitable mechanism for display of the confidence. Audio cues may be associated with the confidence attribute. For example, different sounds may be played based on the determined confidence attributes. Other cues and/or indicators may be used, for example haptic cues or indicators.

Further, in some embodiments such cues and/or indicators may be provided during any user entry of outline data, tissue classification data etc that may be allowed. Such cues and/or indicators may assist a user in entering data (e.g. on a touchscreen, pointer or other user input device) by giving feedback on determined or expected confidence for the data being entered. Such feedback may be given in real time during user entry of data or after user entry of data. For example, feedback may be given by any suitable cues and/or indicators to assist a user in staying in a high confidence 'channel' when drawing wound outline data.

A high confidence outline may be automatically accepted or the user may be prompted to review and/or accept the outline. Lower confidence outlines may be either rejected or returned to the user for user input of further outline points. The manual user addition of outline points may include addition of a number of discrete outline points, addition of an outline segment or segments, or manual input of an entire outline.

Potentially low confidence regions of the outline could prompt further or additional processing in these areas.

Figure 12:
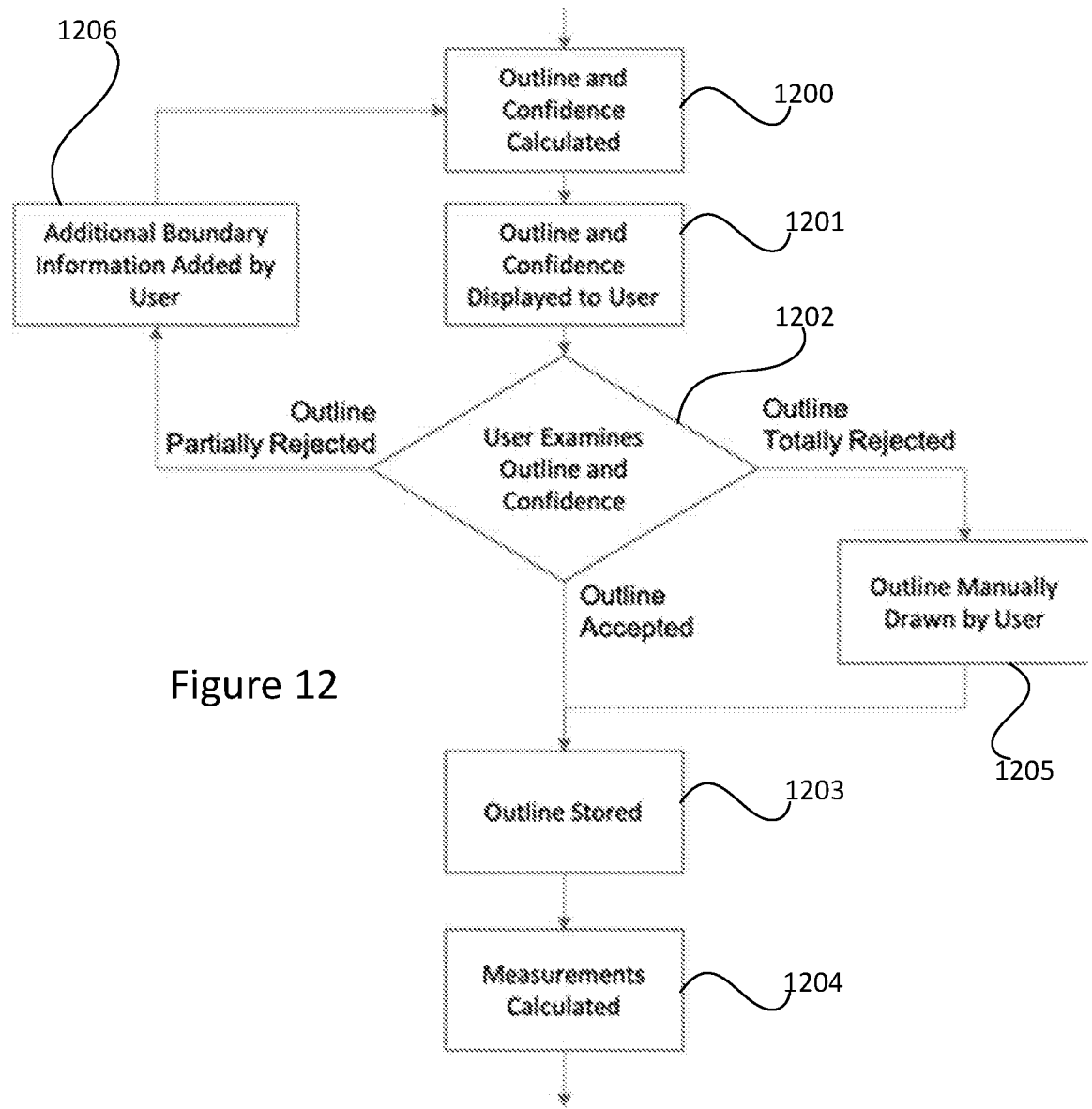
FIG. 12 is a flow diagram illustrating one example of confidence determination.

FIG. 12 is a flow chart illustrating one possible manner of iterative outline refinement. Other methods may also be suitable.

At block 1200, the outline and confidence are determined, using any of the methods described above, or any other suitable method.

The outline and confidence may be displayed to a user at block 1201. The outline may be displayed superimposed or overlaid on image data for the wound. The image data may be captured image data or processed image data. The image data may be processed from a plurality of captured images (e.g. RGB, UV and/or Infrared images). The outline may be displayed as a line with or without the display of outline points. Alternatively, outline points may be displayed without connecting lines. Any other suitable display of the outline may be used. The confidence may be displayed using words (e.g. high, medium, low, good, bad, OK etc) or numbers, or any other suitable indicator. Confidence may be displayed using visual indicators such as colors (e.g. red for low, orange for medium, and green for high confidence), star ratings, bar displays or any other suitable mechanism for display of the confidence. Audio cues may be associated with the confidence attribute. For example, different sounds may be played based on the determined confidence attributes.

As the confidence may vary around the outline, a plurality of confidence values may be displayed for different segments of the outline. The confidence data may be retained down to the pixel level if appropriate.

At block 1202 the user may examine the displayed outline and confidence. The user may accept the displayed outline, in which case the outline is stored at block 1203.

Alternatively, the user may reject the outline in its entirety. In this case, the user may manually input an outline at block 1205. The manually entered outline may be stored at block 1203. Confidence values for the manually entered outline may also be calculated and stored, if desired, by any of the methods discussed herein.

As a further alternative, the user may reject part of the outline. At block 1206, the user may manually enter additional outline data, such as points or segments, or may otherwise modify the outline (e.g. by dragging parts of the outline to a new location). The resulting modified outline may return to block 1200 for further iteration of the outline and confidence.

The user's input of outline points or modifications may be solicited by the system. In particular, the system may solicit user input where the confidence is unacceptable (e.g. below a threshold). For example, a segment of the outline may have a confidence value less than a threshold. This may be indicated by marking that outline segment in red (or some other color or line pattern, visual effect etc, or simply be omitting outline segments with confidence values lower than the threshold), prompting the user to modify or replace that outline segment.

Further, only a partial outline having a confidence value that is acceptable (e.g. above a threshold) may be displayed to a user. The system may solicit the user's input in relation to the 'missing' portions of the outline, for which the confidence value was below a threshold.

In some embodiments, regardless of the confidence values, the user may override part or all of the computed outline. In other embodiments the user may override only those parts of the outline with a confidence below a threshold.

Confidence thresholds are treated in this specification as thresholds above which confidence is good, high, acceptable etc, and below which confidence is poor, low, unacceptable etc. However, other methods of determining whether a confidence is acceptable or unacceptable may be suitable. Further, the skilled reader will recognize that equivalent arrangements may include 'rejection' methods, e.g. where data with a rejection value above a rejection threshold may be rejected (similar to low confidence data) while data with a rejection value below the rejection threshold may be accepted (similar to high confidence data). Such variations and equivalents are to be considered confidence methods and are intended to fall within the scope of the claims.

Once the outline is stored, further processing of the data may be performed at block 1204.

Figure 13:
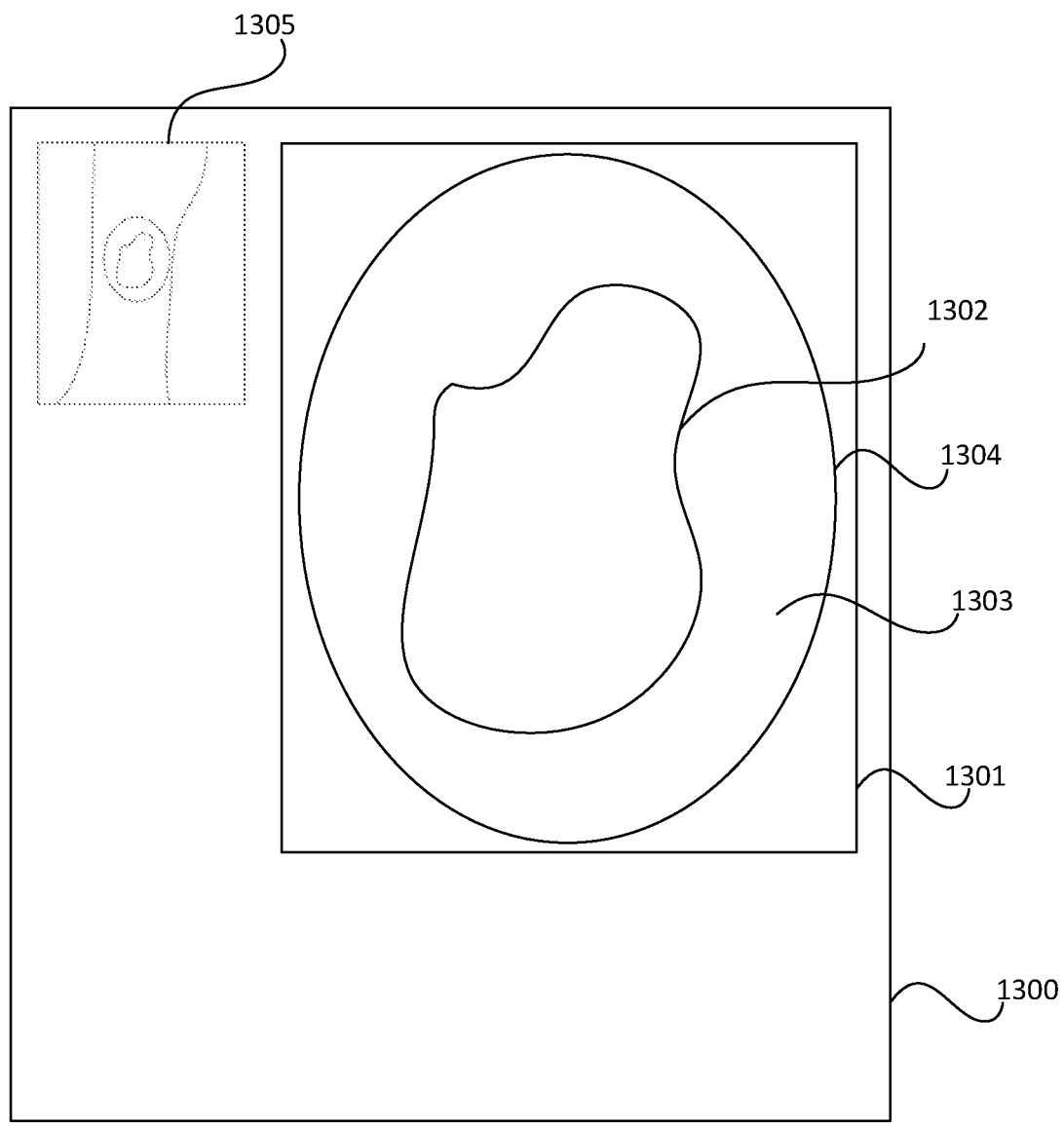
FIG. 13 is a simplified screenshot showing one example of display of data.

FIGS. 13 to 16 illustrate one possible manner of displaying data to a user, whether on a capture device or other device. FIG. 13 shows a display window 1300 in which an image 1301 is displayed. The image may include a surface feature 1302 on a patient's skin surface 1303. An ROI 1304 may also be shown. A thumbnail display 1305 may also be included, allowing a user to select one of a plurality of images for display as the main image.

Figure 14:
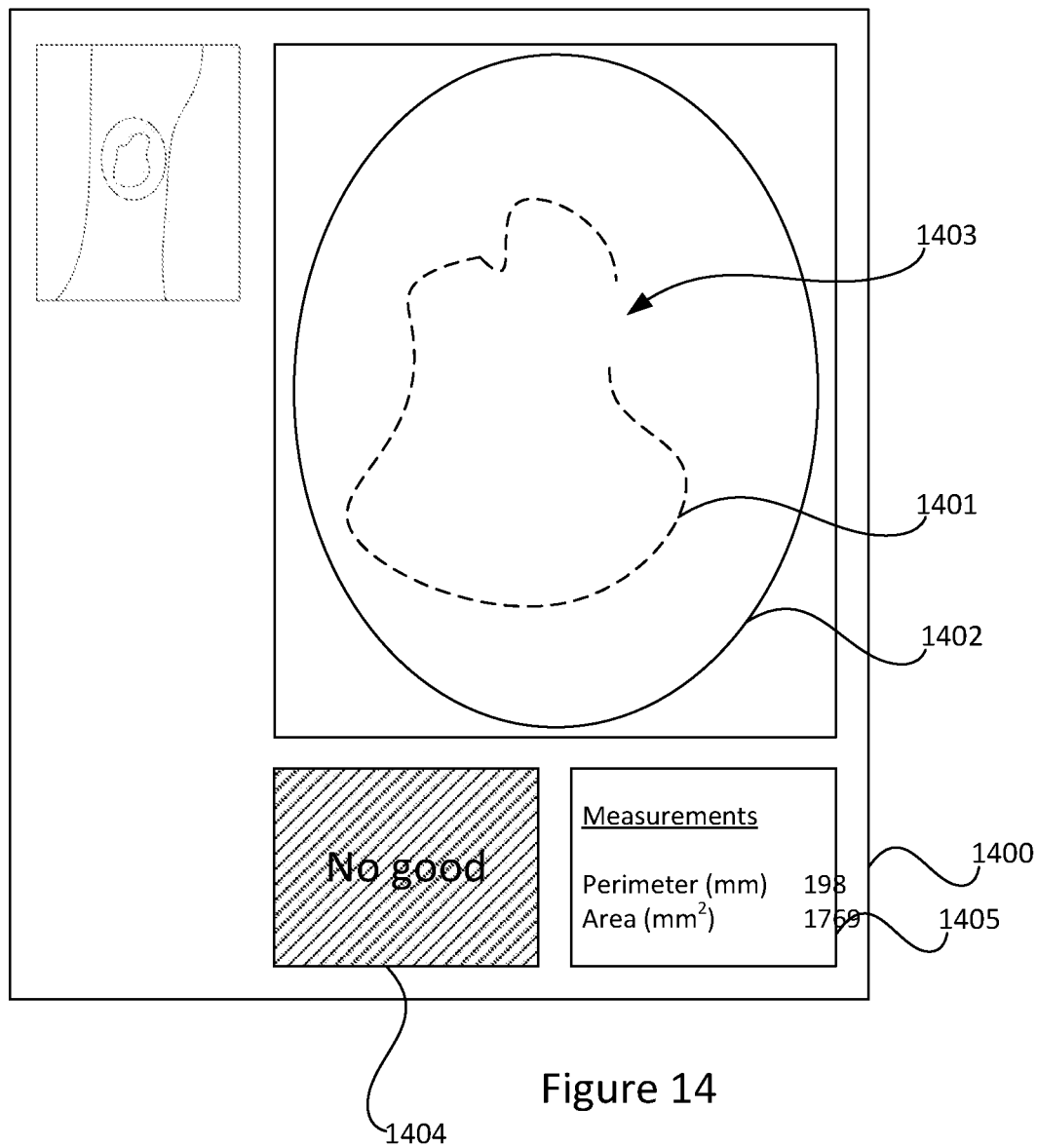
FIG. 14 is a simplified screenshot showing one example of display of data including outline and global confidence data.

FIG. 14 shows a display 1400 in which a generated outline 1401 is displayed within an ROI 1402. The outline may or may not be overlaid with an image of the skin surface. In the example shown, a portion of the generated outline (indicated generally by arrow 1403) has been determined to have a confidence value below a threshold. That portion 1403 has therefore not been displayed (although, as noted above, in other embodiments low confidence outline portions may still be displayed, and may be displayed in a manner distinguishing them from acceptable confidence outline portions). FIG. 14 also shows a global confidence indicator 1404. In this embodiment the global confidence indicator is displayed as a combination of the text 'No good' and a hatched pattern. In other embodiments any suitable display or notification of confidence may be used. FIG. 14 also shows a 'Measurements' box 1405, in which calculated values of perimeter and area for the surface feature are displayed. Any other desired data may be displayed.

Figure 15:
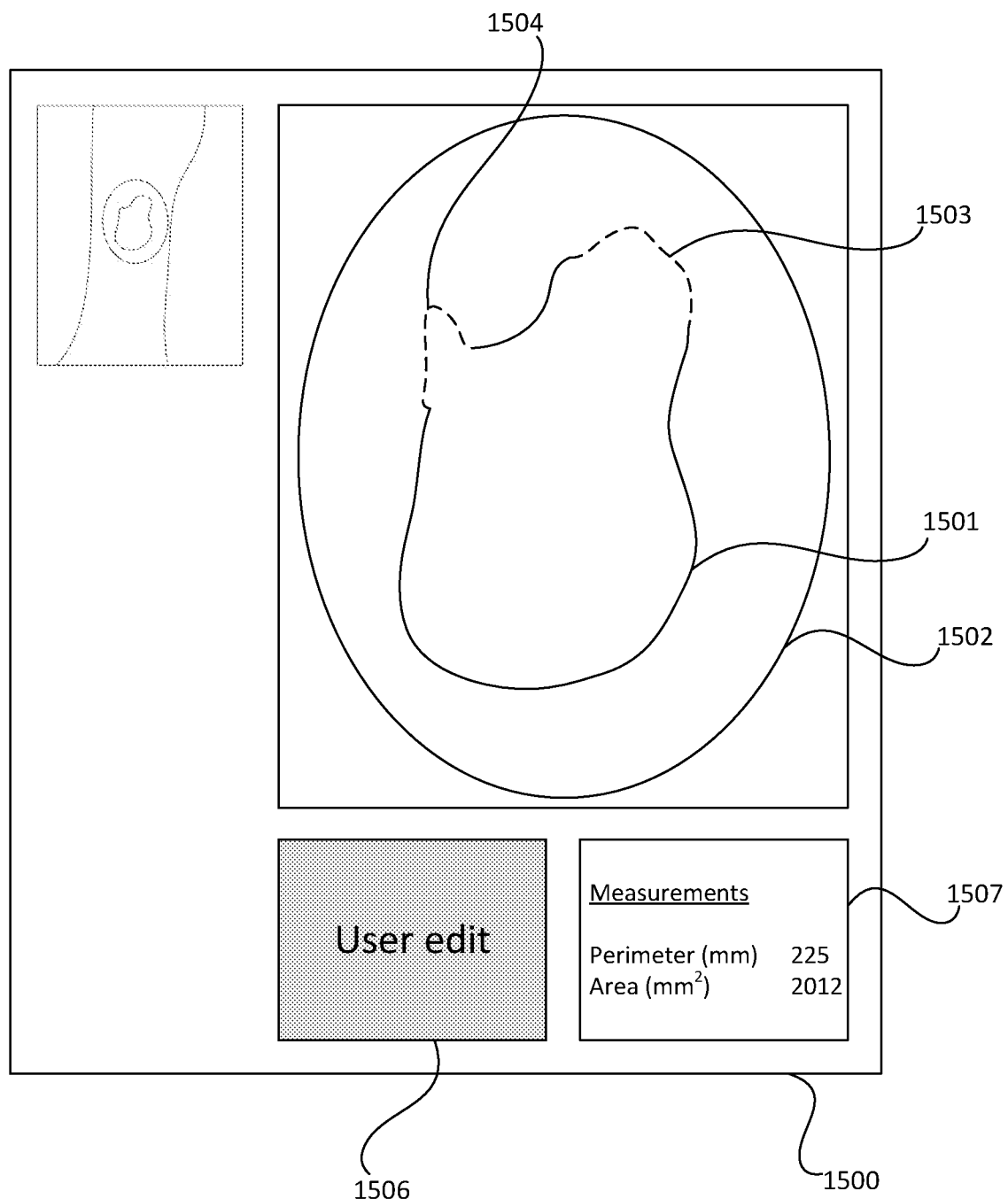
FIG. 15 is a simplified screenshot showing one example of display of data including outline data, local confidence data and a user prompt.

FIG. 15 shows a further display 1500 in which a generated outline 1501 is displayed within an ROI 1502. The outline may or may not be overlaid with an image of the skin surface. Here, two lower confidence outline portions 1503, 1504 are indicated by dashed line (though any suitable visual indicator could be used). A user prompt 1506 is also displayed, prompting a user to edit the generated outline. Edits may be performed in any suitable manner using any suitable user input device. A measurements box 1507 is also displayed.

Figure 16:
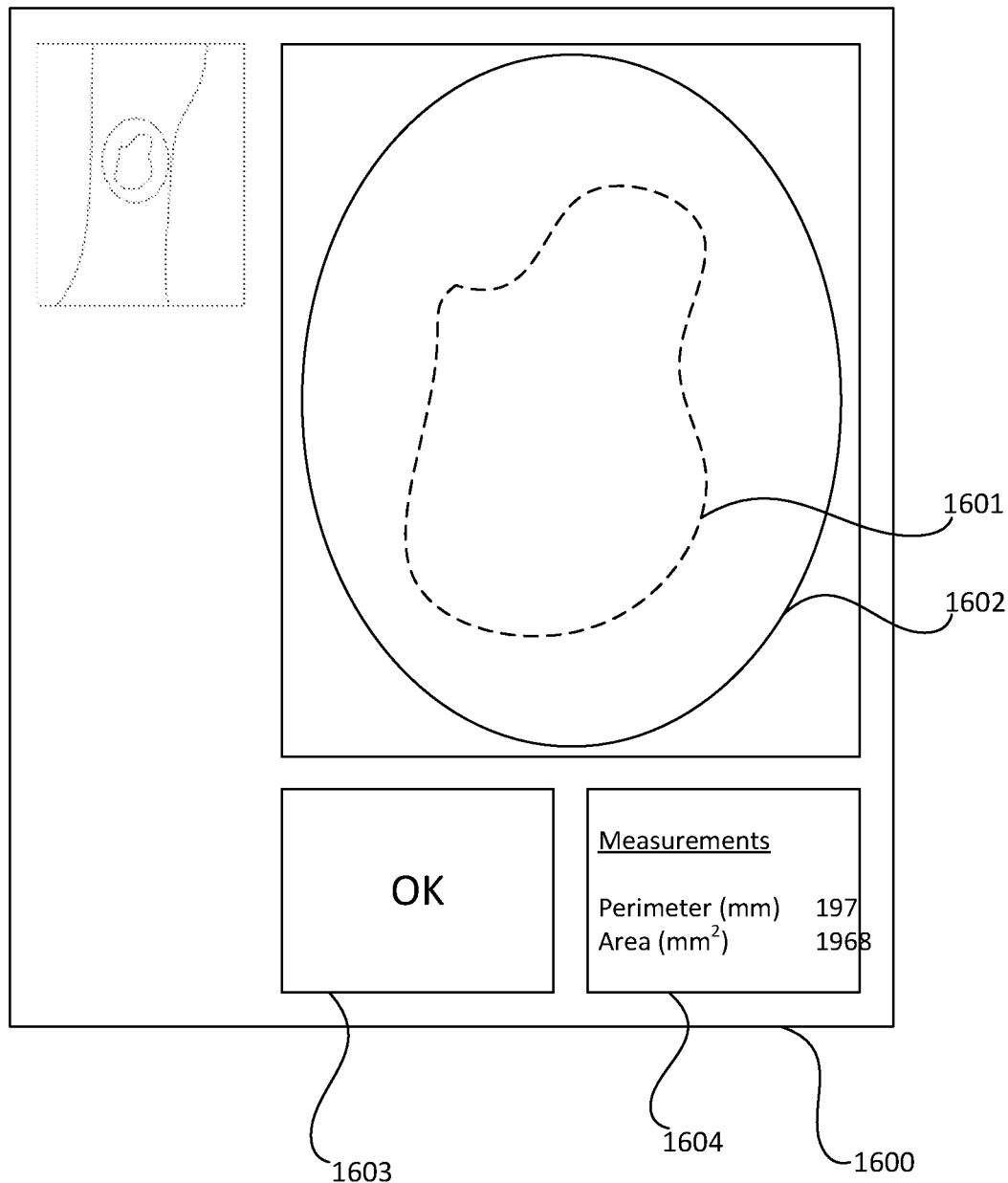
FIG. 16 is a simplified screenshot showing a further example of display of data including outline data and global confidence data.

FIG. 16 shows a further display 1600 in which an outline 1601 is displayed within an ROI 1602. The outline may or may not be overlaid with an image of the skin surface. A global confidence indicator 1603 ('OK') indicates that the global confidence is acceptable, or above a threshold. A measurements box 1604 is also displayed. A display such as that of FIG. 16, with an acceptable global confidence indicator, may result directly from generation of an outline in captured data, or via user editing of a generated outline with unacceptable global confidence (e.g., from user edits of an outline such as that of FIG. 14 or FIG. 15).

The above method provides iterative processing to allow the incorporation of optional user defined edits, together with overall user acceptance of the wound outline.

In any of these methods, once the wound is segmented from the image, further segmentation can be performed on the pixels within the wound boundary. This allows further classification of tissue. This further segmentation may be determined automatically by a processor based on any of the available image data, including RGB data, thermal data, fluorescence data and/or three-dimensional image data and any data based on captured data (such as e.g. converted color space data). The boundaries may be based on changes in color, temperature, fluorescence or surface roughness, for example.

Again, the user's input on this further segmentation may be solicited by the system, and the user may be given the opportunity to add segmentation data or modify the automatically determined segmentation data, for example by tracing on a touch screen or other user input device.

For each sub-region, a determination may be made as to the tissue types present in that sub-region. Tissue types may include, for example: Granulation tissue, Slough, Eschar, Bone, Ligament, Healthy tissue (e.g. islands or tissue outside of wound). Tissue types may be selected manually by a user, for example from a menu of available tissue types. Alternatively, tissue types present in a sub-region may be determined automatically by analysis of the image and other captured data (including any of 3D, thermal, fluorescence data etc.). Previously gathered data for specific sub-regions may be overlaid or otherwise compared with current data, to allow changes or trends for that sub-region to be seen.

A determination may also be made as to the proportions of tissue types present in that sub-region. For example, by visual inspection a user may determine that granulation tissue occupies around 40% of a sub-region, slough around 30% and healthy tissue around 30%. The user may enter these values via any suitable user interface, for example, via sliders, text boxes etc. Alternatively, proportions of tissue types present in a sub-region may be determined automatically by analysis of the image data.

Validation may be performed by comparison with ground truth (supervised evaluation) using a number of metrics such as Dice, Jaccard, Hasuhorff metrics etc, or any other suitable methods. Unsupervised evaluation does not require comparison with ground truth, but is solely based on a given segmentation.

This comparison with ground truth may involve comparison of automatically determined outlines with expert/clinician generated outlines. The ground truth or clinician outline may not generally available in many applications. However, such comparisons may be valuable in, for example, machine learning. For example, the system may learn the outlining from health professionals and adjust its methods over time. Such learning processes may take place at any suitable scale—globally across all customers, specific to a customer, or even specific to a clinician. This may lead to adjustments in automated outlining globally, or for specific customers, institutions or users.

In addition, where an automatically determined wound outline is deemed unacceptable, e.g. where the user overrides all or part of the automatically determined outline, the user entered outline and corresponding automatically determined outline may provide inputs to machine learning methods. These methods may include but are not limited to Support Vector Machines, Artificial Neural Networks, Random Forest Decision Trees etc. This may lead to fine tuning of input parameters, color spaces, thresholding methods, confidence metrics, smoothing methods, simplification methods or highlight the need for an alternative approach. For example, if the user often or always overrides some or all of the outline for a specific wound type (e.g. Venous Leg Ulcers) the system may adjust its methods to automatically include alternative or additional processing or any other available information for these wound types. Similarly, where both user and automatic tissue type classifications are available, machine learning could be applied to better determine the different tissue types for future classifications.

In one embodiment the process of machine learning may be based on minimizing a cost function based on the difference between a user entered outline and an automatically determined outline. The machine learning process may adjust the weightings of various color spaces and/or other metrics and re-compute the automatically determined outline. If the difference (cost) of the new outline is smaller the color space weightings may be adjusted for subsequent wound outlining calculations. The process of adjusting the weighting coefficients from previous outlining calculations may be performed gradually over time to ensure the weightings form an average of many outlining datasets.

In one embodiment the machine learning process could include information from a wider set of patient metrics, typically retrieved from a health providers Electronic Medical Records (EMR) system. In this case the machine learning algorithm could be used to establish wound outline and tissue classification regions from a wider set of input information. For example, a machine learning algorithm may establish a pattern or correlation between a patients medication and the overall shape of a wound.

Fully automated outlining and/or identification of sub-regions may eliminate user involvement and produce more accurate results than manual segmentation. However, in some applications implementation of such fully automated methods may prove challenging and may not always provide satisfactory results, e.g. due to image complexity. Assisted, interactive or semi-automatic methods may be used in some embodiments. These may involve a user providing a suitable input.

In some embodiments a user may define a closed initial contour or initial segmentation, used as a basis for automated determination of outline data and/or sub-region data.

In some embodiments a user may input initial points, regions etc that are identified as 'object' and/or 'foreground' and/or 'background' points, regions etc. The user may identify distinct points, or may identify larger number of points or a region by e.g. dragging a pointer or 'brush', or a finger on a touchscreen, or selecting a region by dragging a shape, or by any other suitable user input method.

In some embodiments a user may input a small number of points that are 'outline points'. From these points the system may 'extrapolate' the outline by following regions of the skin surface with similar characteristics.

In any of these methods, identification of an ROI may not be required.

In one embodiment, a user may identify a small number (perhaps 2 to 10) of points on the surface feature boundary in any suitable data set. The system may identify the image structure at each of the selected points (e.g. from the normalized-green map, 3D shape gradient, or any other suitable imaging modality such as UV etc.). The system may then identify further regions of the image with equivalent structure and 'extrapolate' the outline.

The resulting outline data may be further processed by any of the methods described herein.

Outlining methods have been described mainly with reference to image data. However, any suitable data sets, captured using any suitable capture device, may be used. For example, suitable data sets may include three-dimensional data, three-dimensional image data, thermal image data, fluorescence image data, texture image data, color image data, monochrome image data, UV data, Infrared data, data captured from a single device pose, data captured from a plurality of device poses, data sets under different lighting conditions (e.g. lighting from different angles, lighting of different spectral range or wavelength, lighting at different color temperatures—these may be adjusted using the lighting built into capture devices or using external devices) or any other suitable data.

Suitable data capture devices may include any one or more of: cameras, including color and monochrome cameras, 3D scanners, 3D cameras, structured light devices, thermal cameras, UV cameras, Infrared cameras, or any other suitable capture device.

Where more than one data set is captured, the method may include registration between data sets.

Further, any suitable further data may be incorporated into any suitable stage of the method, e.g. in order to improve accuracy, efficiency or aid method selection. Such additional information may include any one or more of: imaging metrics, 3D information of the surface and/or surface feature, the 3D shape of many surface features across many patients, anatomical site of the surface feature (e.g. calf, foot), wound type or etiology (e.g. pressure ulcer: stage 3, venous ulcer, diabetic), wound margin characteristics (e.g. sloping, inflamed), surrounding skin characteristics (e.g. inflamed, healthy, dry), contributing factors (e.g. pressure, friction), wound appearance or tissue types (e.g. % granulating, necrotic tissue etc in last assessment), previous dressing type, one or more previous outlines for the surface feature, any other suitable real time data or information, any other suitable historical data or information.

Object segmentation (identification of surface feature/non-surface feature and sub-regions such as tissue type regions) may be improved by utilizing any available or prior information. This may include any of the information described in the preceding paragraph and/or any one or more of: user interaction, intensity, color, texture, boundary and edge information, shape, topology, location, length, area, number of regions, anatomical knowledge etc. Further, different methods of data capture, preliminary data processing, ROI determination, outline determination and/or display may be used based on the available information.

For example, some data sets may be used only where the confidence achieved through analysis of a first set of data sets is insufficient. For example, if the confidence achieved through analysis of an RGB image data set is insufficient, a 3D data set may also be analysed.

The selection of an ROI determination method may be based on whether the capture relates to a new wound (in which case there is no previous information to use), or an existing wound (in which case a previous wound outline or a previous ROI could be used in determination of a new ROI). The selection of an ROI determination method may also be based on the capture device used and/or the data sets available. For example, some capture devices may capture only RGB data, others may capture RGB and 3D data; others may project a region onto the skin surface, etc.

The selection of color spaces could be a function of wound location. For example, if the wound is located on a patient's foot, the system may determine that this is most likely a diabetic foot ulcer and select a normalized green color space. A wound on the patient's shin may use an alternative processing (e.g. multiple weighted color spaces followed by multi-level thresholding etc).

Selection of color space may also be based on wound history. For example, if a previous measurement indicated the presence of specific tissue types, one or more color spaces may be selected appropriate to those tissue types.

The selection of a thresholding method may be a function of metrics of image pixels within the ROI. For example, if the histogram of the pixel levels has a bimodal distribution, the system may use Otsu thresholding to classify the pixels into 'wound' and 'non-wound'. If the histogram of the pixel levels is unimodal, the system may use an alternative thresholding method.

The following examples are illustrative of several embodiments of the present technology:

1. A method of assessing a surface feature on a patient's skin surface, including:
   capturing one or more data sets from a patient's skin surface including the skin surface feature;
   determining outline data of the skin surface feature based on at least one of the one or more data sets; and
   determining one or more confidence attributes associated with the determined outline data.

2. A method as in example 1, wherein the determined outline data includes a determined outline of the surface feature.

3. A method as in example 2, wherein at least one of the one or more confidence attributes include a confidence attribute for the determined outline as a whole.

4. A method as in example 2 or example 3, wherein the one or more confidence attributes include a plurality of segment confidence attributes, each associated with a segment of the determined outline.

5. A method as in any one of examples 2-4, wherein the one or more confidence attributes include a plurality of point confidence attributes, each associated with a point on the determined outline.

6. A method as in any one of examples 2-5, including rejecting the determined outline or part of the determined outline if one or more of the confidence attributes are unacceptable.

7. A method as in any one of examples 2-6, including rejecting part of the determined outline if one or more of the segment confidence attributes are unacceptable.

8. A method as in any one of examples 2-7, including rejecting part of the determined outline if one or more of the point confidence attributes are unacceptable.

9. A method as in example 6, including soliciting user input for replacement or modification of the rejected determined outline or rejected part of the determined outline.

10. A method as in any one of examples 1-9, wherein the determined outline data includes sub-region outline data for one or more sub-regions of the surface feature.

11. A method as in example 10, wherein the one or more confidence attributes include one or more of: one or more confidence attributes for the sub-region outline data for each of the one or more sub-regions; a plurality of sub-region segment confidence attributes, each associated with a segment of the determined sub-region outline data; and a plurality of sub-region point confidence attributes, each associated with a point in the determined sub-region outline data.

12. A method as in example 10 or example 11, including determining one or more tissue types associated with each of the sub-regions.

13. A method as in example 12, including determining a tissue confidence attribute associated with the determined tissue type for each of the sub-regions.

14. A method as in any one of examples 1-13 wherein determination of the confidence attribute is based at least in part on distances between points in the determined outline data.

15. A method as in any one of examples 1-14, including processing the determined outline data, wherein determination of the confidence attribute is based at least in part on distances between points in the determined or processed outline data and points in the one or more data sets.

16. A method as in example 15 wherein processing the determined outline data includes resampling the determined outline data.

17. A method as in example 15 or example 16 wherein the points in the one or more data sets include points with a predetermined tissue type classification.

18. A method as in any one of examples 1-17 including storing the one or more confidence attributes and/or data based on the one or more confidence attributes.

19. A method as in any one of examples 1-18 including displaying the one or more confidence attributes and/or data based on the one or more confidence attributes.

20. A method of assessing a surface feature on a patient's skin surface, including:
  capturing one or more data sets from a patient's skin surface including the skin surface feature;
  determining outline data of the skin surface feature based on at least one of the one or more data sets;
  determining one or more confidence attributes associated with the determined outline data;
  displaying at least part of an outline that is based at least in part on the determined outline data; and
  displaying one or more visual representations of the one or more confidence attributes.

21. A method as in example 20, including displaying a representation of the skin surface and/or skin surface feature.

22. A method as in example 20 or example 21, wherein displaying one or more visual representations of the one or more confidence attributes includes displaying one or more of: a numerical confidence indicator, a confidence symbol indicator, a colored confidence indicator, a patterned confidence indicator, and a confidence scale indicator.

23. A method as in any one of examples 20-22, including displaying a plurality of visual representations of the one or more confidence attributes, at least some of the displayed visual representation being associated with segments of the displayed outline.

24. A method as in any one of examples 20-23, wherein displaying at least part of an outline includes displaying only outline segments with confidence attributes that are acceptable.

25. A method as in any one of examples 20-24, including soliciting user input of outline data for outline segments with confidence attributes that are unacceptable.

26. A method as in any one of examples 20-25, including enabling a user to accept or reject the displayed outline or segments of the displayed outline.

27. A method as in any one of examples 20-26, including enabling a user to modify the displayed outline or segments of the displayed outline.

28. A method as claimed in example 27, including:
  determining one or more revised confidence attributes associated with the modified outline;
  displaying the modified outline; and
  displaying one or more visual representations of the one or more revised confidence attributes.

29. A method of assessing a surface feature on a patient's skin surface, including:
  capturing one or more data sets from a patient's skin surface including the skin surface feature;
  determining outline data for the skin surface feature based on at least one of the one or more data sets;
  determining one or more confidence attributes associated with the determined outline data; and
  based on the one or more confidence attributes, soliciting user input of replacement or modified outline data.

30. A method of assessing a surface feature on a patient's skin surface, including:
  capturing one or more data sets from a patient's skin surface including the skin surface feature;
  defining a region of interest ('ROI') within at least one of the data sets, the skin surface feature being positioned within the ROI; and
  analyzing data within the ROI to determine outline data of the skin surface feature.

31. A method as in example 30, including a user defining the ROI.

32. A method as claimed in example 30 or example 31, including automatically defining the ROI based on one or more known characteristics of a capture device used in the capturing of one or more data sets.

33. A method as in any one of examples 30-32, including automatically defining the ROI by extracting data corresponding to the patient's skin surface from background data.

34. A method as in any one of examples 30-33, including automatically defining the ROI based on a first approximation of a boundary of the surface feature.

35. A method as in any one of examples 30-34, including automatically defining the ROI based on historic data associated with the same wound or same patient.

36. A method as in example 35, wherein the ROI is based on a historic ROI.

37. A method as in example 35, wherein the ROI is based on historic outline data.

38. A method as in example 35, wherein the ROI is based on known fiducials on the skin surface.

39. A method as in any one of examples 30-39, including soliciting user approval of the ROI.

40. A method as in any one of examples 30-40, including enabling user modification of the ROI.

41. A method of assessing a surface feature on a patient's skin surface, including:
  capturing one or more data sets from a patient's skin surface including the skin surface feature;
  determining outline data for the skin surface feature; and
  smoothing the outline data to produce a set of smoothed outline points.

42. A method of assessing a surface feature on a patient's skin surface, including:
  capturing one or more data sets from a patient's skin surface including the skin surface feature;
  determining outline data for the skin surface feature, wherein the outline data includes a first set of outline points;

processing the outline data to produce a reduced set of outline points, the reduced set of outline points having a smaller number of outline points than the first set of outline points.

43. A method of assessing a surface feature on a patient's skin surface, including:
    capturing one or more data sets from a patient's skin surface including the skin surface feature;
    identifying a subset of skin surface feature outline points in at least one of the one or more data sets; and
    extrapolating from the identified subset of skin surface feature outline points and data from the one or more data sets to determine a set of outline data for the skin surface feature.

44. A method as in example 43 including a user manually identifying the subset of skin surface feature outline points.

45. A method as in example 44 wherein a user manually identifies the subset of skin feature outline points by identifying one or more discrete outline points.

46. A method as in example 44 wherein a user manually identifies the subset of skin feature outline points by identifying one or more outline segments each including a plurality of outline points.

47. A method as in example 44 including enabling a user to classify outline points in the identified subset of outline points as definite points or non-definite points.

48. A method of assessing a surface feature on a patient's skin surface, including:
    capturing, in one or more first color spaces, one or more images of a patient's skin surface including the skin surface feature;
    converting at least some of the one or more images to produce one or more converted images in one or more further color spaces, different to the one or more first color spaces; and
    determining outline data for the skin surface feature based on the one or more converted images.

49. A method as in example 48 wherein the one or more further color spaces include one or more monochrome color spaces.

50. A method as in example 48 or example 49 wherein the one or more further color spaces include a normalized green color space.

51. A method as in example 48 wherein the one or more color spaces include one or more of: normalized red, normalized blue, red, green, blue, UV, Infrared, CIE Lab, RGB, HSL, HSV, CIE Luv, YCbCr, CMYK, enhanced red, and grayscale color spaces.

52. A method of assessing a surface feature on a patient's skin surface, including:
    capturing one or more data sets from a patient's skin surface including the skin surface feature;
    retrieving from storage historical information relating to the patient and/or skin surface feature;
    based on the retrieved historical information, selecting an outlining method from a plurality of available methods; and
    determining outline data of the skin surface feature based on at least one of the one or more data sets, using the selected outlining method.

53. A method as in example 52 wherein the historical information includes one or more of: skin surface characteristics, surface feature characteristics, surface feature type, surface feature etiology, anatomical site, imaging metrics, previous dressing type, tissue type characteristics, 3D surface feature information, expected or assessed pressure or friction around the surface feature, and historical outline information.

54. A method of assessing one or more surface features on the skin surfaces of one or more patients, including:
    determining outline data of a first skin surface feature based on one or more captured data sets;
    a processor modifying an outline determination method; and
    a processor determining outline data of a further skin surface feature based on one or more further captured data sets and according to the modified outline determination method.

55. A method as in example 54, wherein the processor modifies the outline determination method based on information obtained from the determining of outline data of the first skin surface feature.

56. A method as claimed in example 54 or example 55 wherein the determining of outline data of the first skin feature includes a processor determining the outline data of the first skin surface feature based on one or more captured data sets and according to the outline determination method.

57. A method as in example 55 or example 56 wherein a user accepts or modifies the determined outline data of the first skin surface feature and the processor modifies the outline determination method based at least in part on the user acceptance or modification of the determined outline data of the first skin surface feature.

58. A method as in any one of examples 54-57 including storing in memory code embodying the modified outline determination method.

The skilled reader will understand that many variations on the manner of selection of data capture methods, preliminary data processing, ROI determination, outline determination and/or display are possible.

Color spaces may also be selected based on the contrast in a number of different color spaces—for example, one or more color spaces with the highest contrast, or acceptable contrast, may be used.

Algorithm learning techniques may also be used. These may be based on any suitable inputs, including e.g. the user's acceptance, modification or rejection of outline data. For example, the final accepted outline may be compared to the initial outline data and any areas of agreement/disagreement between the two may be used to tune the outline determination method. Tuning may involve adjustment of weighting coefficients from each of the various inputs (color spaces, 3d shape etc), adjustments to the way the confidence is calculated, or any other suitable modification.

Various methods have been described above. The skilled reader will understand that the order of method steps may be varied where appropriate. The skilled reader will also understand that further processing or method steps may be incorporated. Such variations are intended to fall within the scope of the invention.

Any data captured or generated by these methods may be stored for later analysis, in determining trends (such as trends in wound area or volume over time), or for use in subsequent data capture. Further, any data captured or generated by these methods may be displayed to a user in any suitable form on any suitable device.

Any automated step may be performed by a processor or processors at any suitable part of the facility. Automated steps may be carried out locally, centrally or remotely. Processors on the capture device, local user device, central computers or elsewhere in the facility.

Any software, code embodying method steps, modifications to such code, as well as any captured or processed or calculated data may be stored in any suitable memory anywhere in the facility, including local, central or remote memory.

While the present technology has been illustrated by the description of the embodiments thereof, and while the embodiments have been described in detail, it is not the intention of the Applicant to restrict or in any way limit the scope of the appended claims to such detail. Additional advantages and modifications will readily appear to those skilled in the art. Therefore, the present technology in its broader aspects is not limited to the specific details, representative apparatus and method, and illustrative examples shown and described. Accordingly, departures may be made from such details without departure from the spirit or scope of the Applicant's general inventive concept.

We claim:

1. A method of assessing a surface feature on a patient's skin surface, including:
    capturing one or more data sets from a patient's skin surface including the skin surface feature;
    determining outline data of the skin surface feature based on at least one of the one or more data sets; and
    determining one or more confidence attributes associated with the determined outline data;
        wherein determination of the confidence attribute is based at least in part on one or more of:
            distances between points in the determined outline data; and
            distances between points in the determined or processed outline data and points in the one or more data sets.

2. A method as claimed in claim 1, wherein at least one of the one or more confidence attributes include one or more of: a confidence attribute for the determined outline as a whole; a plurality of segment confidence attributes, each associated with a segment of the determined outline; and a plurality of point confidence attributes, each associated with a point on the determined outline.

3. A method as claimed in claim 2, including rejecting the determined outline or part of the determined outline if one or more of the confidence attributes are unacceptable.

4. A method as claimed in claim 3, including soliciting user input for replacement or modification of the rejected determined outline or rejected part of the determined outline.

5. A method as claimed in claim 1, wherein the determined outline data includes sub-region outline data for one or more sub-regions of the surface feature.

6. A method as claimed in claim 5, wherein the one or more confidence attributes include one or more of: one or more confidence attributes for the sub-region outline data for each of the one or more sub-regions; a plurality of sub-region segment confidence attributes, each associated with a segment of the determined sub-region outline data; and a plurality of sub-region point confidence attributes, each associated with a point in the determined sub-region outline data.

7. A method as claimed in claim 5, including determining one or more tissue types associated with each of the sub-regions.

8. A method as claimed in claim 7, including determining a tissue confidence attribute associated with the determined tissue type for each of the sub-regions.

9. A method as claimed in claim 1 including storing the one or more confidence attributes and/or data based on the one or more confidence attributes.

10. A method as claimed in claim 1 including displaying the one or more confidence attributes and/or data based on the one or more confidence attributes.

11. A method of assessing a surface feature on a patient's skin surface, including capturing one or more data sets from a patient's skin surface including the skin surface feature;
    determining outline data of the skin surface feature based on at least one of the one or more data sets;
    determining one or more confidence attributes associated with the determined outline data;
    displaying at least part of an outline that is based at least in part on the determined outline data; and
    displaying one or more visual representations of the one or more confidence attributes.

12. A method as claimed in claim 11, including displaying a representation of the skin surface and/or skin surface feature.

13. A method as claimed in claim 11, wherein displaying one or more visual representations of the one or more confidence attributes includes displaying one or more of: a numerical confidence indicator, a confidence symbol indicator, a colored confidence indicator, a patterned confidence indicator, and a confidence scale indicator.

14. A method as claimed in claim 11, including displaying a plurality of visual representations of the one or more confidence attributes, at least some of the displayed visual representation being associated with segments of the displayed outline.

15. A method as claimed in claim 11, wherein displaying at least part of an outline includes displaying only outline segments with confidence attributes that are acceptable.

16. A method as claimed in claim 11, including enabling a user to modify the displayed outline or segments of the displayed outline,
    determining one or more revised confidence attributes associated with the modified outline;
    displaying the modified outline; and
    displaying one or more visual representations of the one or more revised confidence attributes.

17. A method of assessing a surface feature on a patient's skin surface, including:
    capturing one or more data sets from a patient's skin surface including the skin surface feature;
    determining outline data of the skin surface feature based on at least one of the one or more data. sets, wherein the outline data includes a. first set of outline points; and
    determining one or more confidence attributes associated with the determined outline data, wherein determination of the confidence attribute is based at least in part on one or more of: distances between points in the determined outline data; and
    distances between points in the determined or processed outline data and points in the one or more data sets;
    processing the outline data to produce a reduced set of outline points, the reduced set of outline points having a smaller number of outline points than the first set of outline points;
    smoothing one or more of the first set of outline points and the reduced set of outline points.

18. A method as claimed in claim 17, wherein at least one of the one or more confidence attributes include one or more of: a confidence attribute for the determined outline as a whole; a plurality of segment confidence attributes, each associated with a segment of the determined outline; and a plurality of point confidence attributes, each associated with a point on the determined outline.

19. A method as claimed in claim 18, including rejecting the determined outline or part of the determined outline if one or more of the confidence attributes are unacceptable.

20. A method as claimed in claim 19, including soliciting user input for replacement or modification of the rejected determined outline or rejected part of the determined outline.

* * * * *